US012348680B2

(12) United States Patent
Niikura et al.

(10) Patent No.: US 12,348,680 B2
(45) Date of Patent: Jul. 1, 2025

(54) INFORMATION PROCESSING APPARATUS AND INFORMATION PROCESSING SYSTEM FOR DETECTING AN INJECTED DROPLET

(71) Applicant: Sony Semiconductor Solutions Corporation, Kanagawa (JP)

(72) Inventors: Hirotaka Niikura, Tokyo (JP); Yoshitaka Miyatani, Tokyo (JP); Atsutake Kosuge, Tokyo (JP); Daiki Nakagawa, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 163 days.

(21) Appl. No.: 18/245,391

(22) PCT Filed: Sep. 10, 2021

(86) PCT No.: PCT/JP2021/033275
§ 371 (c)(1),
(2) Date: Mar. 15, 2023

(87) PCT Pub. No.: WO2022/065076
PCT Pub. Date: Mar. 31, 2022

(65) Prior Publication Data
US 2023/0353893 A1 Nov. 2, 2023

(30) Foreign Application Priority Data

Sep. 25, 2020 (JP) .................................. 2020-161034

(51) Int. Cl.
*H04N 25/626* (2023.01)
*B05B 5/00* (2006.01)
(Continued)

(52) U.S. Cl.
CPC ............ *H04N 25/626* (2023.01); *B05B 5/005* (2013.01); *H04N 25/47* (2023.01); *H04N 25/53* (2023.01)

(58) Field of Classification Search
CPC ........ B05C 11/1005; B05C 5/00; H04N 25/53; H04N 25/626; H04N 25/47
See application file for complete search history.

(56) References Cited

U.S. PATENT DOCUMENTS

2017/0028426 A1\* 2/2017 Kakuma ............ H01L 21/67253
2020/0005468 A1\* 1/2020 Paul ........................ H04N 25/47

FOREIGN PATENT DOCUMENTS

FR          2704058 A1     10/1994
JP       2005022222 A      1/2005
(Continued)

OTHER PUBLICATIONS

Dvt Corporation: "DVT SmartImage Sensor Installation & User Guide", Aug. 31, 2003 (Aug. 31, 2003), pp. 1-157, XP093125635.
(Continued)

*Primary Examiner* — Nicholas G Giles
(74) *Attorney, Agent, or Firm* — Michael Best & Friedrich LLP

(57) ABSTRACT

The present technology relates to an information processing apparatus and an information processing system that enable accurate detection of a droplet from a dispenser.
The information processing apparatus includes: an event sensor including a pixel configured to photoelectrically convert an optical signal and output a pixel signal, the event sensor being configured to output a temporal luminance change of the optical signal as an event signal on the basis of the pixel signal; and a processor configured to detect a droplet injected from the dispenser on the basis of the event
(Continued)

signal. The present technology can be applied to, for example, a dispenser control system that controls a dispenser, and the like.

19 Claims, 45 Drawing Sheets

(51) Int. Cl.
*H04N 25/47* (2023.01)
*H04N 25/53* (2023.01)

(56) References Cited

FOREIGN PATENT DOCUMENTS

| | | | |
|---|---|---|---|
| JP | 2006142808 A | 6/2006 | |
| JP | 2006195402 A | 7/2006 | |
| JP | 2019081130 A | 5/2019 | |
| JP | 2020057989 A | 4/2020 | |
| JP | 2020099015 A | 6/2020 | |
| JP | 2020153795 A | 9/2020 | |
| KR | 20200100667 A | 8/2020 | |
| WO | WO-2002040273 A2 | 5/2002 | |
| WO | WO-2006007706 A1 | 1/2006 | |
| WO | WO-2020071266 A1 | 4/2020 | |
| WO | WO-2020071267 A1 | 4/2020 | |
| WO | WO-2020071268 A1 | 4/2020 | |
| WO | WO-2020129657 A1 | 6/2020 | |
| WO | WO-2020189166 A | 9/2020 | |
| WO | WO-2022040786 A1 | 3/2022 | |

OTHER PUBLICATIONS

International Search Report (PCT/ISA/210), International Application No. PCT/JP2021/033275, dated Nov. 2, 2021.

* cited by examiner

FIG. 20
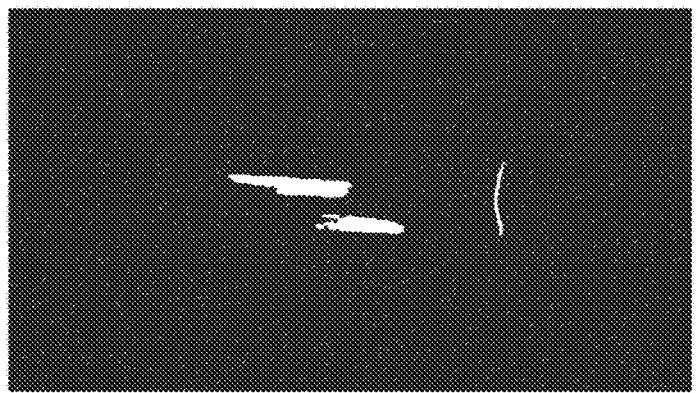
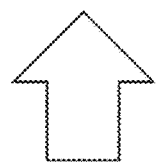
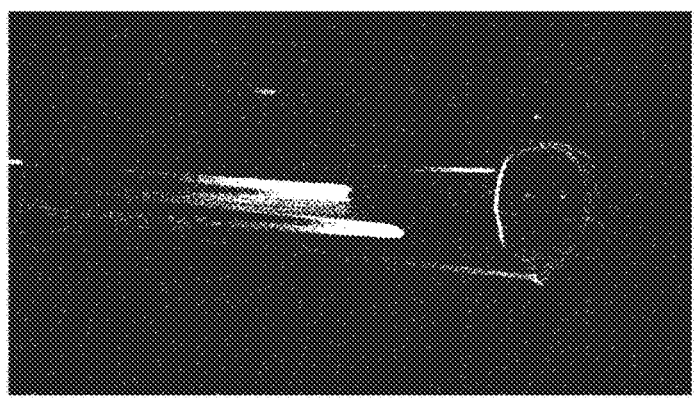

INFORMATION PROCESSING APPARATUS AND INFORMATION PROCESSING SYSTEM FOR DETECTING AN INJECTED DROPLET

TECHNICAL FIELD

The present technology relates to an information processing apparatus and an information processing system, and more particularly to an information processing apparatus and an information processing system capable of accurately detecting a droplet from a dispenser.

BACKGROUND ART

In a semiconductor manufacturing process, there is a process of applying liquid such as an adhesive to a substrate, a lead frame, or the like by using a dispenser. A system for measuring a dropping amount has been proposed in which a volume of a droplet ejected from a dispenser is measured by a camera, and feedback control of a parameter is performed to the dispenser to adjust an amount of the droplet (see, for example, Patent Document 1).

CITATION LIST

Patent Document

Patent Document 1: Japanese Patent Application Laid-Open No. 2006-195402

SUMMARY OF THE INVENTION

Problems to be Solved by the Invention

In a case where a high-speed camera having a frame rate of about 1000 fps is used as a camera for capturing an image of a droplet ejected from a dispenser, it is difficult to accurately capture the droplet since only about three images can be captured for one droplet.

The present technology has been made in view of such a situation, and an object thereof is to enable accurate detection of a droplet from a dispenser.

Solutions to Problems

An information processing apparatus according to a first aspect of the present technology includes: an event sensor including a pixel configured to photoelectrically convert an optical signal and output a pixel signal, the event sensor being configured to output a temporal luminance change of the optical signal as an event signal on the basis of the pixel signal; and a processor configured to detect a droplet injected from the dispenser on the basis of the event signal.

An information processing system according to a second aspect of the present technology includes: a dispenser configured to inject predetermined liquid: an event sensor including a pixel configured to photoelectrically convert an optical signal and output a pixel signal, the event sensor being configured to output a temporal luminance change of the optical signal as an event signal on the basis of the pixel signal; and a processor configured to detect a droplet injected from the dispenser on the basis of the event signal.

In the first and second aspects of the present technology, the pixel configured to photoelectric convert an optical signal and output a pixel signal is provided to the event sensor, a temporal luminance change of the optical signal is outputted as an event signal on the basis of the pixel signal, and a droplet injected from the dispenser is detected on the basis of the event signal.

The information processing apparatus, an imaging device, and a control system may be independent devices or modules incorporated in other devices.

BRIEF DESCRIPTION OF DRAWINGS

FIG. 20 is a view for explaining noise removal processing by a noise removal processing unit.

MODE FOR CARRYING OUT THE INVENTION

Figure 1:
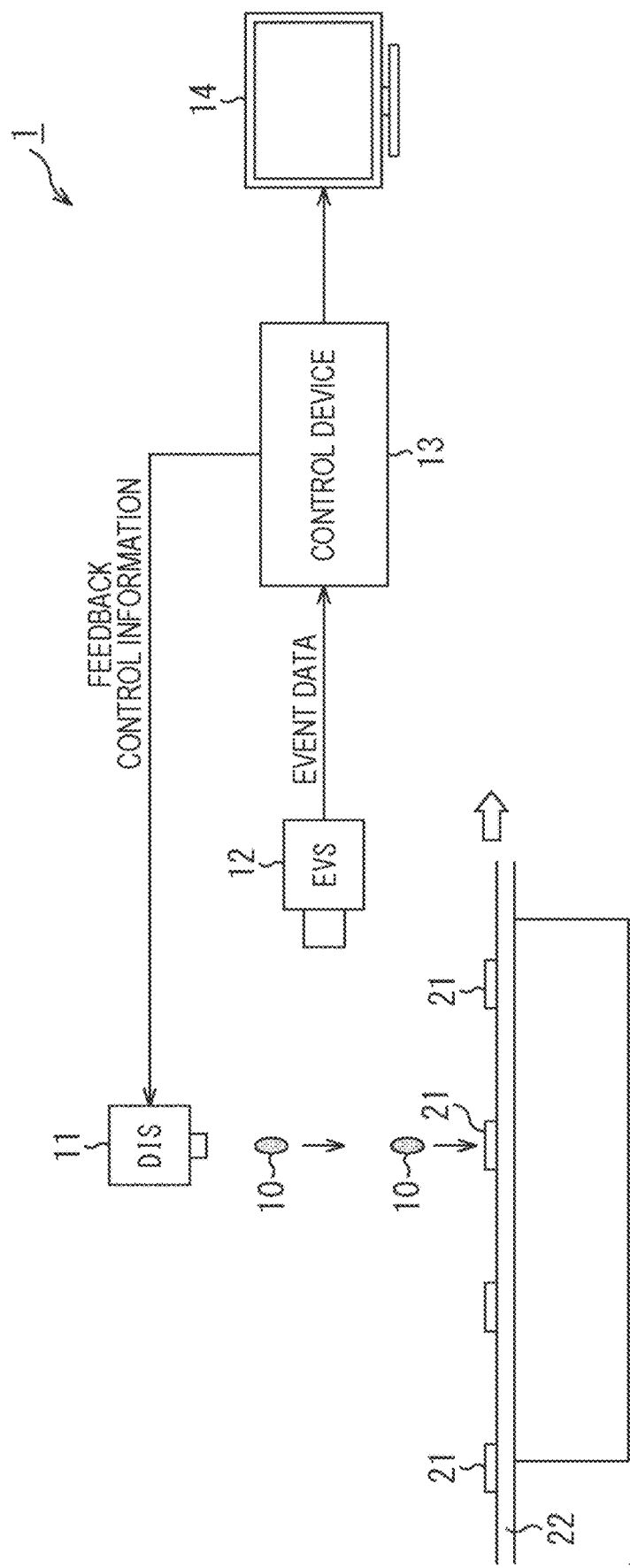
FIG. 1 is a diagram illustrating a configuration example of a first embodiment of a dispenser control system to which the present technology is applied.

Hereinafter, embodiments for implementing the present technology (hereinafter, referred to as embodiments) will be described with reference to the accompanying drawings. Note that, in the present specification and the drawings, components having substantially the same functional configuration are denoted by the same reference numerals, and redundant explanations are omitted. The description will be given in the following order.

1. First embodiment of dispenser control system
2. Example of event data
3. Method for capturing image of droplet
4. Configuration example of control device
5. Processing of first frame processing unit
6. Processing of second frame processing unit
7. Processing of noise removal processing unit
8. Processing of droplet detection unit
9. Processing of droplet tracking unit
10. Droplet control processing of dispenser control system
11. Application of DNN
12. Second embodiment of dispenser control system
13. Third embodiment of dispenser control system
14. Conclusion
15. Computer configuration example 1. First Embodiment of Dispenser Control System FIG. 1 illustrates a configuration example of a first embodiment of a dispenser control system to which the present technology is applied.

A dispenser control system 1 of FIG. 1 includes a dispenser 11, an EVS camera 12, a control device 13, and a display 14, and controls injection of droplets by the dispenser 11.

The dispenser 11 injects predetermined liquid on, as a target, a substrate 21 placed and conveyed on a conveyor 22. The liquid injected from the dispenser 11 becomes droplets 10 and drops toward the substrate 21.

The EVS camera 12 is a camera including a pixel that photoelectrically converts an optical signal and outputs a pixel signal, and including an event sensor that outputs a temporal luminance change of the optical signal as an event signal (event data) on the basis of the pixel signal. Such an event sensor is also referred to as an event-based vision sensor (EVS). While a camera including a general image sensor captures an image in synchronization with a vertical synchronization signal, and outputs frame data that is image data of one frame (screen) at a cycle of the vertical synchronization signal, the EVS camera 12 outputs event data only at a timing at which an event occurs. Therefore, it can be said that the EVS camera 12 is an asynchronous (or address control) camera.

The EVS camera 12 detects, as an event, a temporal luminance change based on the droplet 10 injected from the dispenser 11, and outputs event data to the control device 13.

The control device 13 detects the droplet 10 from the dispenser 11 on the basis of the event data outputted from the EVS camera 12, generates control information for controlling the injection of the droplet 10, and outputs the control information to the dispenser 11.

Furthermore, the control device 13 generates a display image to be monitored by a worker on the basis of the event data outputted from the EVS camera 12, and causes the display 14 to display the display image.

Figure 2:
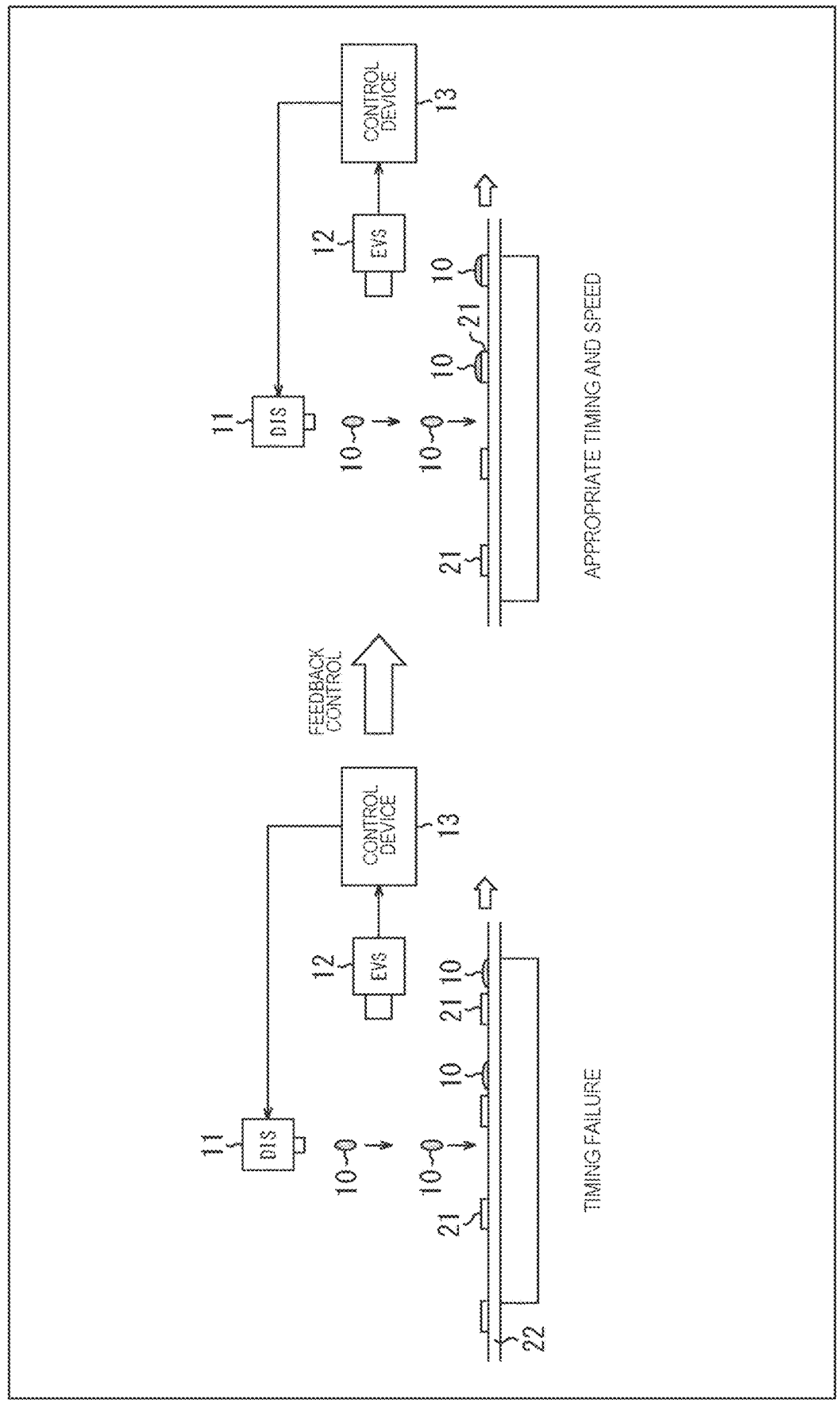
FIG. 2 is a diagram for explaining droplet control by the dispenser control system of FIG. 1.

FIG. 2 is a diagram for explaining droplet control by the dispenser control system 1.

In a case where a timing at which the dispenser 11 injects the droplet 10, a speed of the droplet 10, and the like are not appropriate, the droplets 10 are not accurately applied to the substrate 21 flowing on the conveyor 22 as illustrated on a left side of FIG. 2. The control device 13 calculates trajectory information of the droplet 10 including at least one of a position, a speed, a moving direction, or the like of the droplet 10 on the basis of the event data outputted from the EVS camera 12. Then, on the basis of the calculated trajectory information of the droplet 10, the control device 13 gives feedback, to the dispenser 11, on parameters for controlling an injection timing, an injection intensity, an injection direction, and the like of the droplet 10 as feedback control information. Furthermore, the control device 13 can also calculate a size, a volume, and the like of the droplet 10 on the basis of the event data, and can also control an amount and viscosity of the droplet 10. As a result, as illustrated on a right side of FIG. 2, it is possible to apply the droplet 10 of an appropriate timing and amount to the substrate 21. It is possible to appropriately determine what kind of parameter is supplied to the dispenser 11 as the feedback control information.

Furthermore, scattering of a conductive object leads to a short circuit and causes a defective product, so that it is possible to detect a droplet or the like called a satellite other than a main body of the droplet 10.

2. Example of Event Data

Figure 3:
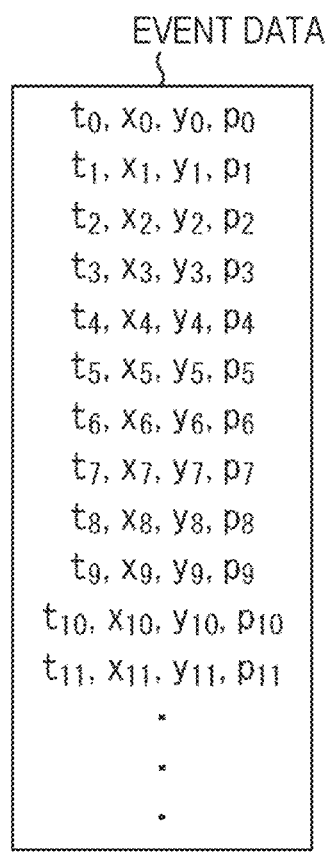
FIG. 3 is a view illustrating an example of event data outputted by an EVS camera.

FIG. 3 illustrates an example of event data outputted by the EVS camera 12.

For example, as illustrated in FIG. 3, the EVS camera 12 outputs event data including a time $t_i$ at which an event has occurred, coordinates $(x_i, y_i)$ representing a position of a pixel at which the event has occurred, and a polarity $p_i$ of a luminance change as the event.

The time $t_i$ of the event is a time stamp indicating a time when the event occurs, and is represented by, for example, a count value of a counter based on a predetermined clock signal in a sensor. It can be said that the time stamp corresponding to the timing at which the event has occurred is time information indicating the (relative) time at which the event has occurred, as long as an interval between events is maintained as it is at the time of occurrence of the event.

The polarity $p_i$ represents a direction of a luminance change in a case where a luminance change (a light amount change) exceeding a predetermined threshold value occurs as an event, and indicates whether the luminance change is a change in a positive direction (hereinafter, also referred to as positive) or a change in a negative direction (hereinafter, also referred to as negative). The polarity $p_i$ of the event is, for example, represented as "1" in a case of positive, and represented as "0" in a case of negative.

In the event data of FIG. 3, an interval between the time $t_i$ of a certain event and a time $t_{i+1}$ of an event adjacent to the event is not necessarily constant. That is, the time $t_i$ and the time $t_{i+1}$ of the events may be the same time or different times. However, it is assumed that there is a relationship represented by an expression $t_i \leq t_{i+1}$ for the times $t_i$ and $t_{i+1}$ of the events.

The event data is outputted every time an event occurs, unlike image data (frame data) in a frame format outputted in a frame cycle in synchronization with a vertical synchronization signal. Therefore, the event data as it is cannot be displayed as an image by a display such as a projector that displays an image corresponding to the frame data, and cannot be used for image processing by being inputted to an identifier (a classifier). The event data needs to be converted into frame data.

Figure 4:
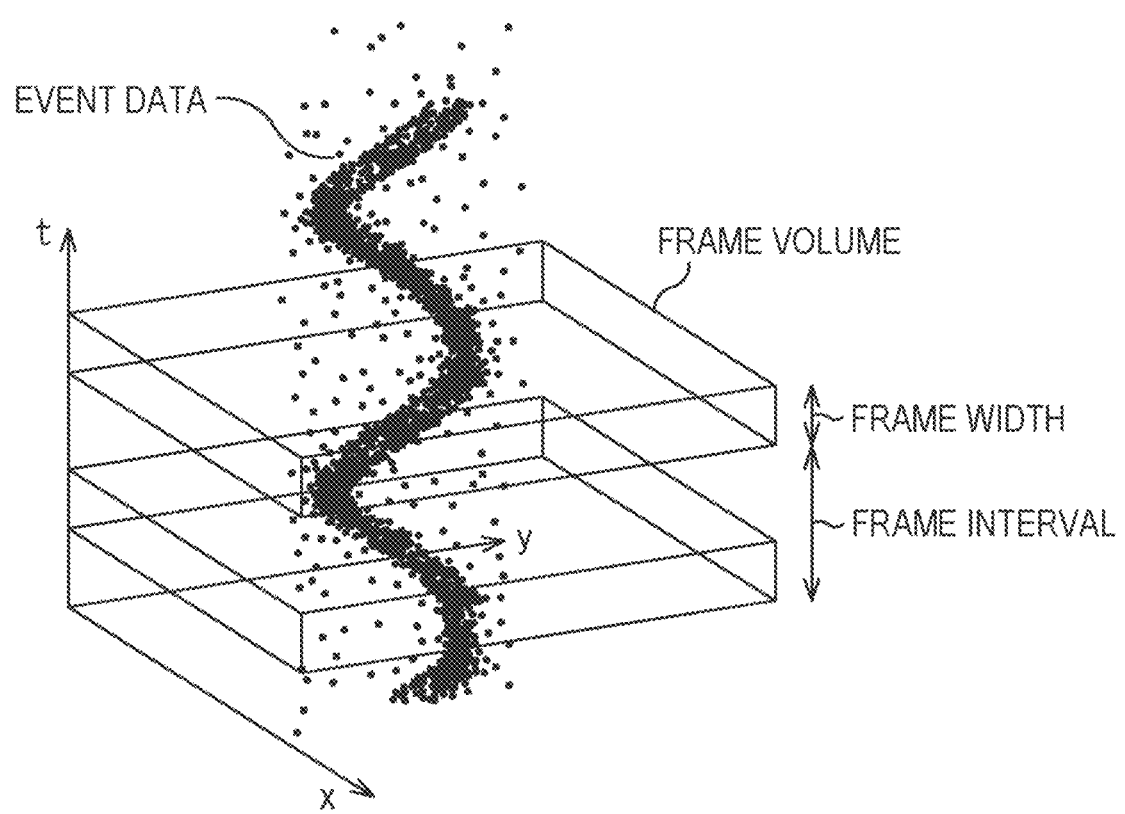
FIG. 4 is a view for explaining a method of generating frame data of event data.

FIG. 4 is a view for explaining an example of a method of generating frame data from event data.

In FIG. 4, in a three-dimensional (time) space including an x axis, a y axis, and a time axis t, points as event data are plotted at the time t of an event included in the event data and coordinates (x, y) as pixels of the event.

That is, assuming that the position (x, y, t) in the three-dimensional space represented by the time t of the event included in the event data and the pixel (x, y) of the event is referred to as a spatiotemporal position of the event, event data is plotted as points at the spatiotemporal position of the event (x, y, t), in FIG. 4.

By using the event data outputted from the EVS camera 12 as a pixel value, an event image can be generated using event data within a predetermined frame width from the beginning of a predetermined frame interval for every predetermined frame interval.

The frame width and the frame interval can be designated by time or designated by the number of pieces of event data. One of the frame width and the frame interval may be designated by time, and another may be designated by the number of pieces of event data.

Here, in a case where the frame width and the frame interval are designated by time, and the frame width and the frame interval are the same, the frame volume is in a state of being in contact with each other without a gap. Furthermore, in a case where the frame interval is larger than the frame width, the frame volume is in a state of being arranged with a gap. In a case where the frame width is larger than the frame interval, the frame volume in a state of being arranged in a partially overlapping manner.

The generation of the event image can be performed, for example, by setting (a pixel value of) a pixel at the position (x, y) of the event in the frame to white and setting pixels at other positions in the frame to a predetermined color such as gray.

Furthermore, in a case where the polarity of the light amount change as the event is distinguished for the event data, the generation of the frame data may be performed by, for example, setting the pixel to white in a case where a polarity is positive, setting the pixel to black in a case where the polarity is negative, and setting pixels at other positions of the frame to a predetermined color such as gray.

Figure 5:
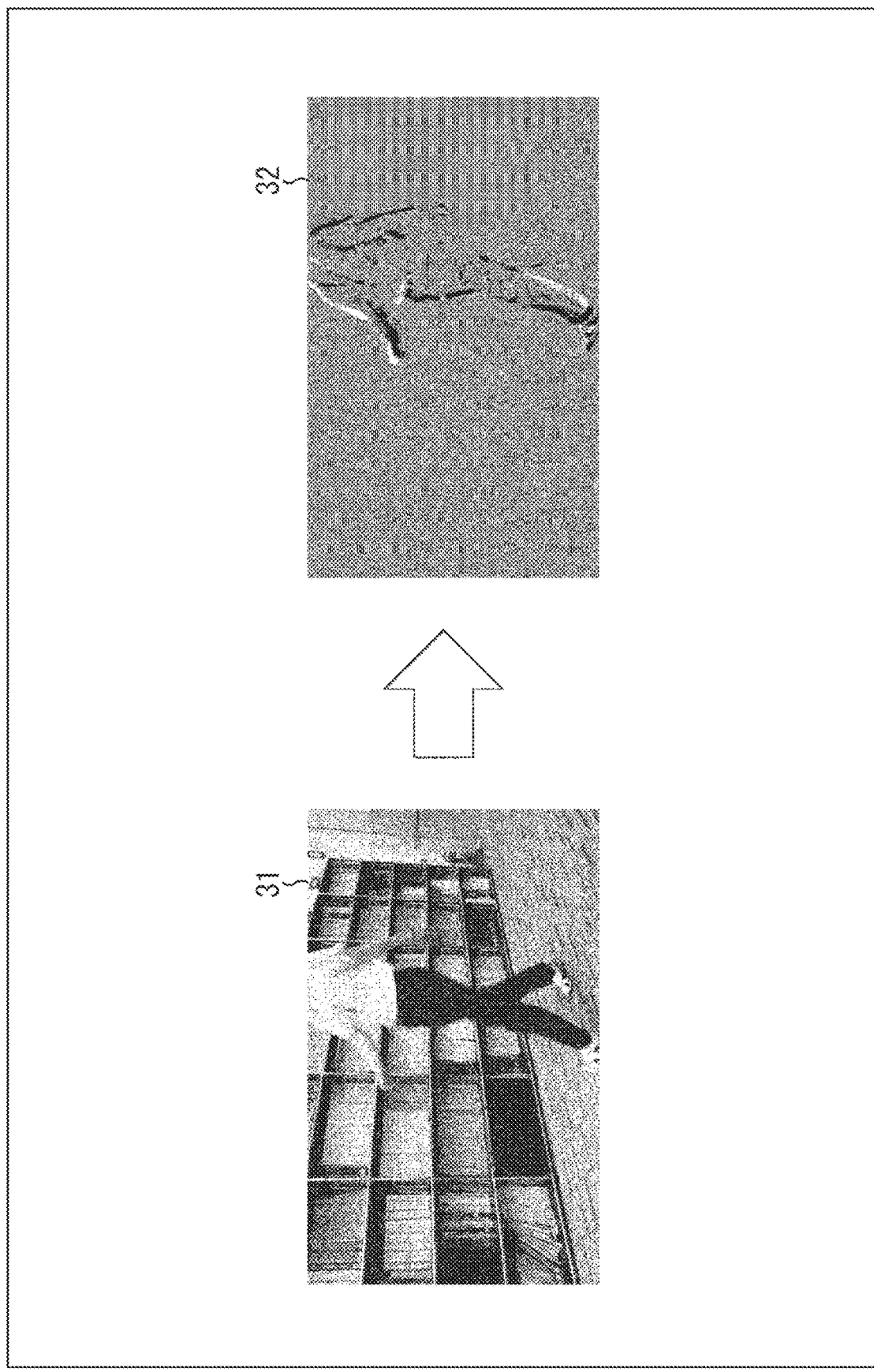
FIG. 5 is a view illustrating an example of an event image generated on the basis of event data.

FIG. 5 illustrates an example of an event image generated on the basis of event data.

An image 31 in FIG. 5 is an image obtained by image-capturing of a detection target of the EVS camera 12 with an image sensor that outputs an RGB image. In the image 31, a scene is captured in which a person walks in front of a bookshelf as a background. When the captured scene is detected by the EVS camera 12 and frame data is generated on the basis of the outputted event data, an event image 32 is obtained. The event image 32 is generated by setting white to a pixel having a positive polarity, setting black to a pixel having a negative polarity, and setting gray to pixels at other positions in the frame.

3. Droplet Image-Capturing Method

Figure 6:
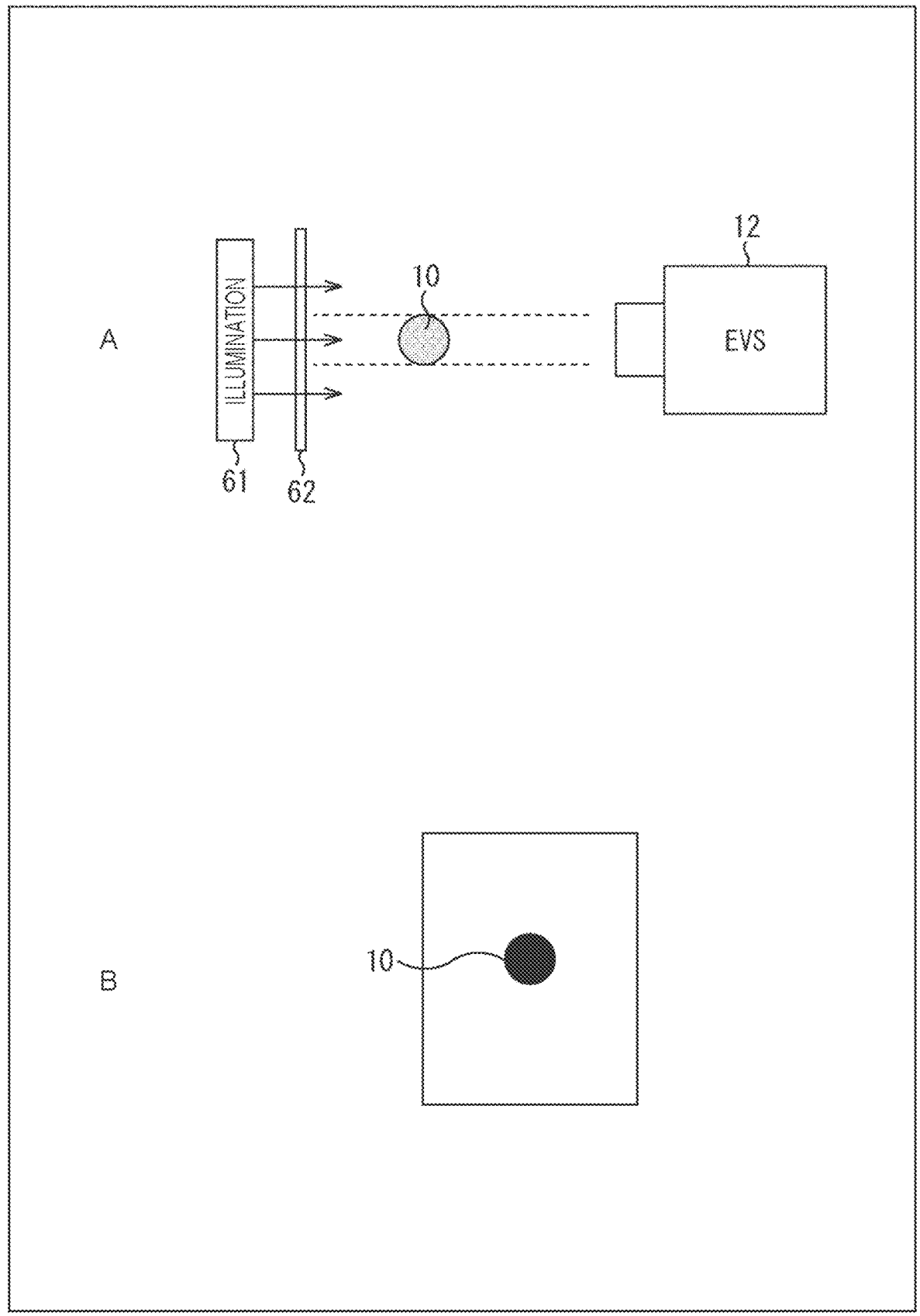
FIG. 6 is a diagram illustrating a first arrangement example of an illumination device.
Figure 7:
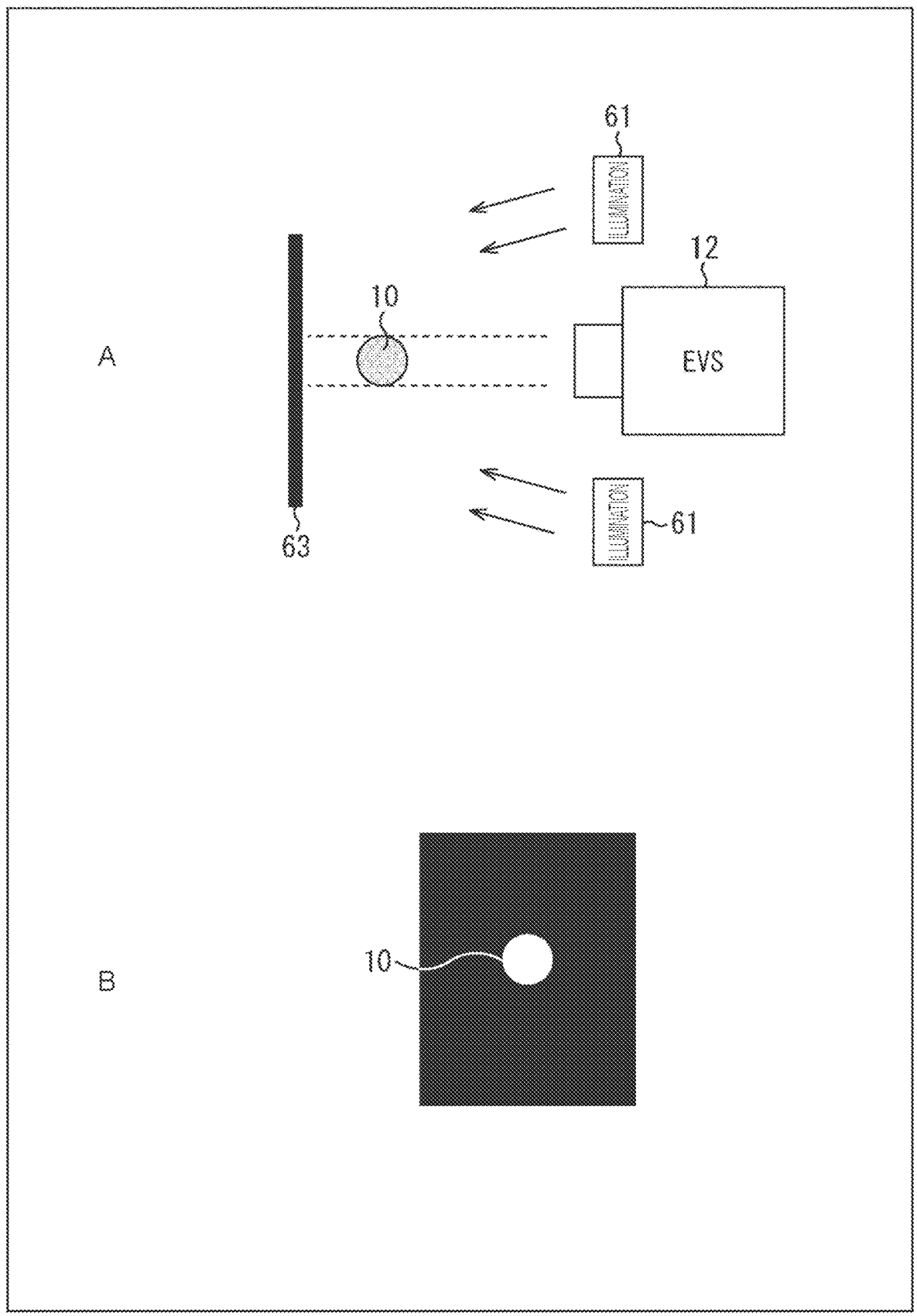
FIG. 7 is a diagram illustrating a second arrangement example of the illumination device.

FIGS. 6 and 7 illustrate an example of an arrangement relationship between the EVS camera 12 and an illumination device.

An illumination device 61 is set at a position where a background of the droplet 10 becomes uniform and contrast with the droplet 10 is generated, and irradiates the droplet 10 with light.

FIG. 6 is a diagram illustrating a first arrangement example of the illumination device 61.

In the first arrangement example, as illustrated in A of FIG. 6, the EVS camera 12 and the illumination device 61 are arranged to face each other so as to sandwich the droplet 10. In other words, the illumination device 61 illuminates from behind the droplet 10, and the EVS camera 12 detects a luminance change of the droplet 10 illuminated from the back. In front of the illumination device 61, a diffuser 62 is disposed. In a case where an image of the droplet 10 is captured in this arrangement, the droplet 10 is captured as a black silhouette as illustrated in B of FIG. 6.

FIG. 7 is a diagram illustrating a second arrangement example of the illumination device 61.

In the second arrangement example, as illustrated in A of FIG. 7, the EVS camera 12 and the illumination device 61 are arranged in the same direction with respect to the droplet 10. On a background side of the droplet 10, a black antireflection plate 63 or the like is arranged to prevent reflection of light. In a case where an image of the droplet 10 is captured in this arrangement, the droplet 10 is captured as a while silhouette as illustrated in B of FIG. 7.

In the present embodiment, the second arrangement example illustrated in FIG. 7 is adopted as an arrangement of the illumination device 61, and the EVS camera 12 captures an image of the droplet 10 from the same direction as the illumination device 61.

Figure 8:
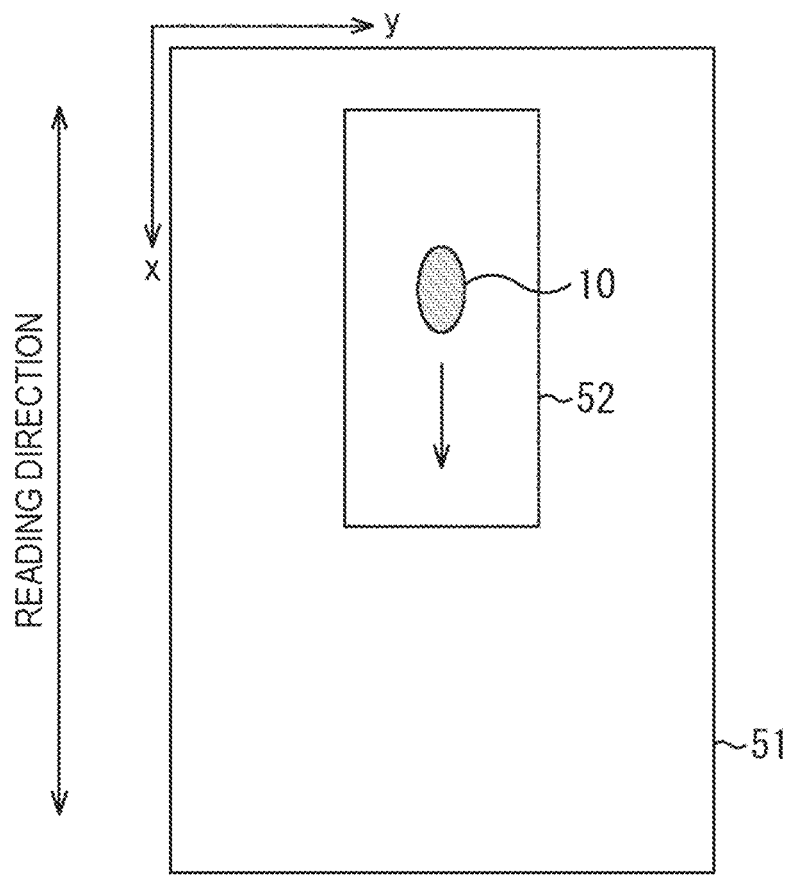
FIG. 8 is a diagram illustrating an image-capturing direction of the EVS camera with respect to a moving direction of a droplet.

FIG. 8 is a diagram illustrating an image-capturing direction of the EVS camera 12 with respect to a moving direction of the droplet 10.

The EVS camera 12 includes a light receiving part 51 in which pixels for detecting a luminance change are two-dimensionally arranged in a matrix. Assuming that a vertical direction of the light receiving part 51 in FIG. 8 is an x-axis direction and a horizontal direction in FIG. 8 is a y-axis direction, when an event has occurred, the EVS camera 12 performs a reading operation of reading a signal in units of columns in the x-axis direction of the light receiving part 51. In this case, as illustrated in FIG. 8, an orientation of the EVS camera 12 is arranged such that a reading direction of the pixel signal coincides with the moving direction of the droplet 10. As a result, for example, in a case where a plurality of droplets 10 passes through the light receiving part 51 of the EVS camera 12, the plurality of droplets 10 is arranged along the reading direction of the pixel signal. Therefore, it is possible to simultaneously acquire signals of the plurality of droplets 10 by reading the pixel signal of one column.

Furthermore, the EVS camera 12 can set a predetermined region of interest 52 with respect to the entire region of the light receiving part 51, and read only a signal of the set region of interest 52. Due to the arrangement in which the reading direction of the pixel coincides with the moving direction of the droplet 10, the number of columns (the number of pixels in the y-axis direction) from which signals are read can be reduced, and a reading speed (a detection speed) can be improved.

Figure 9:
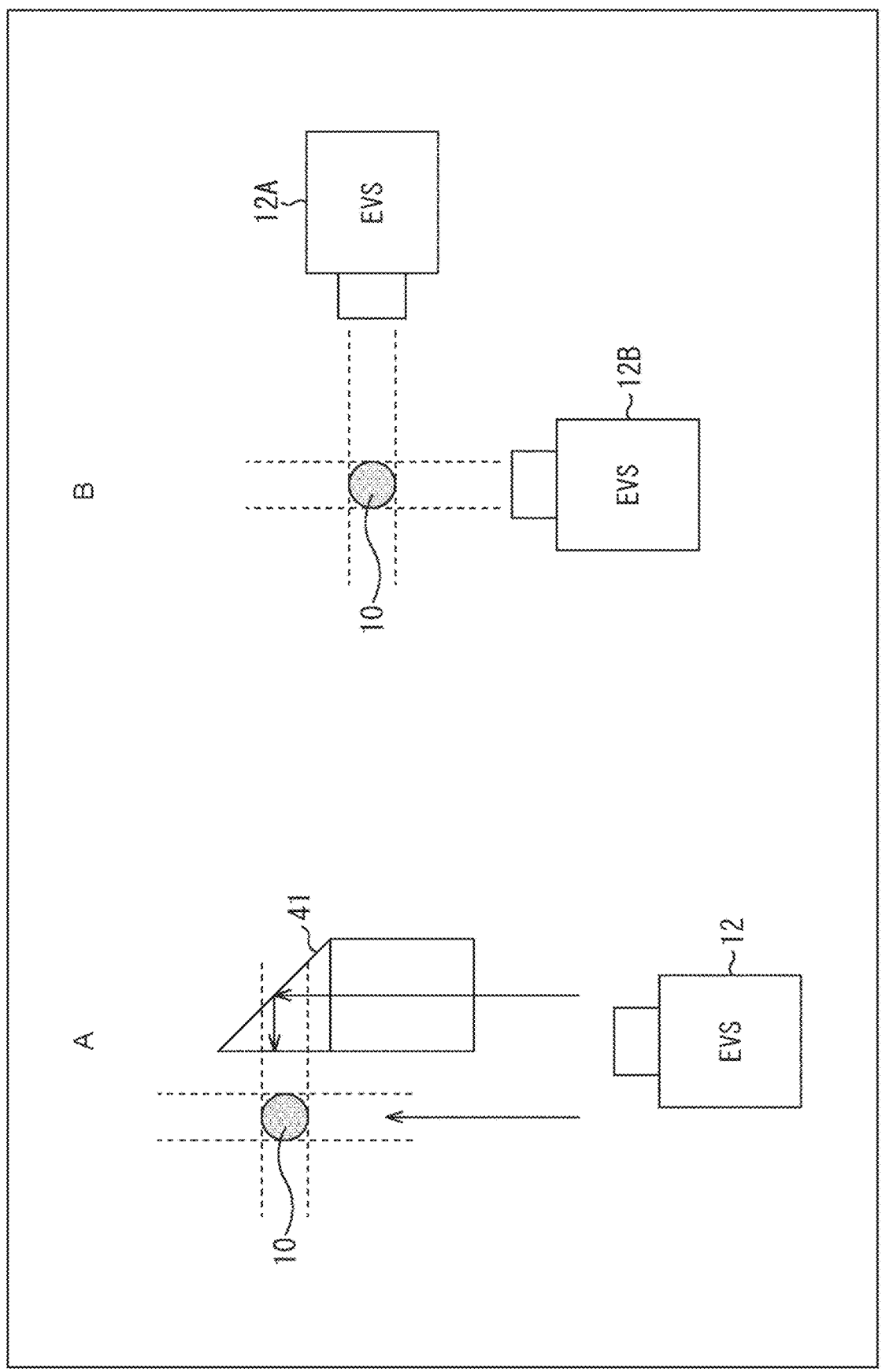
FIG. 9 is a diagram for explaining an image-capturing method in a case of measuring a volume of a droplet.

FIG. 9 is a diagram for explaining an image-capturing method in a case of measuring a volume of the droplet 10.

In a case of measuring a volume of the droplet 10, it is necessary to measure an area of the droplet 10 on a plane perpendicular to a falling direction of the droplet 10. Therefore, the EVS camera 12 detects the droplet 10 from two orthogonal directions by any method of A or B of FIG. 9. In FIG. 9, a direction perpendicular to the page represents the falling direction of the droplet 10.

A of FIG. 9 is an example of a first image-capturing method for the droplet 10 in a case of measuring a volume.

The first image-capturing method is a method in which a prism 41 is disposed in front of the EVS camera 12, and one EVS camera 12 detects the droplet 10 in two directions of a first direction in which the droplet 10 is directly viewed and a second direction orthogonal to the first direction via the prism 41 at one time.

B of FIG. 9 is an example of a second image-capturing method for the droplet 10 in a case of measuring a volume.

The second image-capturing method is a method in which two EVS cameras 12A and 12B are arranged in orthogonal directions, and each of the two EVS cameras 12A and 12B captures an image from one direction, to detect the droplet 10 in the two orthogonal directions. The image-capturing is performed in a state where time stamps of the EVS cameras 12A and 12B are synchronized with each other.

In droplet control processing to be described later, the calculation of the volume is omitted while a lateral width of the droplet 10 is calculated. However, in a case of calculating the volume of the droplet 10, the volume of the droplet 10 is calculated from an area of the droplet 10 calculated from an image-capturing result obtained by the first or second image-capturing method described above and a length in the moving direction of the droplet 10.

4. Configuration Example of Control Device

Figure 10:
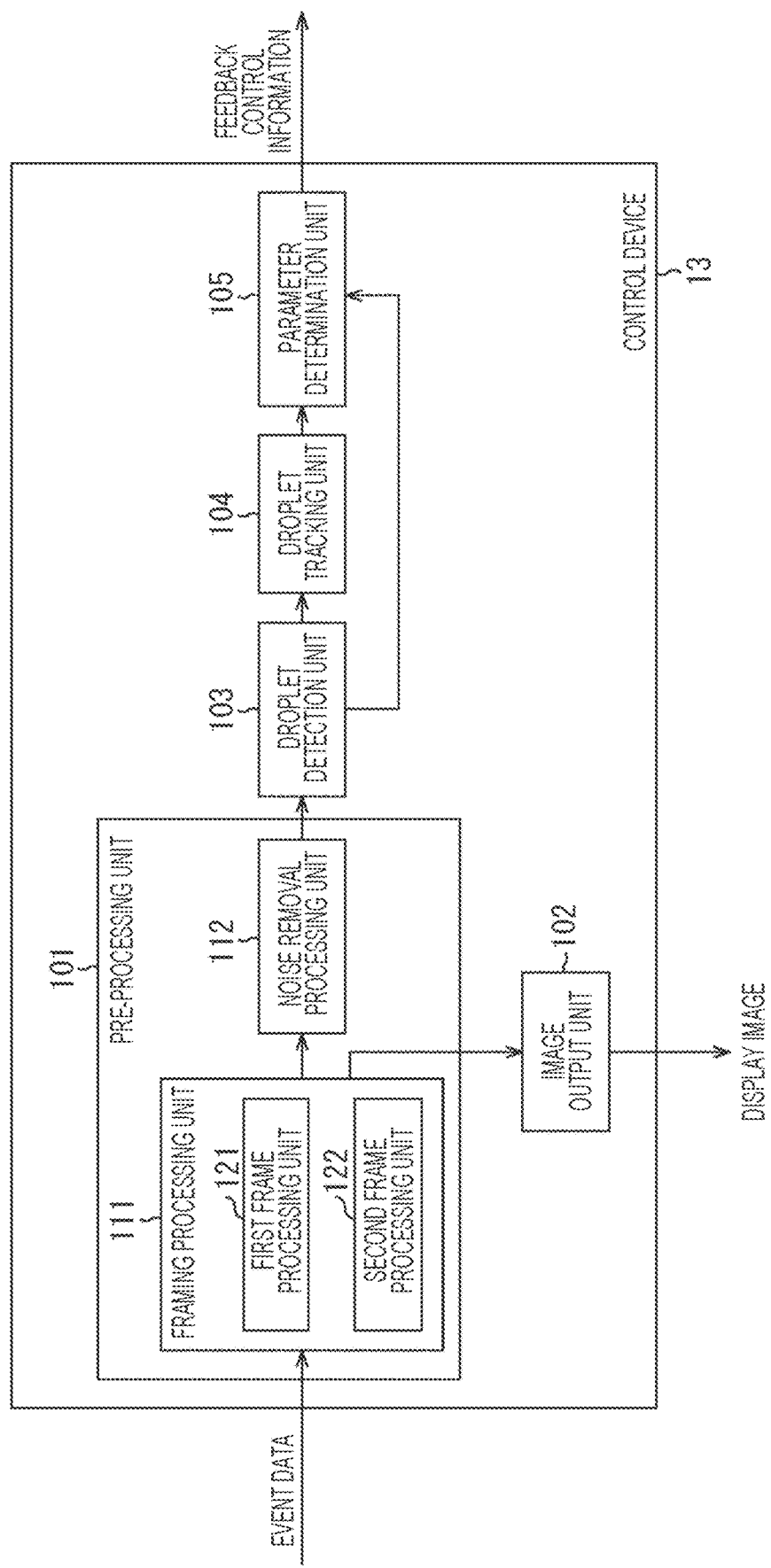
FIG. 10 is a block diagram illustrating a functional configuration example of a control device.

FIG. 10 is a block diagram illustrating a functional configuration example of the control device 13.

The control device 13 includes a pre-processing unit 101, an image output unit 102, a droplet detection unit 103, a droplet tracking unit 104, and a parameter determination unit 105.

As pre-processing for detecting the droplet 10, the pre-processing unit 101 generates three types of images, that is, an event image, a reconfigured image, and a display image, on the basis of event data outputted from the EVS camera 12.

The pre-processing unit 101 includes a framing processing unit 111 and a noise removal processing unit 112, and the framing processing unit 111 includes a first frame processing unit 121 and a second frame processing unit 122.

The first frame processing unit 121 generates an event image on the basis of the event data from the EVS camera 12. The first frame processing unit 121 generates, as event images, a positive event image based on a positive event and a negative event image based on a negative event. Furthermore, the first frame processing unit 121 also generates a display image on the basis of the positive event image and the negative event image.

The second frame processing unit 122 estimates a luminance value on the basis of the event data from the EVS camera 12, to generate a reconfigured image.

The framing processing unit 111 supplies the generated event image and reconfigured image to the noise removal processing unit 112, and supplies the display image to the image output unit 102. As will be described later with reference to FIGS. 13 and 18, the event image and the reconfigured image are formed with a binary image of white and black, and the display image is formed with a ternary image of white, black, and gray.

The noise removal processing unit 112 performs noise removal processing of removing noise on each of the event image and the reconfigured image, which are binary images. Although specific processing will be described later with reference to FIG. 20, the noise removal processing unit 112 performs filter processing using expansion processing and contraction processing on white pixels as the noise removal processing. The event image and the reconfigured image after the noise removal processing are supplied to the droplet detection unit 103 and the droplet tracking unit 104.

The image output unit 102 supplies the display image supplied from the framing processing unit 111, to the display 14.

The droplet detection unit 103 detects the droplet 10 from each of the event image and the reconfigured image supplied from the pre-processing unit 101. The droplet detection unit 103 supplies information regarding the droplet 10 detected from the event image to the droplet tracking unit 104 as information about a tracking target. Furthermore, the droplet detection unit 103 calculates a size of the droplet 10 from the droplet 10 detected from the reconfigured image, and supplies the size to the parameter determination unit 105.

The droplet tracking unit 104 tracks the droplet 10 detected from the event image in the droplet detection unit 103, calculates trajectory information of the droplet 10 including at least one of a position, a speed, a moving direction, or the like of the droplet 10, and supplies the trajectory information to the parameter determination unit 105.

The parameter determination unit 105 determines whether or not parameters of the dispenser 11 for control of an ejection timing, an injection direction, and the like are within a normal range, on the basis of the trajectory information of the droplet 10 supplied from the droplet tracking unit 104. Furthermore, the parameter determination unit 105 determines whether or not an ejection amount per one time is within a normal range, on the basis of a size (a width) and a volume of the droplet 10 supplied from the droplet detection unit 103. In a case where it is determined that the parameter is not within the normal range, the parameter determination unit 105 generates control information for correcting the parameter as feedback control information, and outputs the control information to the dispenser 11.

Hereinafter, processing executed by each unit of the control device 13 will be described in more detail.

5. Processing of First Frame Processing Unit

First, with reference to FIGS. 11 to 14, generation of an event image and a display image by the first frame processing unit 121 will be described.

The first frame processing unit 121 generates a positive event image based on a positive event and a negative event image based on a negative event, on the basis of event data from the EVS camera 12.

Figure 11:
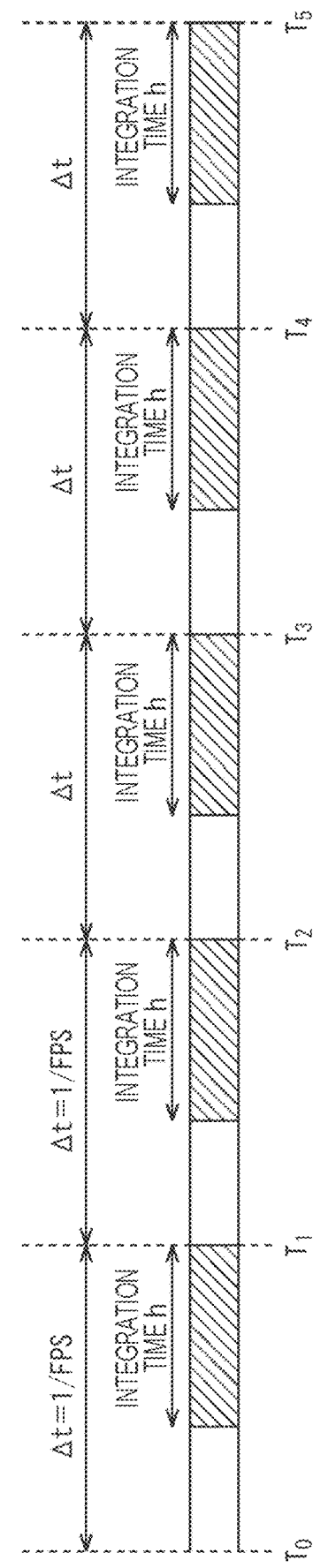
FIG. 11 is a view for explaining generation of an event image and a display image by a first frame processing unit.

FIG. 11 is a view illustrating units of generation of individual event images in a case where the first frame processing unit 121 generates an event image.

The first frame processing unit 121 starts detection of an event (capturing an image of the droplet 10) at a time $T_0$, and performs framing of an i-th frame, that is, generation of an event image, at a time $T_i$ (i is a positive integer). Time $\Delta t$ from a time $T_{i-1}$ to the time $T_i$ corresponds to the frame interval described in FIG. 4, and corresponds to a reciprocal of a frame rate FPS, which is the number of event images to be framed per second. The time $\Delta t$ is a period of one frame corresponding to the frame rate, and is also referred to as one frame period $\Delta t$.

The first frame processing unit 121 generates an image in which the event data from the EVS camera 12 is collected in unit of a predetermined integration time h, as an event image of the i-th frame at the time $T_i$ at which framing of the i-th frame is performed. More specifically, the first frame processing unit 121 generates the event image of the i-th frame on the basis of event data in which the time t is from a time $(T_i-h)$ to the time $T_i$.

Figure 12:
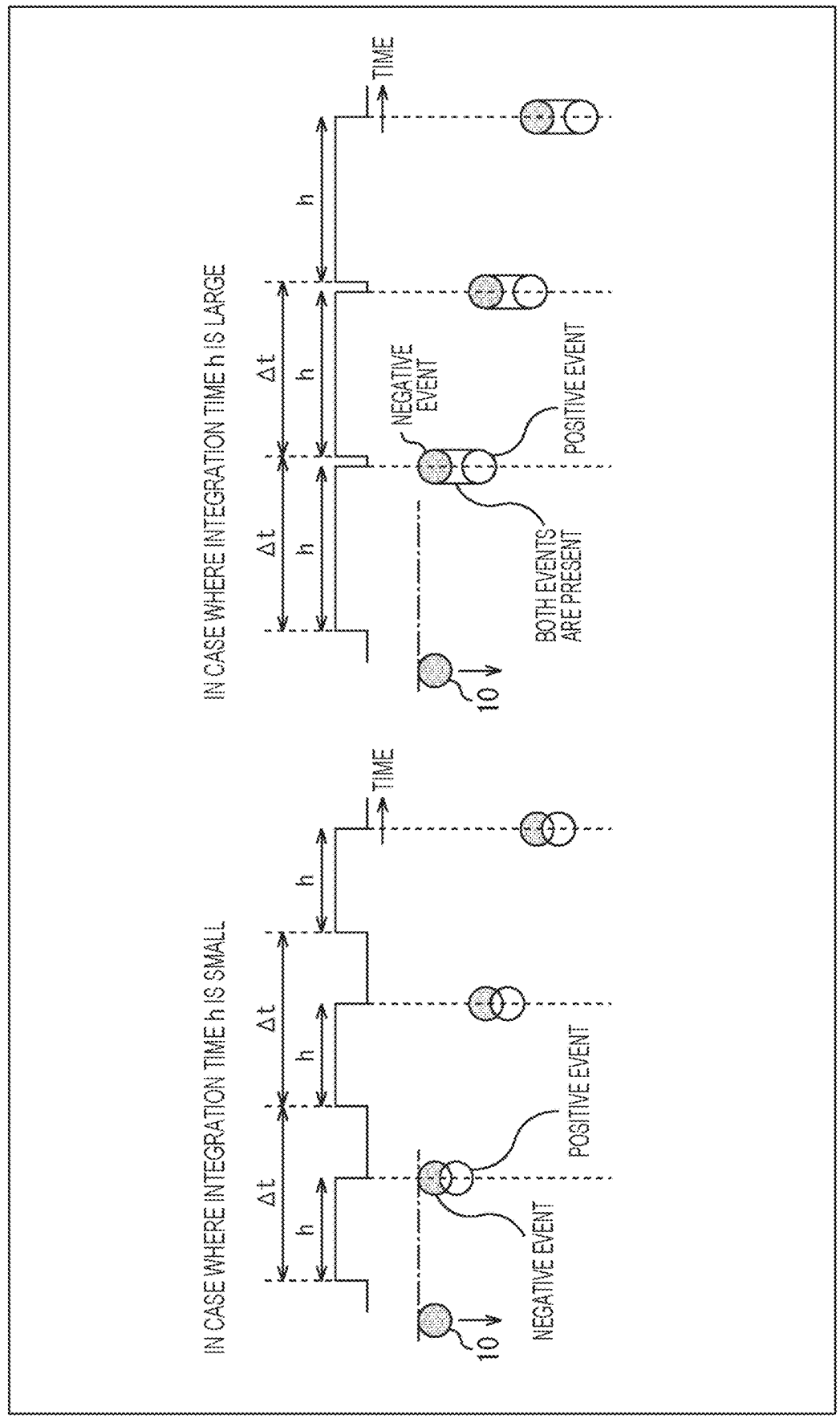
FIG. 12 is a view for explaining generation of an event image and a display image by the first frame processing unit.

Here, the predetermined integration time h is shorter than one frame period $\Delta t$. When the predetermined integration time h is changed, a shape of the droplet 10 in the event image changes as illustrated in FIG. 12. By setting the integration time h separately from the one frame period $\Delta t$ without fixing the integration time h to the one frame period $\Delta t$ (h=$\Delta t$ is not fixed), a frequency of framing (a frame rate) and the shape of the droplet 10 in the event image can be separately set.

In the predetermined integration time h from the time $(T_i-h)$ to the time $T_i$, the first frame processing unit 121 generates a binary image in which a pixel value of a pixel (x, y) where a positive event is detected is set to 1 (white) and pixel values of other pixels are set to 0 (black), and sets as the positive event image of the i-th frame.

Furthermore, in the predetermined integration time h from the time $(T_i-h)$ to the time $T_i$, the first frame processing unit 121 generates a binary image in which a pixel value of a pixel (x, y) where a negative event is detected is set to 1 (white) and pixel values of other pixels are set to 0 (black), and sets as the negative event image of the i-th frame.

Moreover, the first frame processing unit 121 generates a ternary image in which a pixel value of a pixel of 1 (white) is set to 255 (white) in the positive event image of the i-th frame, a pixel value of a pixel of 1 (white) is set to 0 (black) in the negative event image of the i-th frame, and pixel values of other pixels are set to 128 (gray), and sets as an i-th frame display image.

Figure 13:
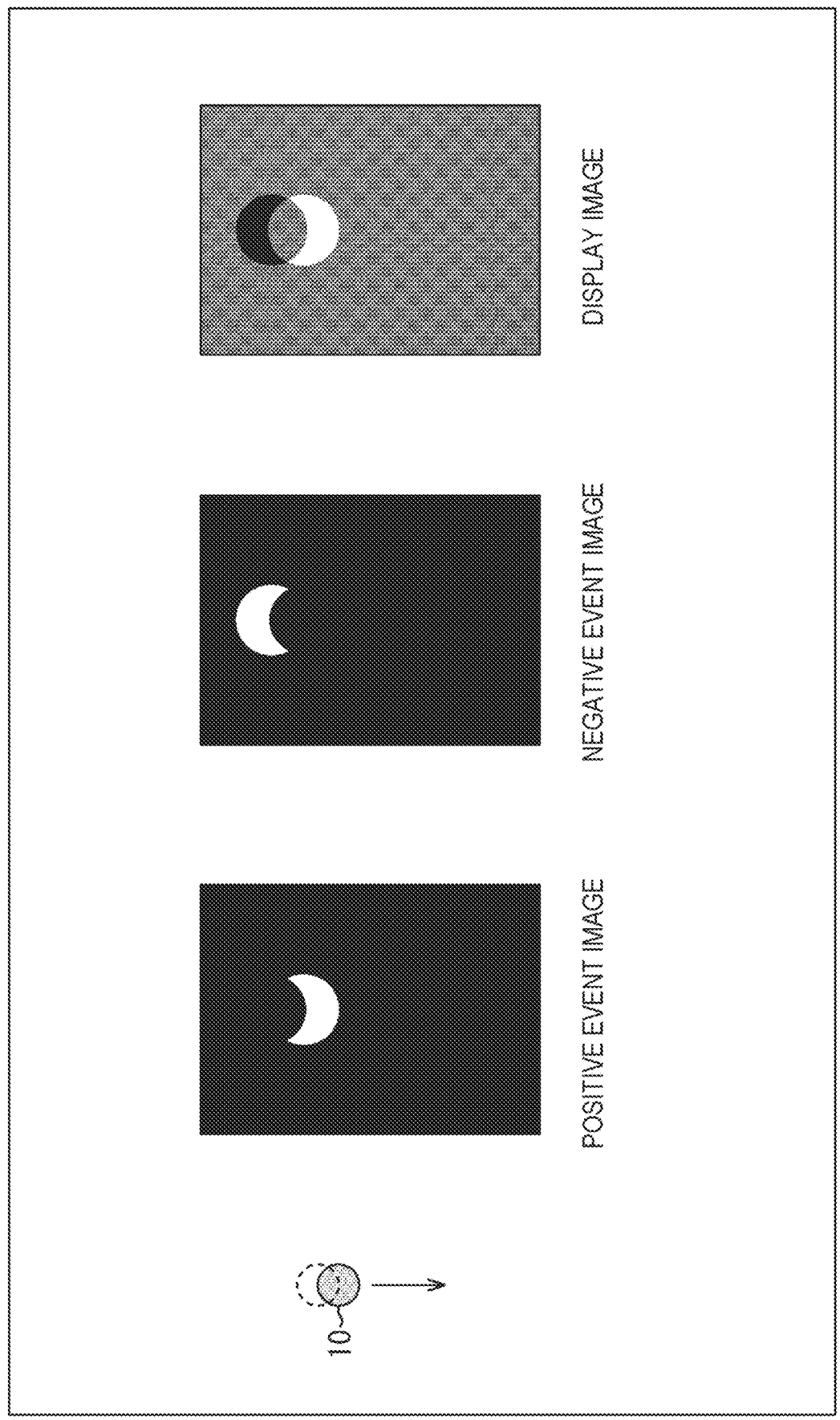
FIG. 13 is a view for explaining generation of an event image and a display image by the first frame processing unit.

FIG. 13 illustrates examples of a positive event image, a negative event image, and a display image generated by the first frame processing unit 121.

With reference to a flowchart in FIG. 14, the first framing processing executed by the first frame processing unit 121 will be described. This processing is started, for example, at the same time as a start of image-capturing by the EVS camera 12.

Figure 14:
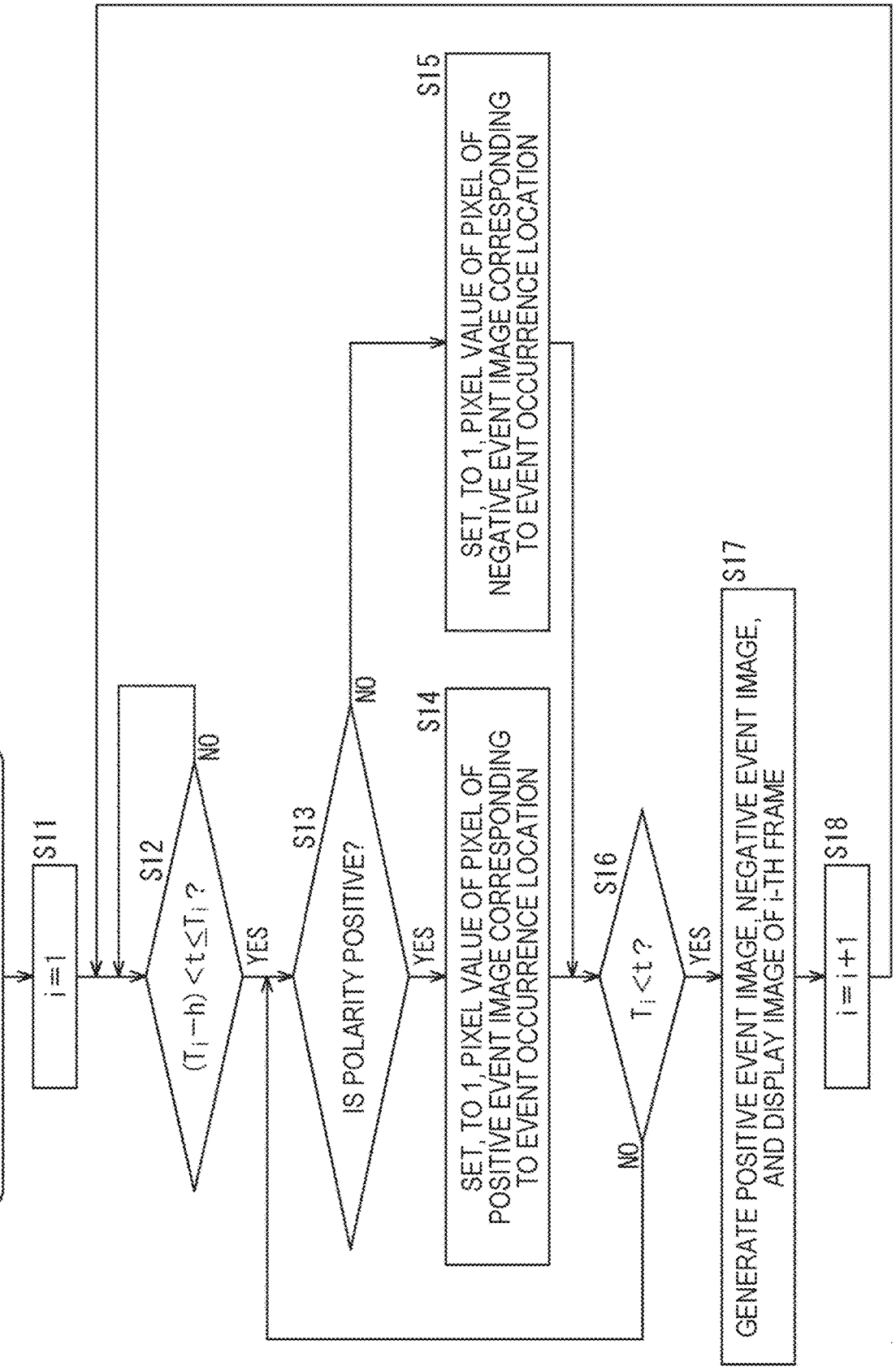
FIG. 14 is a flowchart illustrating first framing processing by the first frame processing unit.

The first frame processing unit 121 executes the first framing processing of FIG. 14 while acquiring event data supplied from the EVS camera 12 at a timing at which an event is detected. Time information (the time t) is synchronized between the EVS camera 12 and the control device 13.

First, in step S11, the first frame processing unit 121 sets 1 to a variable i for identifying a frame number.

In step S12, the first frame processing unit 121 determines whether the time t is larger than the time $(T_i-h)$ and equal to or less than the time $T_i$, and repeats the determination processing in step S12 until it is determined that the time t is larger than the time $(T_i-h)$ and equal to or less than the time $T_i$.

Then, when it is determined in step S12 that the time t is larger than the time $(T_i-h)$ and equal to or less than the time $T_i$, the processing proceeds to step S13, and it is determined whether a polarity p of the event data supplied from the EVS camera 12 is positive.

When it is determined in step S13 that the polarity p of the event data supplied from the EVS camera 12 is positive, the processing proceeds to step S14, and the first frame processing unit 121 sets, to "1", a pixel value of a pixel of a positive event image corresponding to an event occurrence location of the event data supplied from the EVS camera 12.

Whereas, when it is determined in step S13 that the polarity p of the event data supplied from the EVS camera 12 is negative, the processing proceeds to step S15, and the first frame processing unit 121 sets, to "1", a pixel value of a pixel of a negative event image corresponding to an event occurrence location of the event data supplied from the EVS camera 12.

After step S14 or S15, the processing proceeds to step S16, and the first frame processing unit 121 determines whether the time t has exceeded the time $T_i$. When it is determined in step S16 that the time t has not yet exceeded the time $T_i$, the processing returns to step S13, and the processing of steps S13 to S16 described above is repeated.

Whereas, when it is determined in step S16 that the time t has exceeded the time $T_i$, the processing proceeds to step S17, and the first frame processing unit 121 generates a positive event image, a negative event image, and a display image of the i-th frame. More specifically, the first frame processing unit 121 generates, as the positive event image, a binary image in which the pixel whose pixel value is set to "1" in step S14 described above is set to white and other pixels are set to black. Furthermore, the first frame processing unit 121 generates, as a negative event image, a binary image in which the pixel whose pixel value is set to "1" in step S15 described above is set to white and other pixels are set to black. Moreover, the first frame processing unit 121 generates, as the display image, a ternary image in which the pixel value of the pixel whose pixel value is set to "1" in the positive event image is set to 255 (white), the pixel value of the pixel whose pixel value is set to "1" in the negative event image is 0 (black), and the pixel values of other pixels are set to 128 (gray).

Next, in step S18, the first frame processing unit 121 increments the variable i for identifying the frame number by 1, and then returns the processing to step S12. Thereafter, the processing in steps S12 to S18 described above is repeatedly executed, and the first framing processing in FIG. 14 ends when an instruction is given to end the operation of the entire dispenser control system 1 or the control device 13.

As described above, according to the first framing processing, a positive event image and a negative event image are generated by setting a predetermined pixel value in accordance with a place where an event occurs.

6. Processing of Second Frame Processing Unit

Next, with reference to FIGS. 15 to 18, generation of a reconfigured image by the second frame processing unit 122 will be described.

The second frame processing unit 122 estimates a luminance value on the basis of the event data from the EVS camera 12, to generate a reconfigured image.

As illustrated in FIG. 13, in the positive event image and the negative event image, portions corresponding to a leading end and a trailing end in a moving direction of the droplet 10 are extracted due to a luminance change with respect to the background, so that a shape and a size of the entire droplet 10 are unknown. Therefore, the second frame processing unit 122 generates a reconfigured image by simply restoring a luminance value from the supplied event data to enable recognition of a silhouette of the entire droplet 10.

Figure 15:
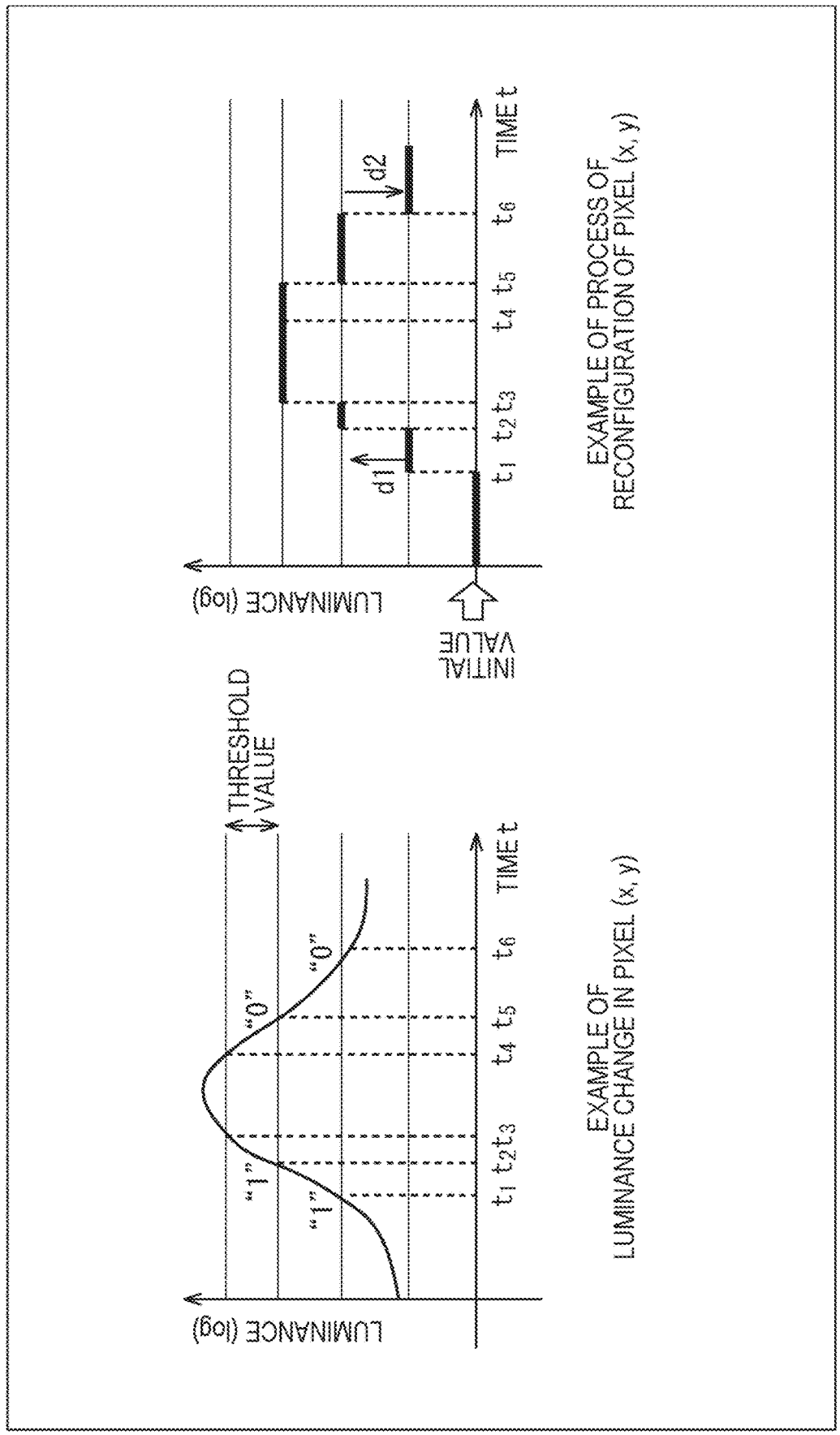
FIG. 15 is a view for explaining generation of a reconfigured image by a second frame processing unit.

For example, as illustrated in a graph on a left side of FIG. 15, it is assumed that a positive event ("1") occurs from time $t_1$ to time $t_2$, a positive event ("1") occurs from time $t_2$ to time $t_3$, a negative event ("0") occurs from time $t_4$ to time $t_5$, and a negative event ("0") occurs from time $t_5$ to time $t_6$, in a predetermined pixel (x, y).

In a case where a luminance threshold value of the positive event is d1 and a luminance threshold value of the negative event is d2, as illustrated in a graph on a right side of FIG. 15, the second frame processing unit 122 estimates, as the luminance value of the pixel (x, y), a luminance value of a pixel (x, y) obtained by adding d1 in accordance with the positive event from time $t_1$ to time $t_2$, adding d1 in accordance with the positive event from time $t_2$ to time $t_3$, subtracting d2 in accordance with the negative event from time $t_4$ time $t_5$, and subtracting d2 in accordance with the negative event from time $t_6$ from time $t_5$. In this way, by accumulating the luminance according to the event having occurred in the past, it is possible to simply restore the luminance value and generate the reconfigured image. Note that the threshold value d1 and the threshold value d2 may be the same value or different values.

In the present embodiment, since an image of the droplet 10 is captured with the illumination arrangement illustrated in FIG. 7, the background is darkest. When a luminance value of the background is set to 0, the luminance value does not become a negative value smaller than 0. Therefore, in a case where the luminance value becomes a negative value due to accumulation of the luminance values described above, the second frame processing unit 122 performs processing of resetting the luminance value to 0.

Figure 16:
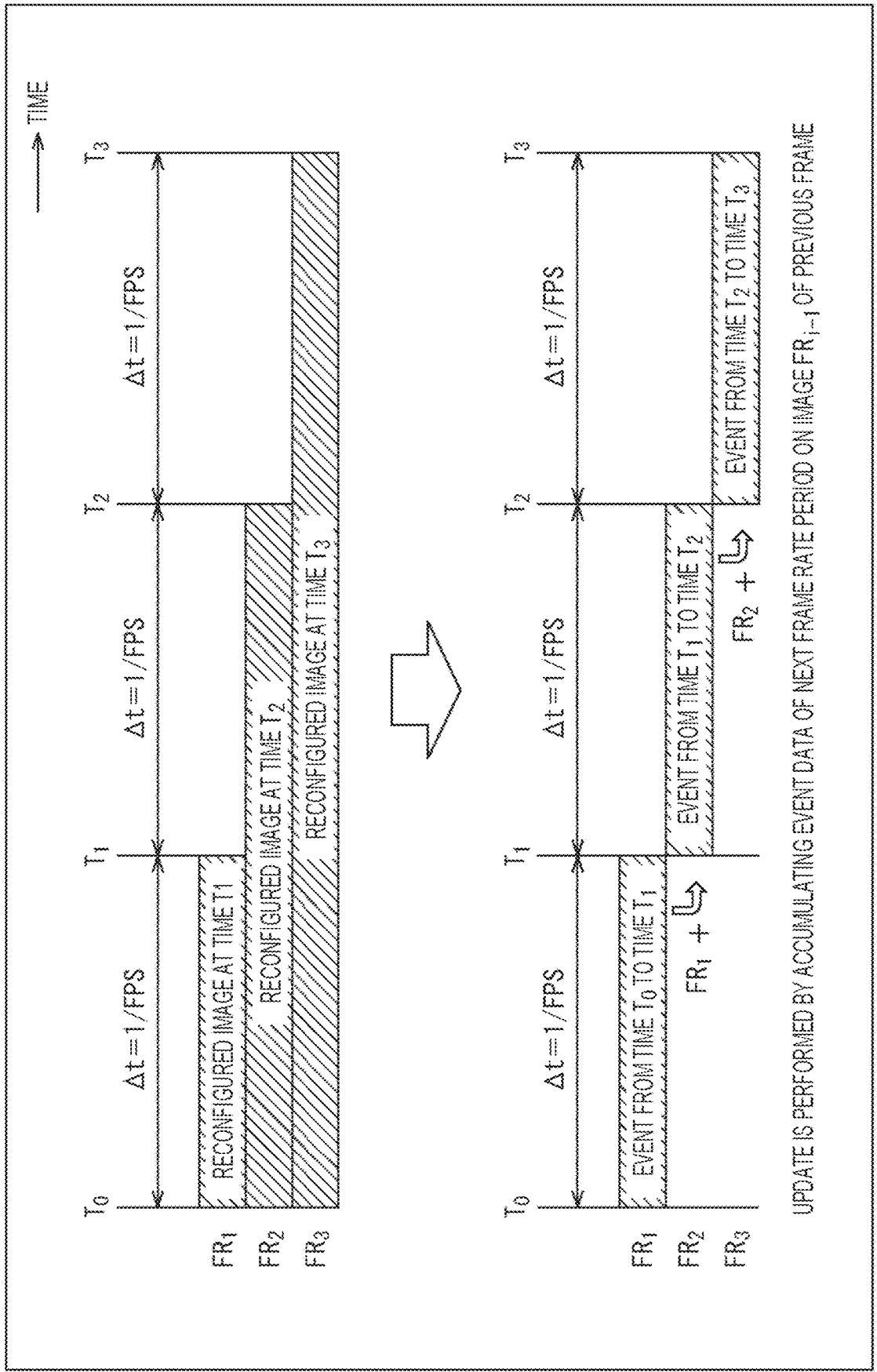
FIG. 16 is a view for explaining generation of a reconfigured image by the second frame processing unit.

FIG. 16 is a view for explaining specific processing in a case where the second frame processing unit 122 generates a reconfigured image.

The second frame processing unit 122 generates a reconfigured image for every time $T_1$, that is, in unit of a frame rate period corresponding to the frame rate. For example, in a case of generating a reconfigured image of the i-th frame, the second frame processing unit 122 generates a reconfigured image in which the luminance value is estimated by accumulating all the past events from the time $T_0$ at which the event detection is started to the time $T_i$ at which the i-th frame is framed.

More specifically, for example, as illustrated in an upper part of FIG. 16, a reconfigured image $FR_1$ of the first frame is generated by accumulating events from time $T_0$ to time $T_1$. A reconfigured image $FR_2$ of the second frame is generated by accumulating events from the time $T_0$ to the time $T_2$. A reconfigured image $FR_3$ of the third frame is generated by accumulating events from the time $T_0$ to the time $T_3$.

However, in actual calculation, as illustrated in a lower part of FIG. 16, in a case of generating a reconfigured image $FR_i$ of the i-th frame, the reconfigured image $FR_i$ is generated by accumulating events in the next frame rate period (from the time $T_{i-1}$ to the time $T_i$), to a luminance value of a reconfigured image $FR_{i-1}$ of the previous frame.

With reference to a flowchart in FIG. 17, the second framing processing executed by the second frame processing unit 122 will be described. This processing is started, for example, at the same time as a start of image-capturing by the EVS camera 12.

Figure 17:
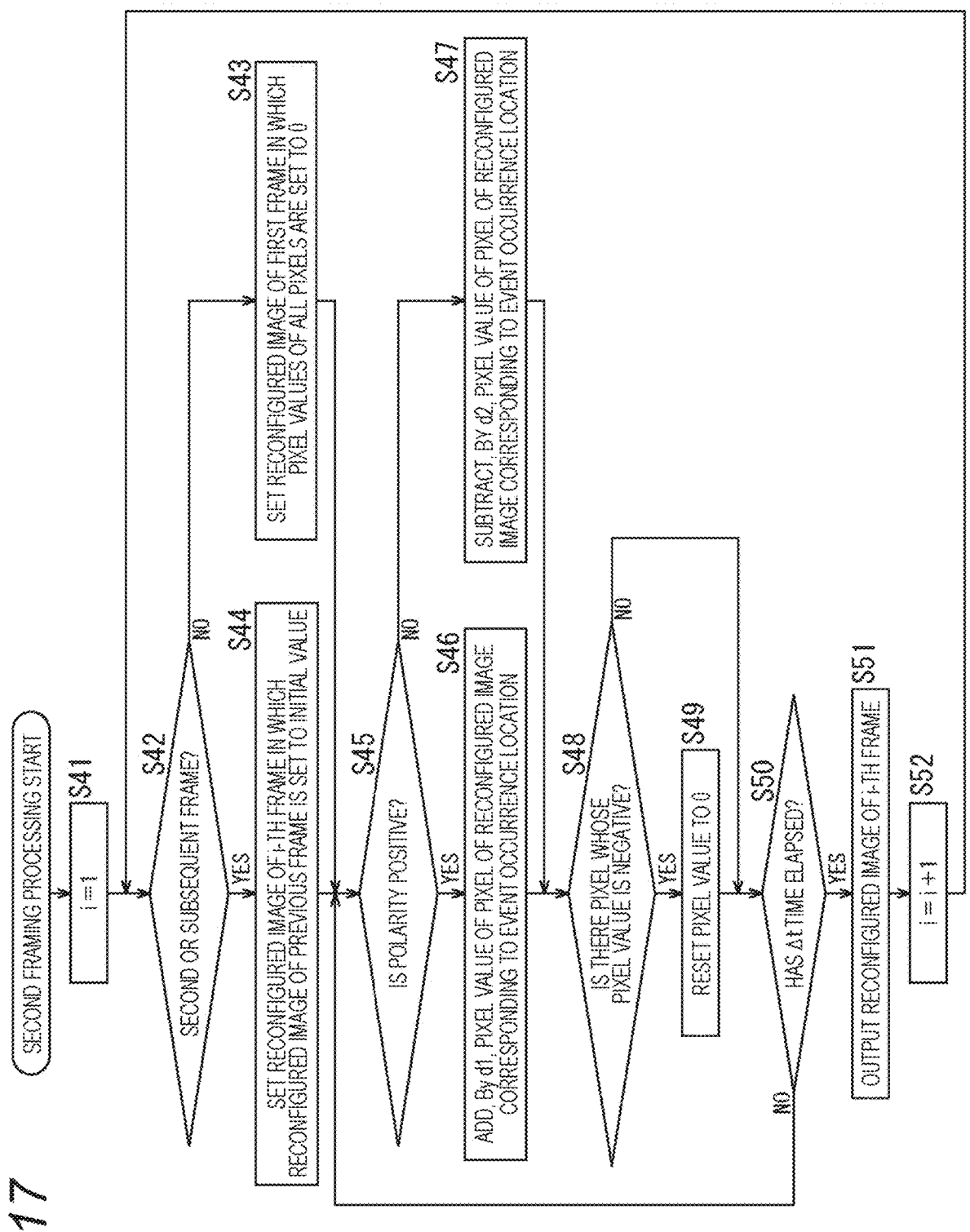
FIG. 17 is a flowchart illustrating second framing processing by the second frame processing unit.

The second frame processing unit 122 executes the second framing processing of FIG. 17 while acquiring event data supplied from the EVS camera 12 at a timing at which an event is detected. Time information (the time t) is synchronized between the EVS camera 12 and the control device 13.

First, in step S41, the second frame processing unit 122 sets 1 to the variable i for identifying a frame number.

In step S42, the second frame processing unit 122 determines whether the variable i is 2 or more, that is, whether the current frame is the second or subsequent frame.

When it is determined in step S42 that the current frame is not the second or subsequent frame, that is, the current frame is the first frame, the processing proceeds to step S43, and the second frame processing unit 122 sets a reconfigured image of the first frame in which pixel values of all the pixels are set to 0.

Whereas, when it is determined in step S42 that the current frame is the second or subsequent frame, the processing proceeds to step S44, and the second frame processing unit 122 sets a reconfigured image of the i-th frame in which the reconfigured image of the previous frame is set to the initial value.

In step S45, the second frame processing unit 122 determines whether the polarity p of the event data supplied from the EVS camera 12 is positive.

When it is determined in step S45 that the polarity p of the event data supplied from the EVS camera 12 is positive, the processing proceeds to step S46, and the second frame processing unit 122 adds, by d1, a pixel value of a pixel of a reconfigured image corresponding to an event occurrence location of the event data supplied from the EVS camera 12.

Whereas, when it is determined in step S45 that the polarity p of the event data supplied from the EVS camera 12 is negative, the processing proceeds to step S47, and the second frame processing unit 122 subtracts, by d2, a pixel value of a pixel of a reconfigured image corresponding to an event occurrence location of the event data supplied from the EVS camera 12.

After step S46 or S47, the processing proceeds to step S48, and the second frame processing unit 122 determines whether there is a pixel whose pixel value is negative, and skips the processing of the next step S49 when it is determined that there is no pixel whose pixel value is negative.

Whereas, when it is determined in step S48 that there is a pixel whose pixel value is negative, the processing proceeds to step S49, and the second frame processing unit 122 resets the negative pixel value to 0.

Subsequently, in step S50, it is determined whether the Δt time corresponding to a period of one frame has elapsed. When it is determined that the Δt time has not elapsed yet, the processing returns to step S45, and the processing of steps S45 to S50 described above is repeated.

Whereas, when it is determined in step S50 that the Δt time has elapsed, the processing proceeds to step S51, and the second frame processing unit 122 outputs the reconfigured image of the i-th frame.

Next, in step S52, the second frame processing unit 122 increments the variable i for identifying the frame number by 1, and then returns the processing to step S42. Thereafter, the processing in steps S42 to S52 described above is repeatedly executed, and the second framing processing in FIG. 17 ends when an instruction is given to end the operation of the entire dispenser control system 1 or the control device 13.

As described above, according to the second framing processing, a reconfigured image in which a luminance value is estimated is generated by accumulating pixel values in correspondence to the luminance threshold values d1 and d2.

Note that, as described above, in the generation of the reconfigured image, all the past events from the time $T_0$ at which the image-capturing is started to the time $T_i$ at which the i-th frame is framed are accumulated. Therefore, an object that does not exist at the start of image-capturing and is reflected from the middle continues to remain in the reconfigured image. Noise is also accumulated and continues to remain.

Figure 18:
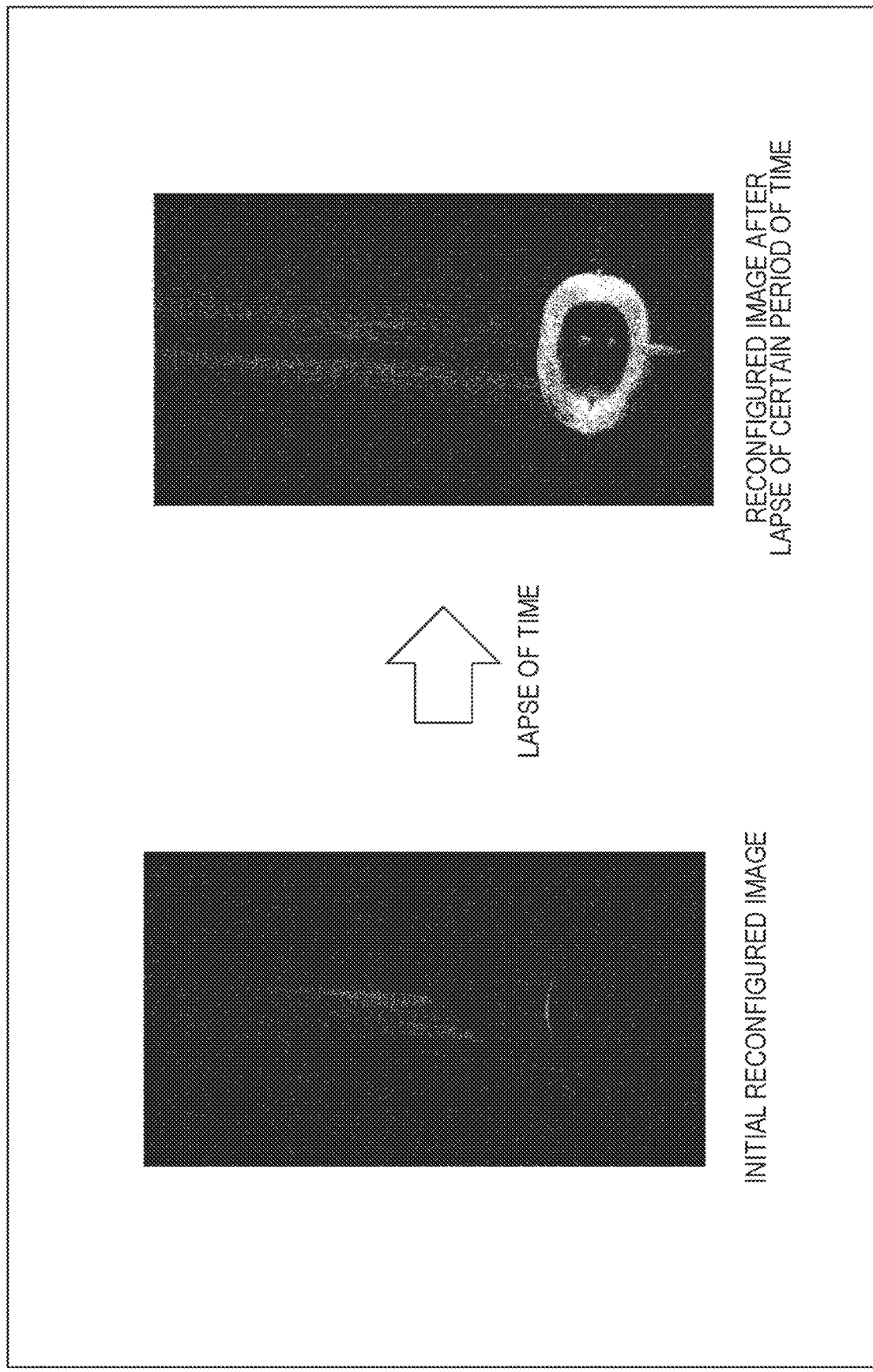
FIG. 18 is a view illustrating an example of a reconfigured image after a lapse of a certain period of time.

FIG. 18 illustrates an example of an initial reconfigured image close to the time $T_0$ at which image-capturing is started and a reconfigured image after a lapse of a certain period of time.

In the reconfigured image after a lapse of a certain period of time, a portion is generated in which the droplet 10 and noise remain at a certain place and continue to remain.

Since the droplet 10 to be detected is a mobile body, it is desirable to remove an object that is stationary for a certain period.

Therefore, the second frame processing unit 122 can perform the following noise removal processing as a part of the second framing processing.

Figure 19:
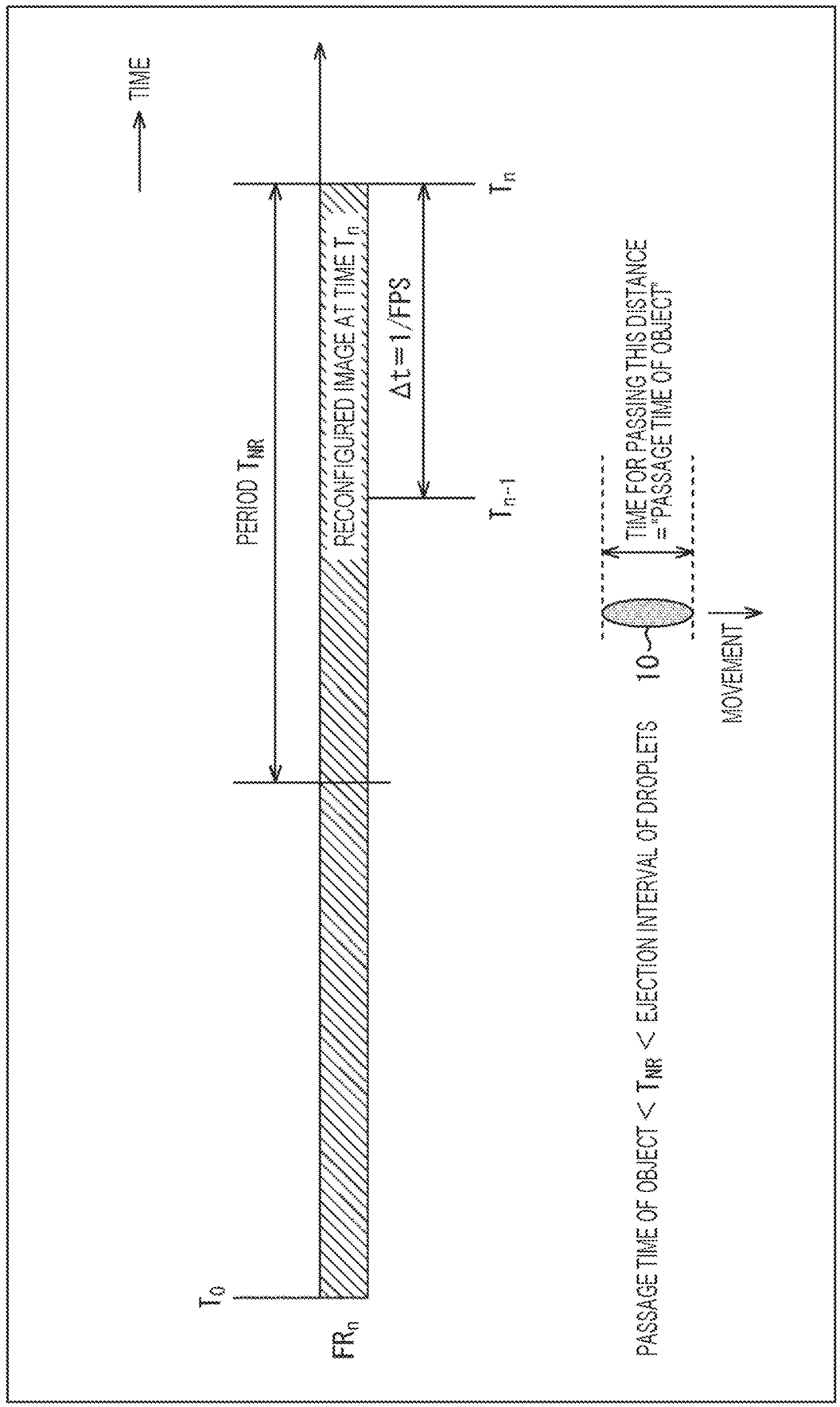
FIG. 19 is a view for explaining an example of noise removal processing in the second framing processing.

For example, as illustrated in FIG. 19, in a case where the second frame processing unit 122 generates a reconfigured image of an n-th frame at time $T_n$, by performing the noise removal processing in which a pixel value of a pixel in which no event has occurred in a past predetermined period $T_{NR}$ is set to 0 with the time $T_n$ as a reference, it is possible to remove an object that is stationary for the predetermined period $T_{NR}$ or more. Here, the predetermined period $T_{NR}$ is set to a period longer than a passage time of the object and shorter than an ejection interval of the droplets 10 (the passage time of the object $<T_{NR}<$ the ejection interval of the droplets 10). The passage time of the object is time during which the object passes a distance in the moving direction of the droplet 10.

The noise removal processing of setting, to 0, the pixel value of the pixel in which no event has occurred in the past predetermined period $T_{NR}$ may be executed by any algorithm. For example, it is possible to adopt processing of holding time information of an event that has most recently occurred in each pixel, and setting a pixel value of a pixel to 0 in a case where a time of the event that has most recently occurred is older by the predetermined period $T_{NR}$ than the time $T_n$ at which framing is performed.

7. Processing of Noise Removal Processing Unit

Next, the noise removal processing by the noise removal processing unit 112 will be described.

The noise removal processing unit 112 performs, as the noise removal processing, filtering processing using expansion processing and contraction processing on white pixels, on each of the event image and the reconfigured image which are binary images.

First, the noise removal processing unit 112 executes opening processing to be executed in the order of contraction processing and expansion processing of white pixels on each of the event image and the reconfigured image, and thereafter, executes closing processing to be executed in the order of the expansion processing and the contraction processing of white pixels. A filter size is, for example, five pixels.

FIG. 20 illustrates an example of the reconfigured image before and after the noise removal processing unit 112 performs the noise removal processing. Small white pixels estimated to be noise are erased by the noise removal processing of the noise removal processing unit 112.

8. Processing of Droplet Detection Unit

Next, processing of the droplet detection unit 103 will be described.

The droplet detection unit 103 detects the droplet 10 from each of the event image and the reconfigured image supplied from the pre-processing unit 101. For example, the droplet detection unit 103 detects the droplet 10 from the event image, and supplies a result to the droplet tracking unit 104 as information of a tracking target. Furthermore, the droplet detection unit 103 detects the droplet 10 from the reconfigured image, calculates a size of the detected droplet 10, and supplies a result to the parameter determination unit 105. Note that the result of the droplet 10 detected from the reconfigured image may be supplied to the droplet tracking unit 104 as information about the tracking target, or a size of the droplet 10 may be calculated from the droplet 10 detected from the event image.

Figure 21:
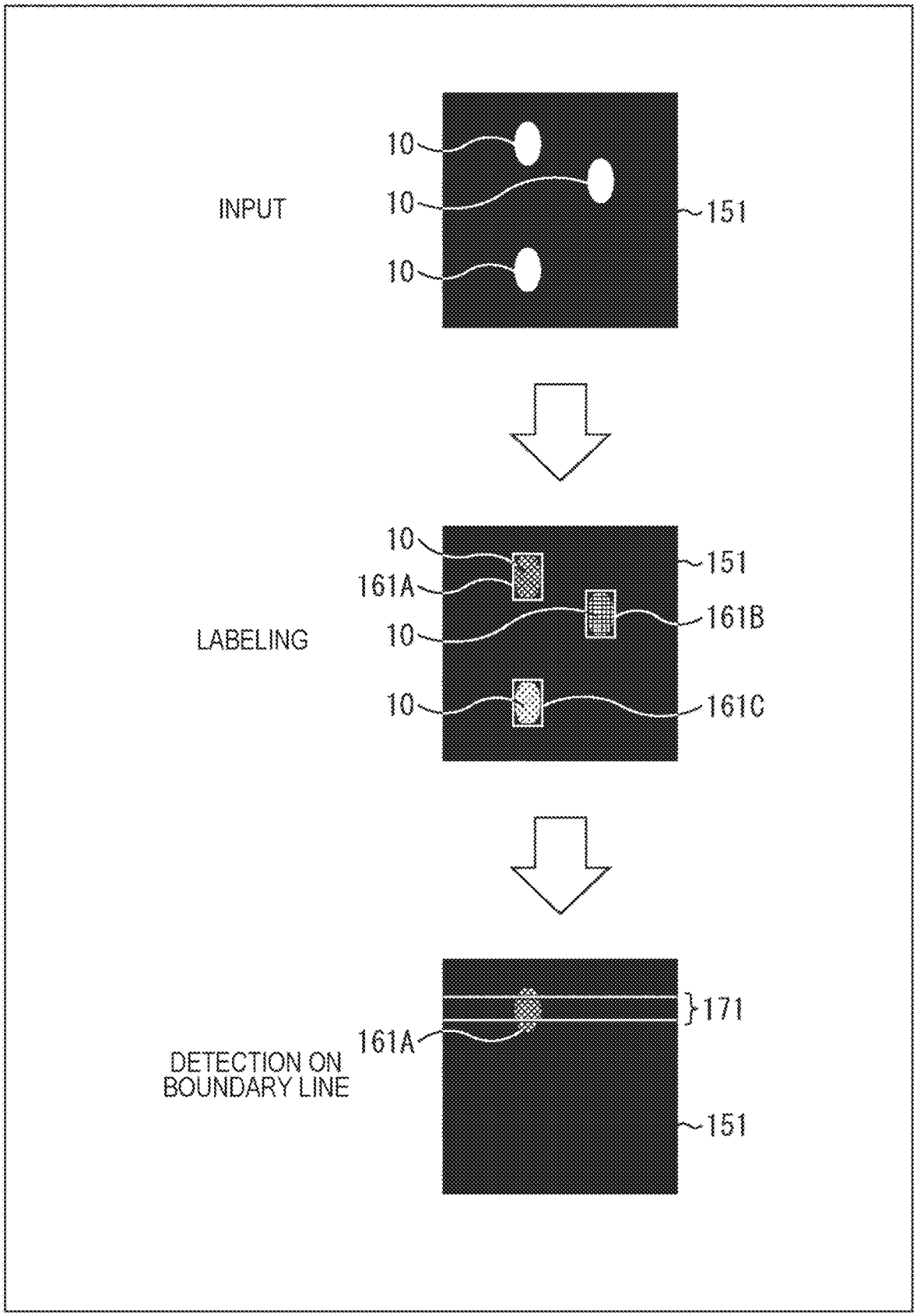
FIG. 21 is a view for explaining droplet detection processing by a droplet detection unit.

FIG. 21 is a view for explaining droplet detection processing by the droplet detection unit 103.

The droplet detection unit 103 executes labeling processing on a binary image 151 of the event image or the reconfigured image supplied from the pre-processing unit 101, to give a label 161 to the droplet 10 in the binary image 151. In the example of FIG. 21, labels 161A to 161C are given to three droplets 10 in the binary image 151.

The droplet detection unit 103 determines whether the detected labels 161A to 161C extend across two boundary lines 171 set in advance for the binary image 151, and selects a label extending across the two boundary lines 171 as a detection candidate. In the example of FIG. 21, the label 161A extends across the two boundary lines 171, and the droplet 10 of the label 161A is selected as a detection candidate.

Figure 22:
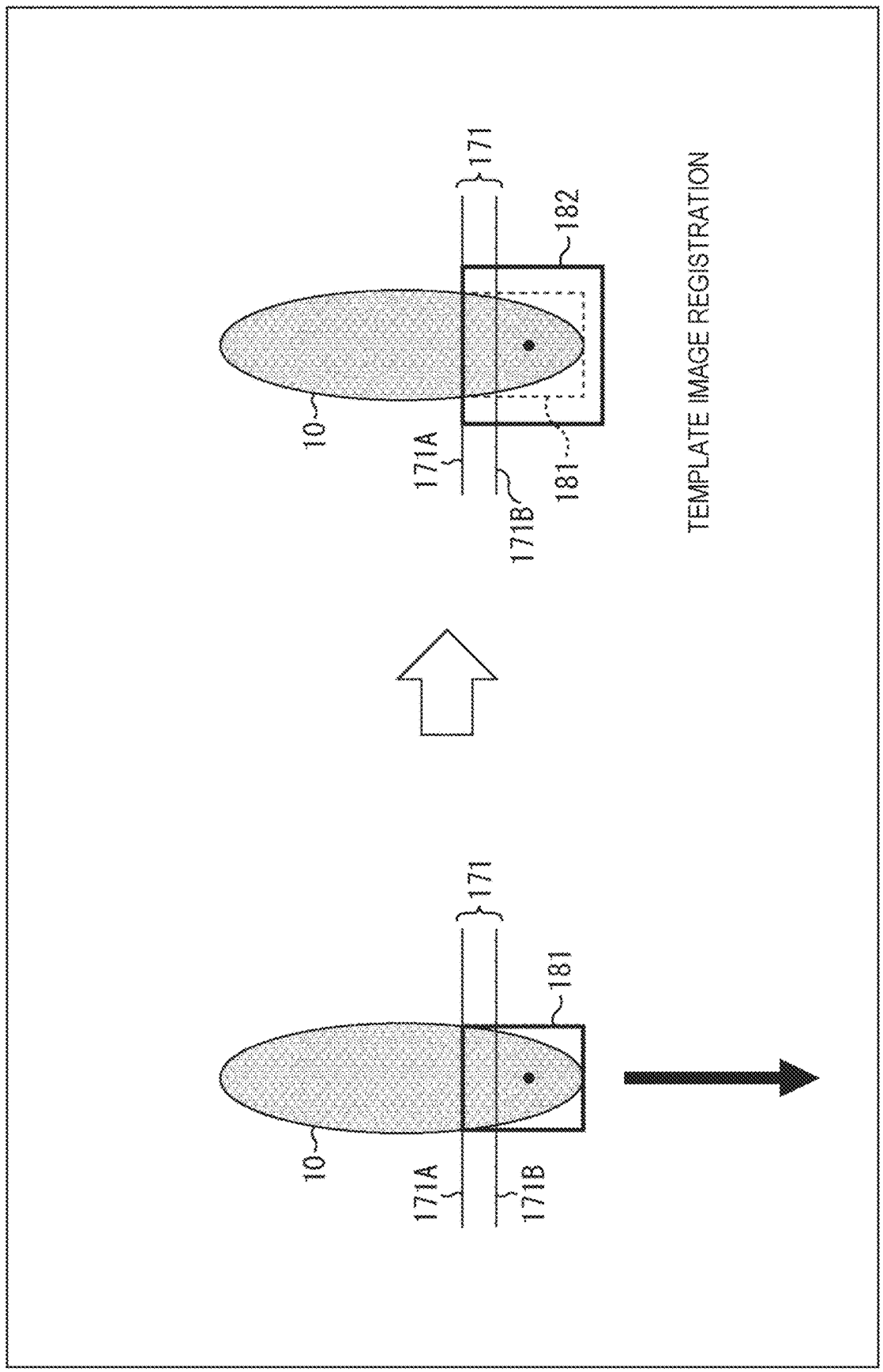
FIG. 22 is a view for explaining the droplet detection processing by the droplet detection unit.

Next, as illustrated in FIG. 22, in the two boundary lines 171, assuming that an upper side opposite to the moving direction of the droplet 10 is a boundary line 171A and a lower side is a boundary line 171B, the droplet detection unit 103 registers (stores), as a template image, an image of a region 182 obtained by enlarging a periphery on a lower side from the boundary line 171A by a certain width with respect to a rectangular region 181 surrounding a region on a lower side of the droplet 10 from the upper-side boundary line 171A. The droplet detection unit 103 supplies the registered template image to the droplet tracking unit 104 as information about the tracking target. As described above, a part of a distal end of the droplet 10 is registered as the template image and set as the tracking target, so that tracking can be performed even if the droplet 10 has a shape in which the tail is drawn.

Figure 23:
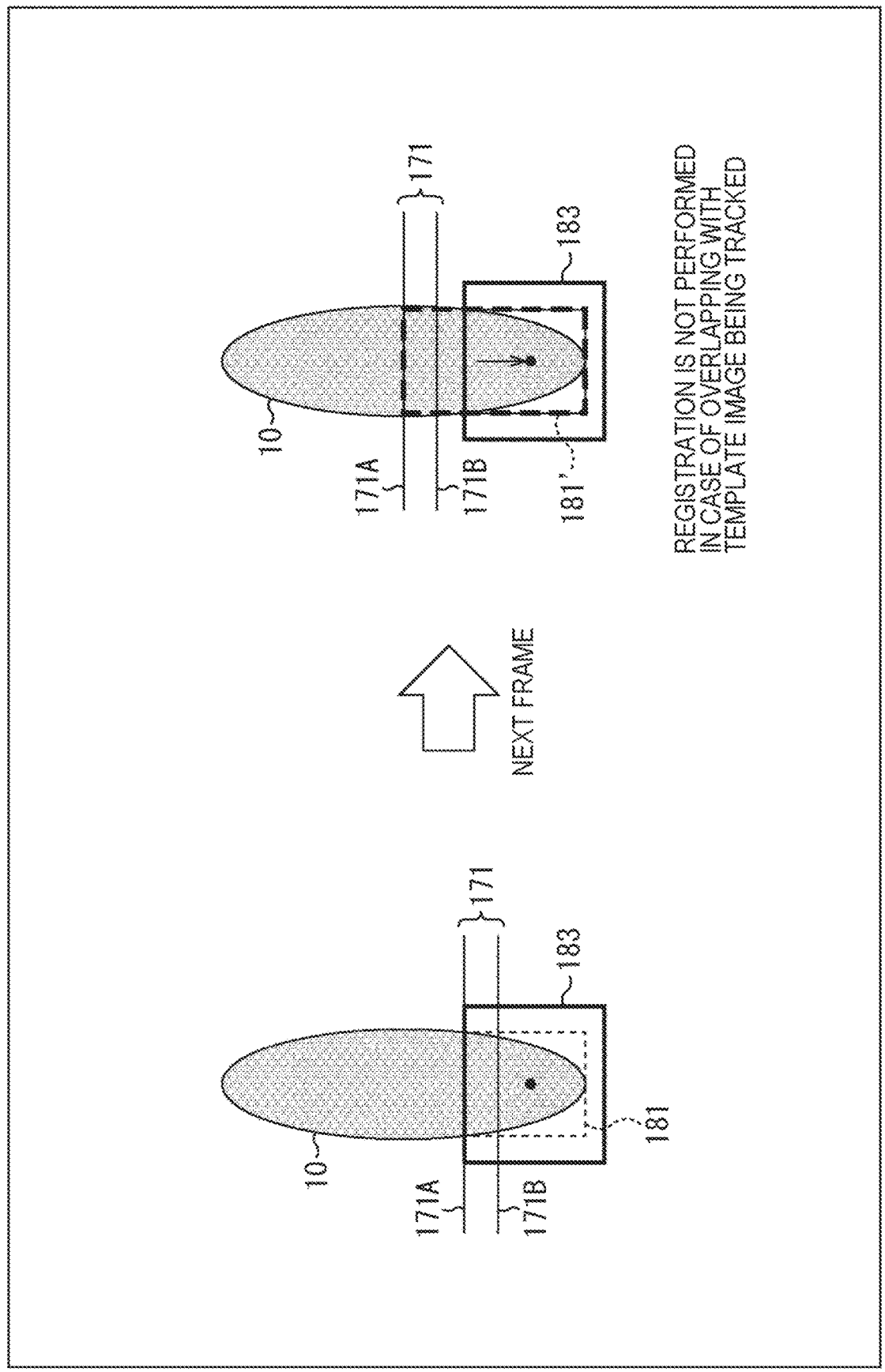
FIG. 23 is a view for explaining the droplet detection processing by the droplet detection unit.

Note that, depending on setting of the frame rate, as illustrated in FIG. 23, for example, in a frame next to the frame with which the template image is registered or the like, the same droplet 10 as the template image that has already been registered and is being tracked by the droplet tracking unit 104 may be detected. In this case, the droplet detection unit 103 does not register (store) the template image.

More specifically, referring to FIG. 23, in a predetermined frame, a template image 183 illustrated on a left side of FIG. 23 is registered, on the basis of the rectangular region 181 surrounding a region on a lower side of the droplet 10 from the boundary line 171A. Then, in the next frame, the same droplet 10 is selected as a detection candidate, and a rectangular region 181' surrounding a region of the droplet 10 on a lower side from the boundary line 171A is set. However, since the rectangular region 181' overlaps with the template image 183 being tracked, the rectangular region is not registered as the template image.

Figure 24:
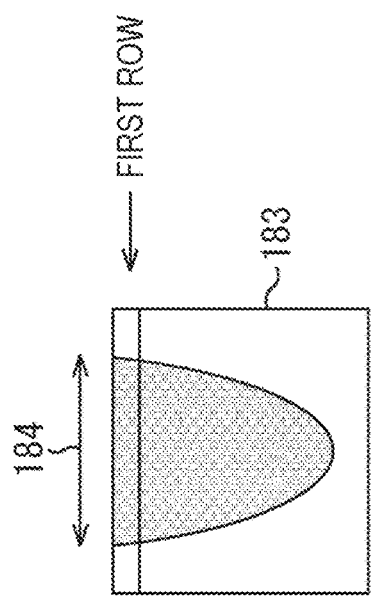
FIG. 24 is a view for explaining a method of calculating a size of a droplet.

FIG. 24 is a view for explaining an example of a method of calculating a size of the droplet 10.

The droplet detection unit 103 calculates a width 184 of the droplet 10 in the first row of the registered template image 183 as the size of the droplet 10. More specifically, the droplet detection unit 103 sets the number of pixels of the droplet 10 in the first row of the registered template image 183, as the width 184 of the droplet 10.

Note that, as described above, the width 184 of the droplet 10 in the first row of the registered template image 183 may be calculated as the size of the droplet 10, or the size of the droplet 10 may be obtained by another calculation method. For example, the number of pixels of the droplet 10 in the registered template image 183, the number of pixels in a vertical direction and a horizontal direction of the registered template image 183, and the like may be calculated as the size. Furthermore, the volume described with reference to FIG. 9 may be calculated as the size.

Figure 25:
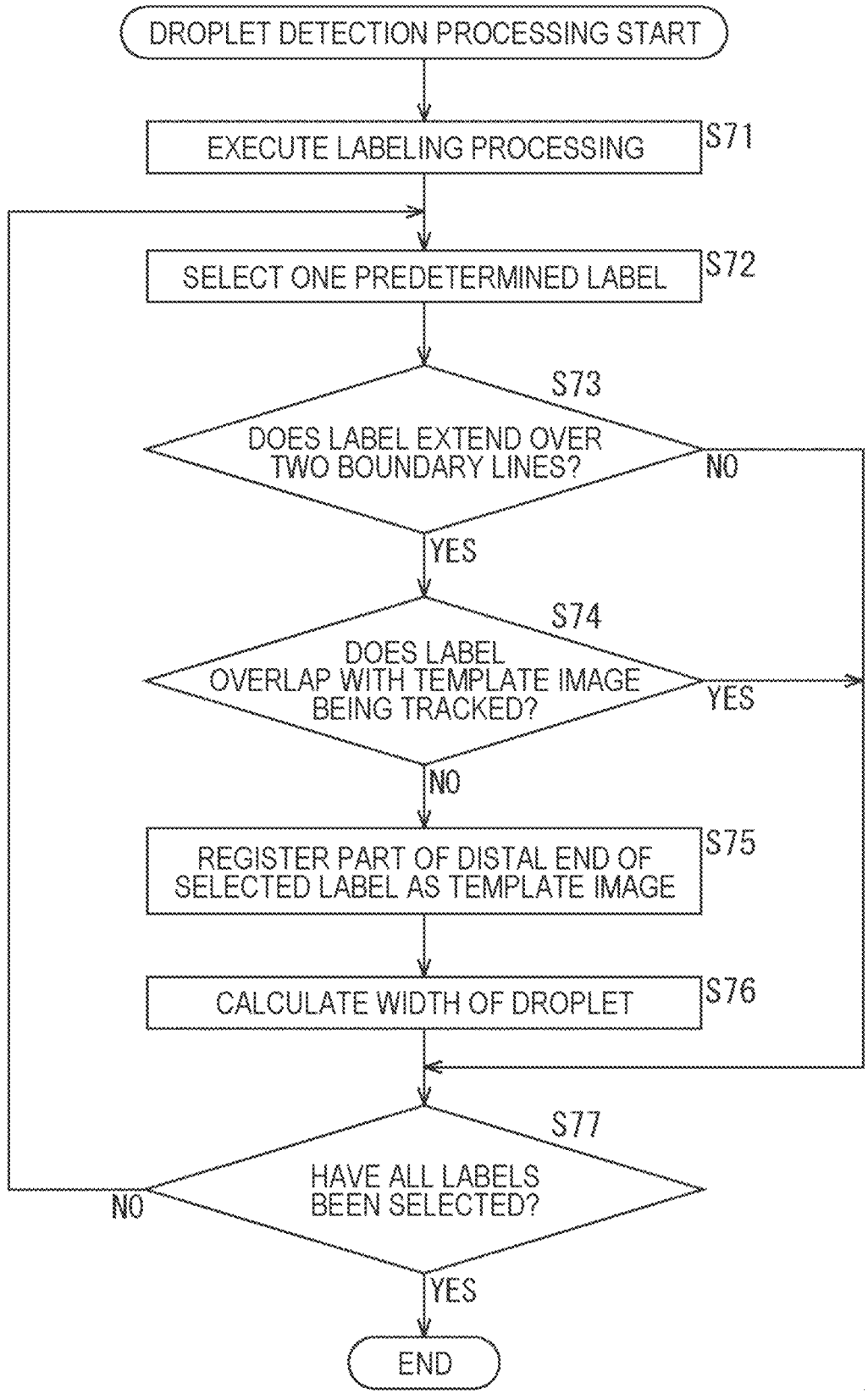
FIG. 25 is a flowchart for explaining the droplet detection processing by the droplet detection unit.

Next, with reference to a flowchart of FIG. 25, the droplet detection processing executed by the droplet detection unit 103 will be described. This processing is started, for example, when the binary image 151 of the event image or the reconfigured image is first supplied from the pre-processing unit 101. The droplet detection processing in FIG. 25 is processing on one binary image 151 supplied from the pre-processing unit 101.

First, in step S71, the droplet detection unit 103 executes labeling processing on one binary image 151 supplied from the pre-processing unit 101. As a result, the labels 161 are given to all the droplets 10 included in one binary image 151.

In step S72, the droplet detection unit 103 selects one predetermined label 161 from the one or more labels 161 (the droplets 10) included in the binary image 151.

In step S73, the droplet detection unit 103 determines whether the selected label 161 extends across the two boundary lines 171.

When it is determined in step S73 that the selected label 161 does not extend over the two boundary lines 171, the processing proceeds to step S77.

Whereas, when it is determined in step S73 that the selected label 161 extends across the two boundary lines 171, the processing proceeds to step S74, and the droplet detection unit 103 determines whether the selected label 161 overlaps with the template image being tracked. More specifically, as described with reference to FIG. 23, it is determined whether the rectangular region 181 surrounding the region of the droplet 10 on the lower side from the upper-side boundary line 171A in the selected label 161 overlaps with the template image 183 being tracked.

When it is determined in step S74 that the selected label 161 overlaps with the template image being tracked, the processing proceeds to step S77.

Whereas, when it is determined in step S74 that the selected label 161 does not overlap the template image being tracked, the processing proceeds to step S75, and the droplet detection unit 103 registers a part of a distal end of the selected label 161 as the template image 183. More specifically, the droplet detection unit 103 registers, as the template image 183, the region 182 obtained by enlarging a periphery on a lower side from the boundary line 171A by a constant width with respect to the rectangular region 181 surrounding a region of the droplet 10 on the lower side from the upper-side boundary line 171A in the selected label 161. The registered template image 183 is supplied to the droplet tracking unit 104.

In step S76, the droplet detection unit 103 calculates the width 184 of the droplet 10 in the first row of the registered template image 183 as a size of the droplet 10. The calculated width 184 of the droplet 10 is supplied to the parameter determination unit 105.

In step S77, the droplet detection unit 103 determines whether all the labels 161 have been selected.

When it is determined in step S77 that not all the labels 161 have been selected yet, the processing returns to step S72, and the above-described steps S72 to S77 are executed again. That is, the label 161 that has not yet been selected is selected, and it is determined whether the label 161 extends across the two boundary lines 171 or overlaps with the template image being tracked.

Whereas, when it is determined in step S77 that all the labels 161 have been selected, the droplet detection processing of FIG. 25 ends.

The droplet detection processing in FIG. 25 is processing on one binary image 151 supplied from the pre-processing unit 101, and the above-described droplet detection processing is executed on the binary images 151 sequentially supplied from the pre-processing unit 101.

9. Processing of Droplet Tracking Unit

Next, processing of the droplet tracking unit 104 will be described.

The droplet tracking unit 104 tracks the droplet 10 detected by the droplet detection unit 103, calculates trajectory information of the droplet 10, and supplies the trajectory information to the parameter determination unit 105. More specifically, the droplet tracking unit 104 searches for the droplet 10 by template matching using the template image 183 supplied from the droplet detection unit 103, for frames subsequent to the frame with which the template image 183 is registered.

Figure 26:
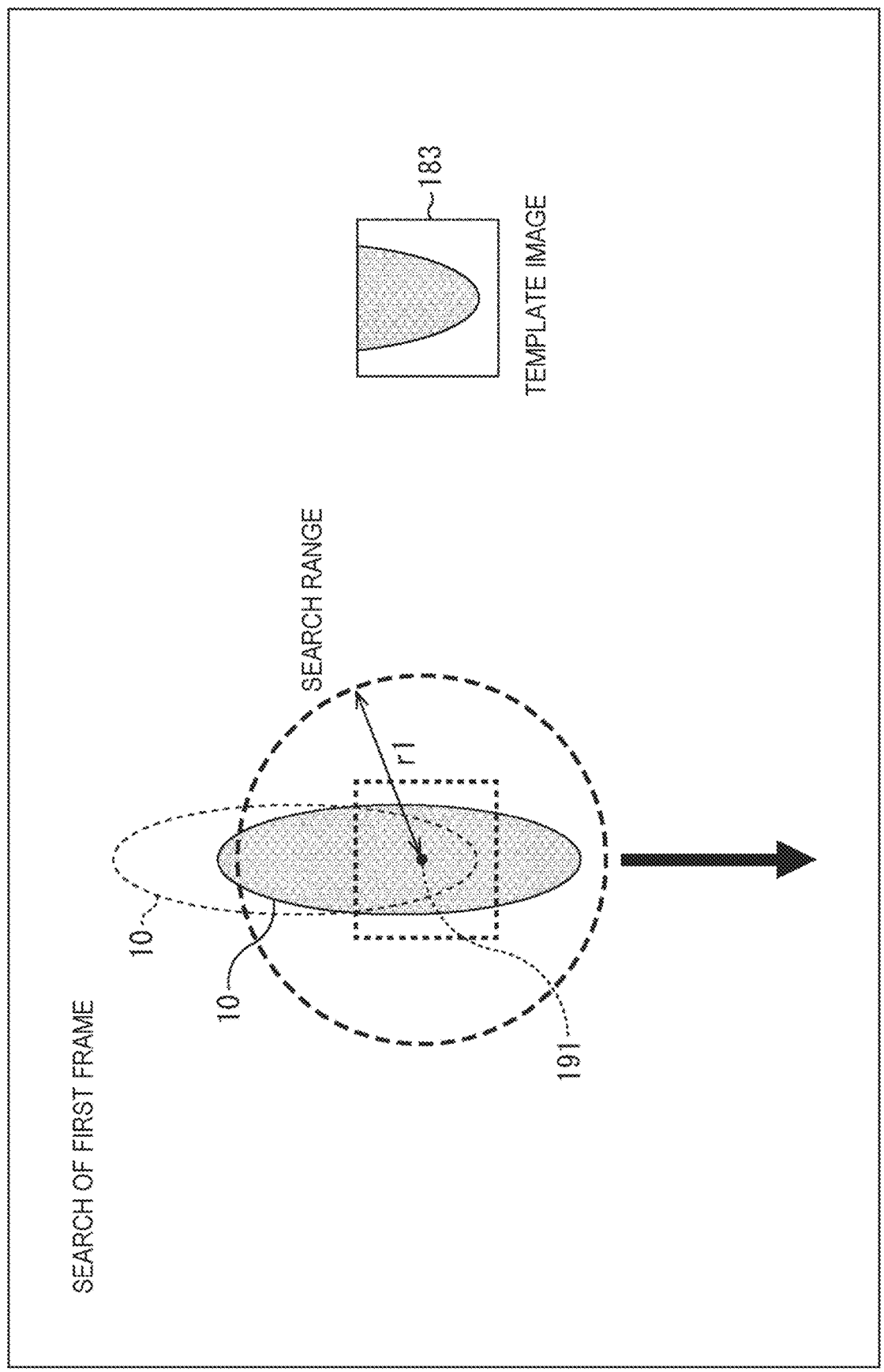
FIG. 26 is a view for explaining search processing by a droplet tracking unit.

FIG. 26 is a view for explaining searching processing for the droplet 10 of the first frame from the frame with which the template image is registered.

In FIG. 26, the droplet 10 indicated by a broken line indicates a position of the droplet 10 in a frame one frame before the current frame, that is, a frame with which the template image 183 is registered.

The droplet tracking unit 104 searches for the droplet 10 of the current frame by template matching using, as a search range, a range of a predetermined radius r1 from a center 191 of the template image 183 in the frame one frame before.

Figure 27:
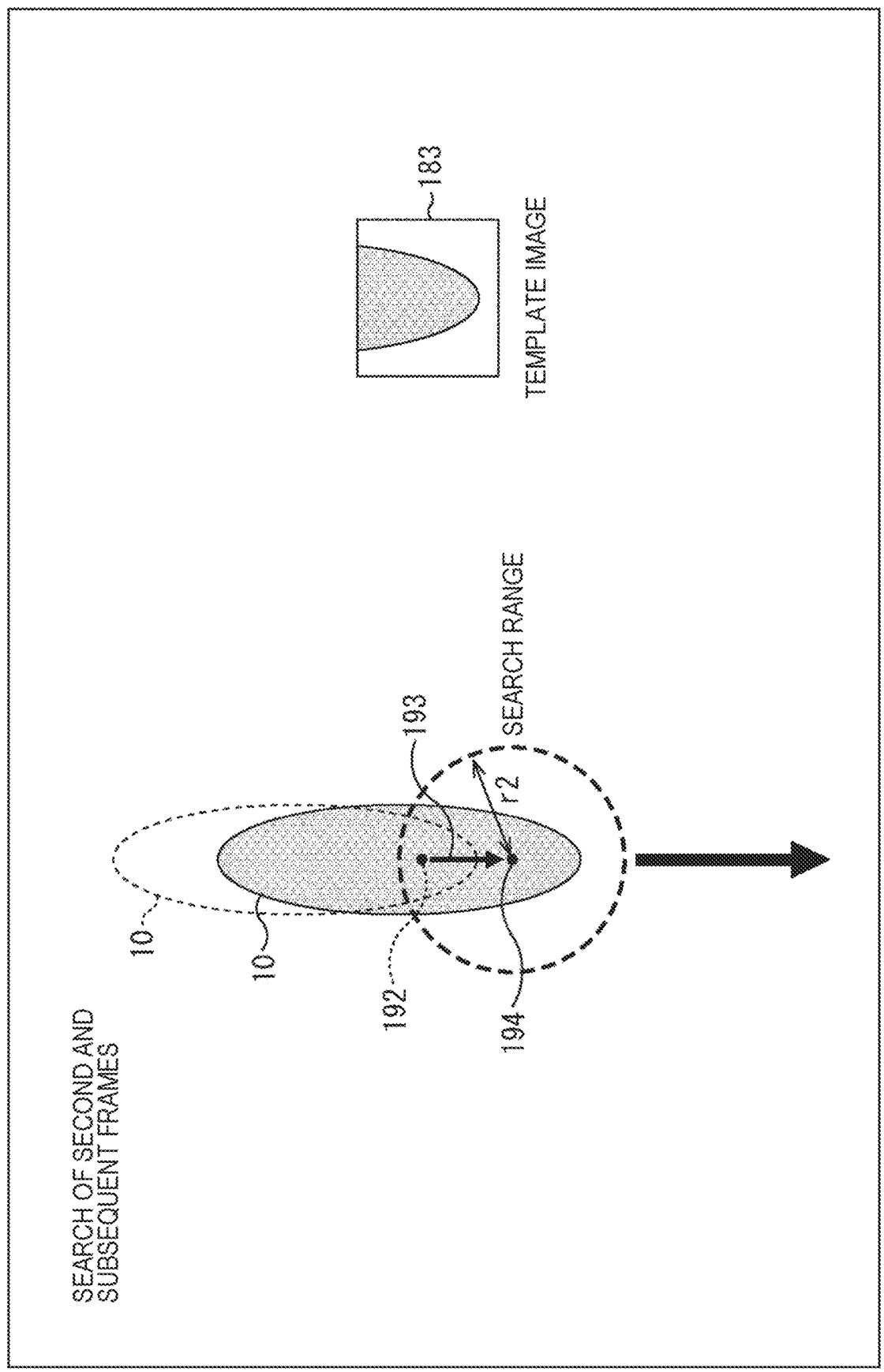
FIG. 27 is a view for explaining the search processing by the droplet tracking unit.

FIG. 27 is a view for explaining search processing for the droplets 10 in the second and subsequent frames from the frame with which the template image is registered.

In FIG. 27, the droplet 10 indicated by a broken line indicates a position of the droplet 10 searched in the frame one frame before the current frame. A position 192 corresponds to a center of the template image 183 searched for with respect to the droplet 10 of the broken line. In a case where the current frame is the second frame from the frame with which the template image is registered, the position 192 in FIG. 27 corresponds to the center 191 in FIG. 26.

In the second and subsequent frames, the droplet tracking unit 104 calculates a movement amount 193 of the droplet 10 in one frame period Δt. The movement amount 193 of the droplet 10 in one frame period Δt is calculated with a distance between a center position of the template image 183 detected in a frame one frame before and a center position of the template image 183 detected in a frame two frames before.

Then, the droplet tracking unit 104 calculates, as a predicted position of the droplet 10, a position 194 of the droplet 10 moved by the movement amount 193 in one frame period Δt from the position 192 of the template image 183 of the frame one frame before, and searches for, as a search range, the droplet 10 by using a range of a predetermined radius r2 centered on the predicted position. Here, the radius r2 for setting the search range for the second and subsequent frames is set to be smaller than the radius r1 for setting the search range for the first frame (r2<r1).

As described above, the movement amount of the droplet 10 cannot be predicted in the frame (the first frame) next to the frame with which the template image 183 is registered, so that the droplet 10 is searched for by template matching with, as a search range, a range from the center 191 to the radius r1 of the template image 183 at the time of registration.

Whereas, in the second and subsequent frame from the frame with which the template image 183 is registered, the movement amount of the droplet 10 can be calculated from the previous search result. Therefore, the droplet 10 is searched for by template matching with, as a search range, the radius r2 smaller than the radius r1 centered on the predicted position based on the calculated movement amount.

Figure 28:
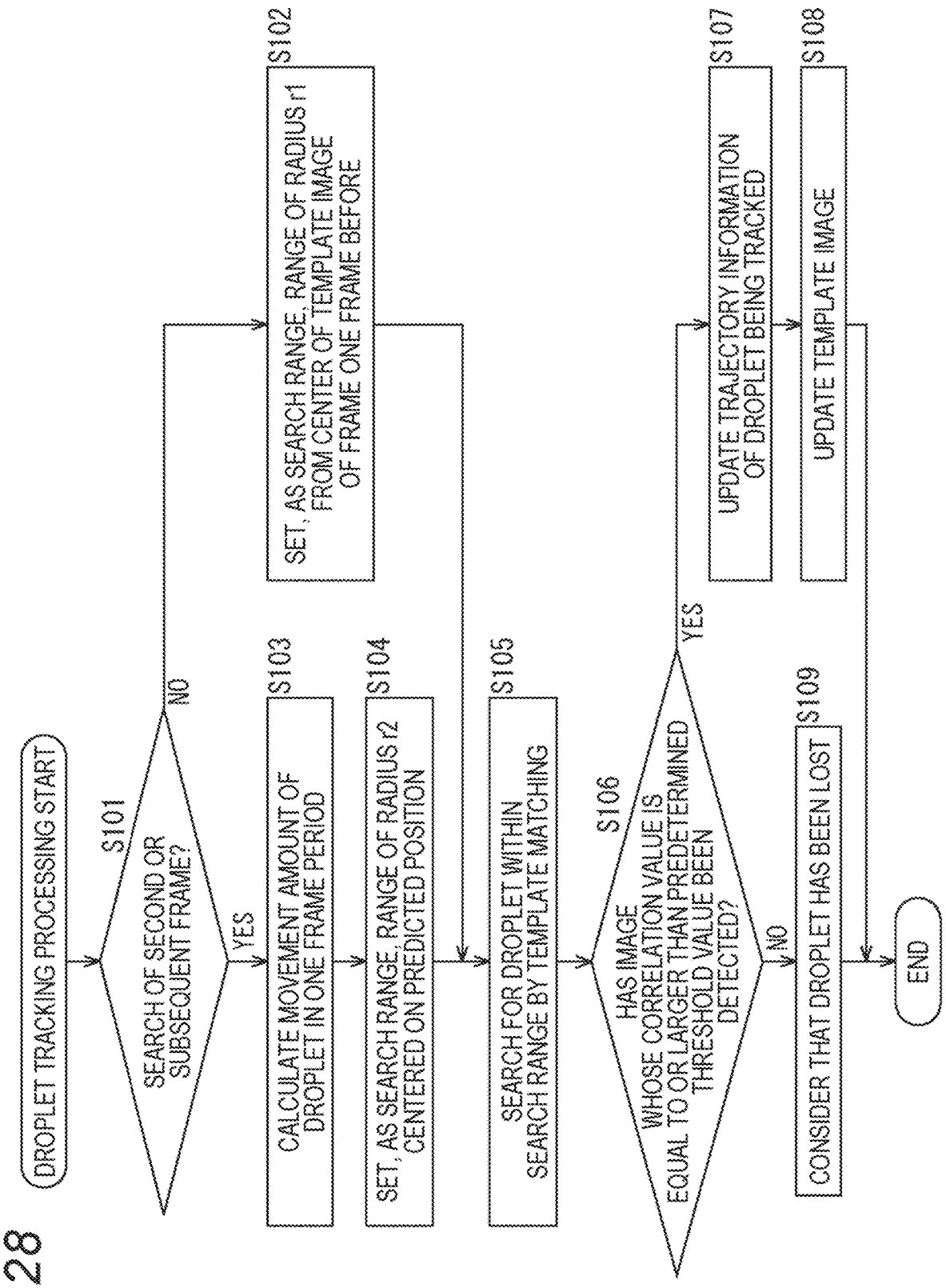
FIG. 28 is a flowchart for explaining droplet tracking processing by the droplet tracking unit.

With reference to the flowchart of FIG. 28, droplet tracking processing executed by the droplet tracking unit 104 will be described. This processing is started, for example, when the binary image 151 of the event image or the reconfigured image is first supplied from the pre-processing unit 101. The droplet tracking processing in FIG. 28 is processing for one binary image 151 supplied from the pre-processing unit 101.

First, in step S101, the droplet tracking unit 104 determines whether the droplet 10 being searched is a search for the second or subsequent frame from the frame with which the template image 183 is registered.

When it is determined in step S101 that the droplet 10 being searched is not a search for the second or subsequent frame, that is, the search for the next frame of the frame with which the template image 183 is registered, the processing proceeds to step S102, and the droplet tracking unit 104 sets, as a search range, a range of the predetermined radius r1 from the center 191 of the template image 183 in a frame one frame before.

Whereas, when it is determined in step S101 that the droplet 10 being searched is a search for the second or subsequent frame, the processing proceeds to step S103, and the droplet tracking unit 104 calculates the movement amount 193 of the droplet 10 in one frame period Δt, on the basis of a center position of the template image 183 detected in a frame one frame before and a center position of the template image 183 detected in a frame two frames before.

Subsequently, in step S104, the droplet tracking unit 104 calculates, as a predicted position of the droplet 10, the position 194 of the droplet 10 moved by the movement amount 193 in one frame period Δt from the position 192 of the template image 183 of the frame one frame before, and sets, as a search range, a range of the predetermined radius r2 centered on the predicted position.

In step S105, the droplet tracking unit 104 searches for the droplet 10 within the search range set in step S102 or step S104, by template matching. In the template matching, for example, the droplet tracking unit 104 calculates a correlation value by normalized cross-correlation, and obtains a coordinate having the highest correlation value.

In step S106, the droplet tracking unit 104 determines whether an image whose correlation value is equal to or larger than a predetermined threshold value is detected. In step S106, in a case where the correlation value of the image having the highest correlation value detected in step S105 is smaller than the predetermined threshold value, it is determined that the image having a correlation value equal to or larger than the predetermined threshold value has not been detected. Whereas, in a case where the correlation value of the image having the highest correlation value detected in step S105 is equal to or larger than the predetermined threshold value, it is determined that the image having a correlation value equal to or larger than the predetermined threshold value is detected.

When it is determined in step S106 that an image having a correlation value equal to or larger than the predetermined threshold value has been detected, the processing proceeds to step S107, and the droplet tracking unit 104 updates the trajectory information of the droplet 10 being tracked. Specifically, the droplet tracking unit 104 adds position information, which is a search result of the droplet 10 in the current frame, to position information of the droplet 10 of each frame up to the previous frame stored as the trajectory information of the droplet 10 being tracked.

In step S108, the droplet tracking unit 104 updates the template image used in the template matching, to the image detected in the current frame. Note that the processing in step S108 may be omitted, and the template image supplied from the droplet detection unit 103 may be continuously used.

Whereas, when it is determined in step S106 that an image having a correlation value equal to or larger than the predetermined threshold value has not been detected, the processing proceeds to step S109, and the droplet tracking unit 104 considers that the droplet 10 has been lost, and supplies the trajectory information of the droplet 10 stored in the detection so far to the parameter determination unit 105.

The droplet tracking processing in FIG. 28 is processing on one binary image 151 supplied from the pre-processing unit 101, and the above-described droplet detection processing is executed on the binary images 151 sequentially supplied from the pre-processing unit 101. Until the droplet 10 being tracked is considered lost, the droplet 10 is searched for by template matching on the subsequent binary image 151, and the trajectory information is updated.

Note that the position information of the droplet 10 of each frame is stored and supplied to the parameter determination unit 105 as the trajectory information of the droplet 10, but the trajectory information of the droplet 10 may be other information. For example, a velocity, a moving direction, and the like of the droplet 10 calculated from the position of the droplet 10 of each frame may be used as the trajectory information of the droplet 10.

10. Droplet Control Processing of Dispenser Control System

Next, with reference to a flowchart of FIG. 29, droplet control processing by the entire dispenser control system 1 will be described. This processing is started, for example, when a predetermined control start operation is performed on the dispenser control system 1.

First, in step S141, the EVS camera 12 detects, as an event, a luminance change based on the droplet 10 injected from the dispenser 11, and outputs event data to the control device 13.

In step S142, the first frame processing unit 121 of the control device 13 executes first framing processing of generating an event image and a display image, on the basis of event data from the EVS camera 12.

Specifically, the first frame processing unit 121 executes the first framing processing described with reference to FIG. 14.

In step S143, the second frame processing unit 122 of the control device 13 executes second framing processing of generating a reconfigured image in which a luminance value is estimated on the basis of the event data from the EVS camera 12. Specifically, the second frame processing unit 122 executes the second framing processing described with reference to FIG. 17.

In step S144, the noise removal processing unit 112 executes the noise removal processing by filter processing of the expansion processing and the contraction processing for each of the event image or the reconfigured image generated by the framing processing unit 111.

In step S145, the display 14 acquires the display image generated by the framing processing unit 111 from the control device 13, and displays the display image.

In step S146, the droplet detection unit 103 of the control device 13 executes droplet detection processing of detecting the droplet 10 as a tracking target, from each of the event image and the reconfigured image supplied from the pre-processing unit 101. Specifically, the droplet detection unit 103 executes the droplet detection processing described with reference to FIG. 25. In the droplet detection processing, a template image of the droplet 10 is supplied to the droplet tracking unit 104, and the width 184 of the droplet 10 is calculated and supplied to the parameter determination unit 105.

In step S147, the droplet tracking unit 104 of the control device 13 executes droplet tracking processing of tracking the droplet 10 detected by the droplet detection unit 103, calculating trajectory information of the droplet 10, and supplying the trajectory information to the parameter determination unit 105. Specifically, the droplet tracking unit 104 executes the droplet detection processing described with reference to FIG. 28, and supplies the trajectory information of the droplet 10 to the parameter determination unit 105.

In step S148, the parameter determination unit 105 of the control device 13 executes abnormality determination processing of determining whether or not a control parameter of the dispenser 11 is within a normal range. For example, as the abnormality determination processing, the parameter determination unit 105 determines whether or not an ejection timing and an ejection amount of the dispenser 11 are within an appropriate range, on the basis of the width 184 of the droplet 10 supplied from the droplet detection unit 103 and the trajectory information of the droplet 10 supplied from the droplet tracking unit 104.

In step S149, the parameter determination unit 105 determines whether to change the control parameter of the dispenser 11. For example, when it is determined that the ejection timing or the ejection amount of the dispenser 11 is not within the appropriate range, the parameter determination unit 105 determines to change the control parameter.

When it is determined in step S149 that the control parameter is to be changed, the processing proceeds to step S150, and the parameter determination unit 105 generates control information for correcting the parameter as feedback control information, and outputs the control information to the dispenser 11.

Whereas, when it is determined in step S149 that the control parameter is not to be changed, the processing in step S150 is skipped.

In step S151, the control device 13 determines whether or not to end the control. For example, the parameter determination unit 105 of the control device 13 determines to end the control when it is detected that a control end operation has been performed, and determines not to end the control in other cases.

When it is determined in step S151 that the control is not to be ended yet, the processing returns to step S141, and the above-described steps S141 to S151 are repeated.

Figure 29:
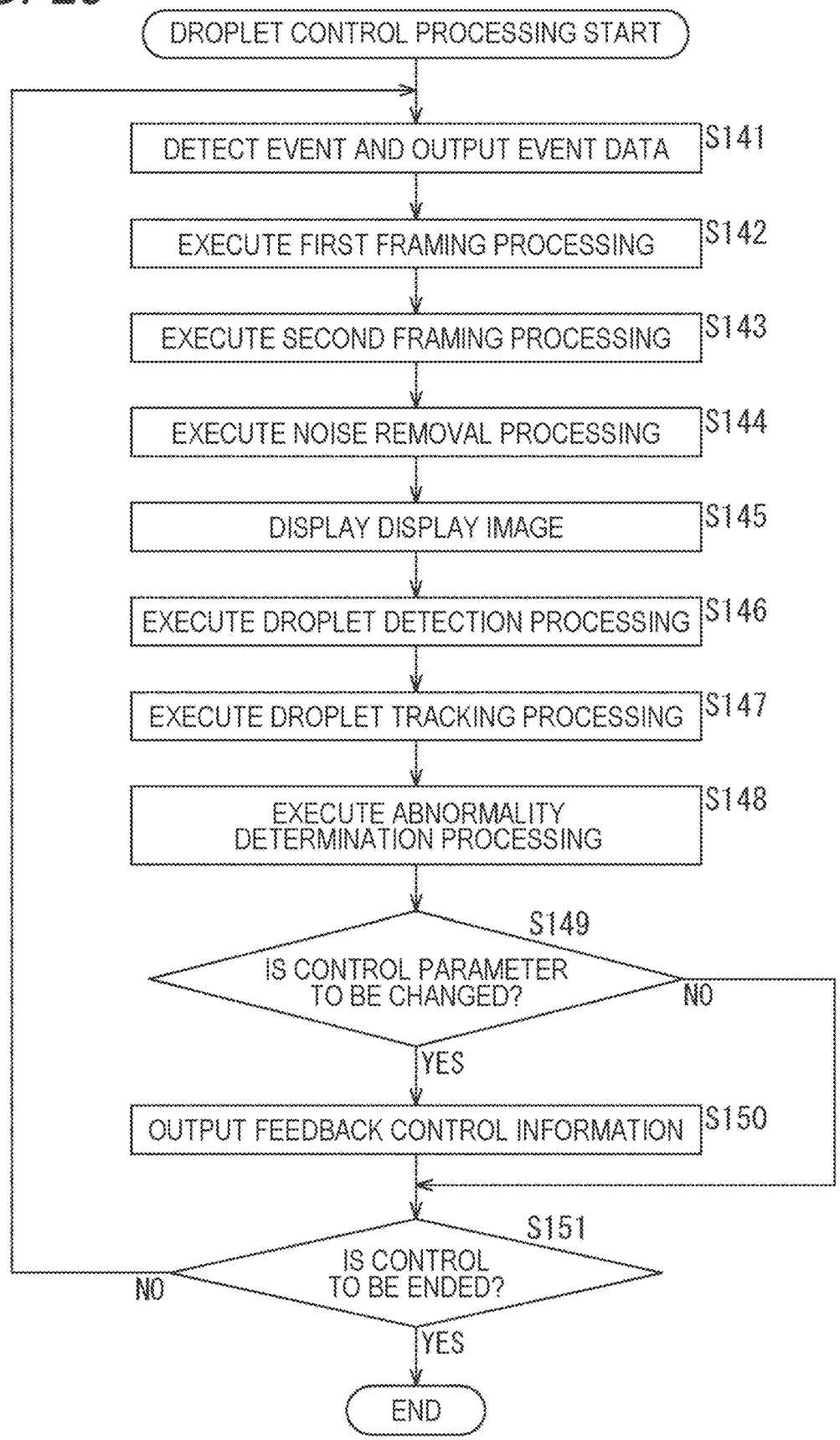
FIG. 29 is a flowchart for explaining droplet control processing by the dispenser control system.

Whereas, when it is determined in step S151 that the control is to be ended, the droplet control processing of FIG. 29 is ended.

The processing of each step in FIG. 29 described as the droplet control processing has been described as sequential processing for convenience of description, but in practice, the processing of each step is executed in parallel, and the execution result is sequentially outputted to the subsequent stage.

11. Application of DNN

In the droplet control processing described above, the event image and the reconfigured image have been generated on the basis of the event data from the EVS camera 12, a position, a speed, a moving direction, and the like of the droplet 10 have been calculated from the generated event image or reconfigured image, and it has been determined whether or not the control parameter of the dispenser 11 is within a normal range.

Whereas, for example, processing of identifying a control parameter of the dispenser 11 may be executed using a deep neural network (DNN) to determine whether or not the control parameter of the dispenser 11 is within a normal range.

Figure 30:
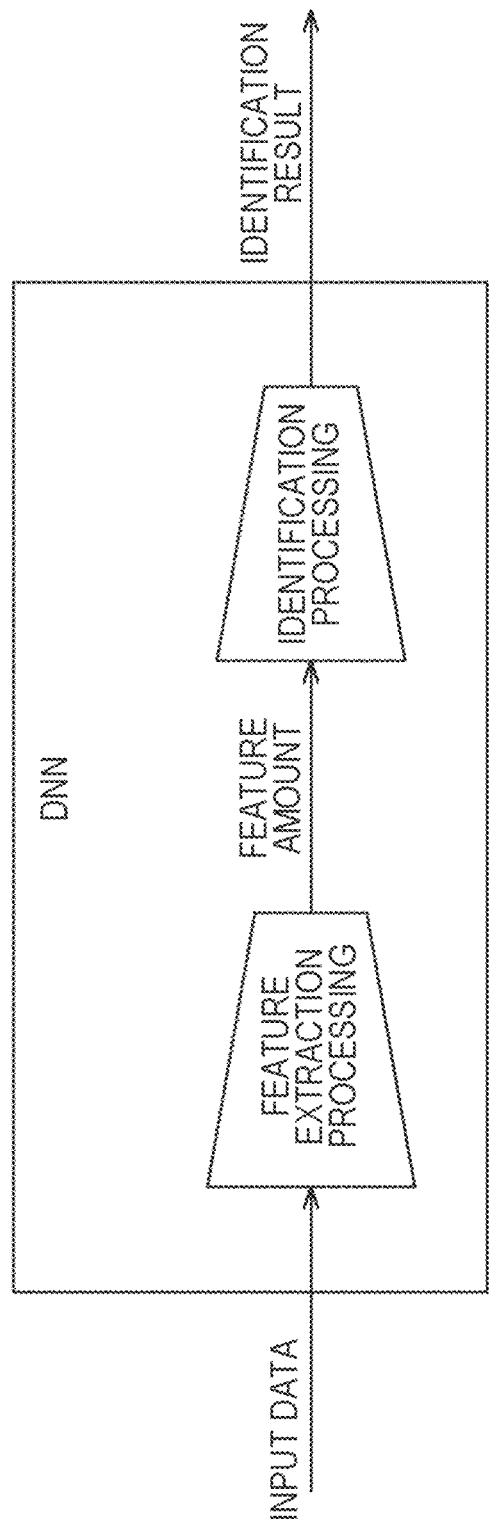
FIG. 30 is a diagram for explaining a DNN.

As illustrated in FIG. 30, the DNN obtains an identification result by executing feature extraction processing on input data to extract a feature amount, and executing identification processing on the basis of the extracted feature amount.

For example, the control device 13 can give at least one of an event image or a reconfigured image as input data to the DNN, and generate and use, by learning, a DNN that outputs a control parameter of the dispenser 11 as an identification result.

Figure 31:
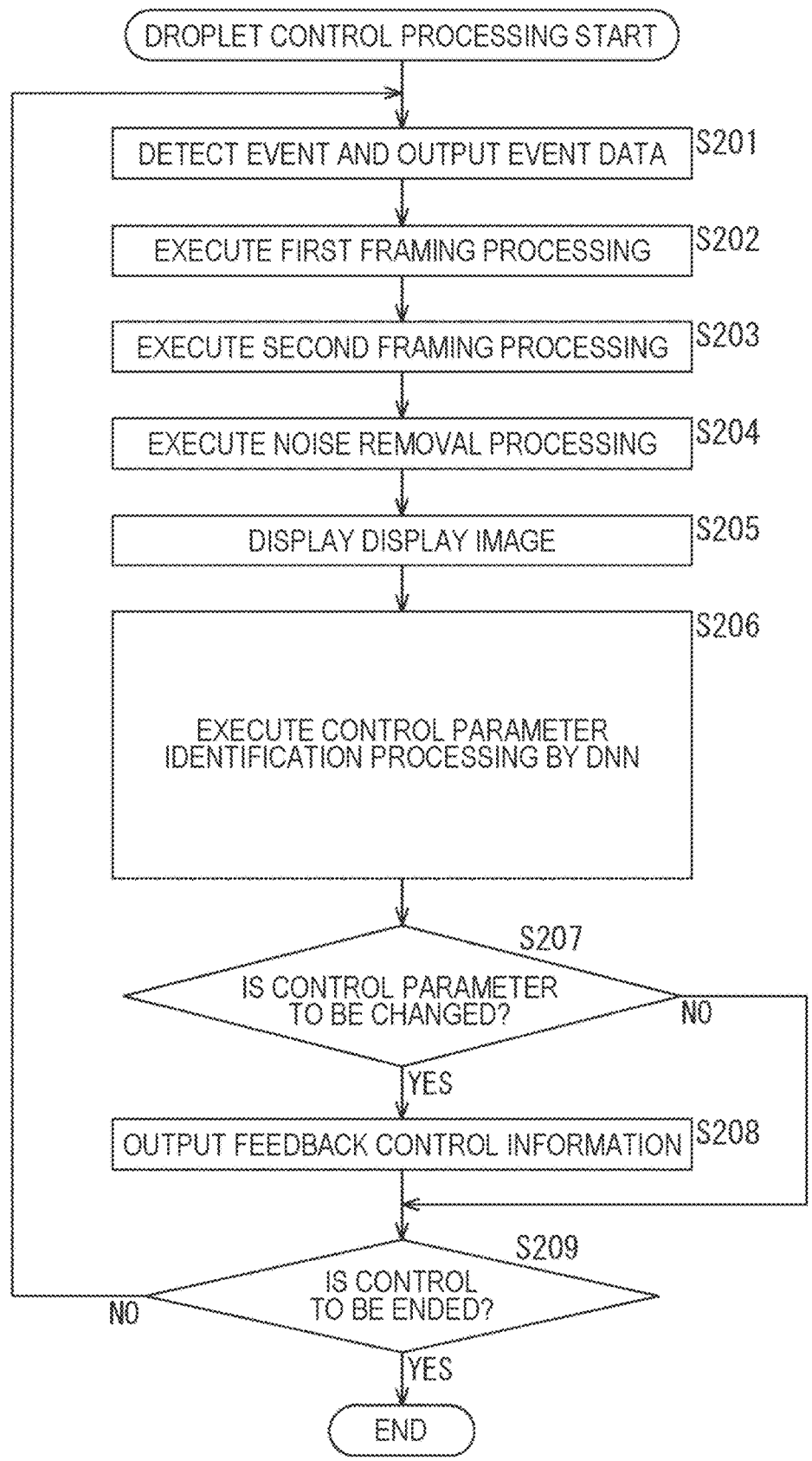
FIG. 31 is a flowchart for explaining droplet control processing using the DNN.

FIG. 31 illustrates a flowchart of droplet control processing in a case where the DNN performs identification processing using an event image and a reconfigured image as input data.

Steps S201 to S205 and S207 to S209 in FIG. 31 are the same processing as steps S141 to S145 and S149 to S151 in FIG. 29, and the processing in steps S146 to S148 in FIG. 29 is changed to control parameter identification processing by the DNN in step S206 in FIG. 31.

In step S206, for example, a DNN processing unit of the control device 13 identifies a control parameter of the dispenser 11 on the basis of an event image and a reconfigured image supplied from the pre-processing unit 101, and outputs the control parameter to the parameter determination unit 105. In step S207, the parameter determination unit 105 determines whether or not to change the control parameter on the basis of the control parameter as an identification result.

Alternatively, the event data from the EVS camera 12 may be directly given to the DNN as the input data, and such a DNN that outputs the control parameter of the dispenser 11 may be generated and used by learning as an identification result.

Figure 32:
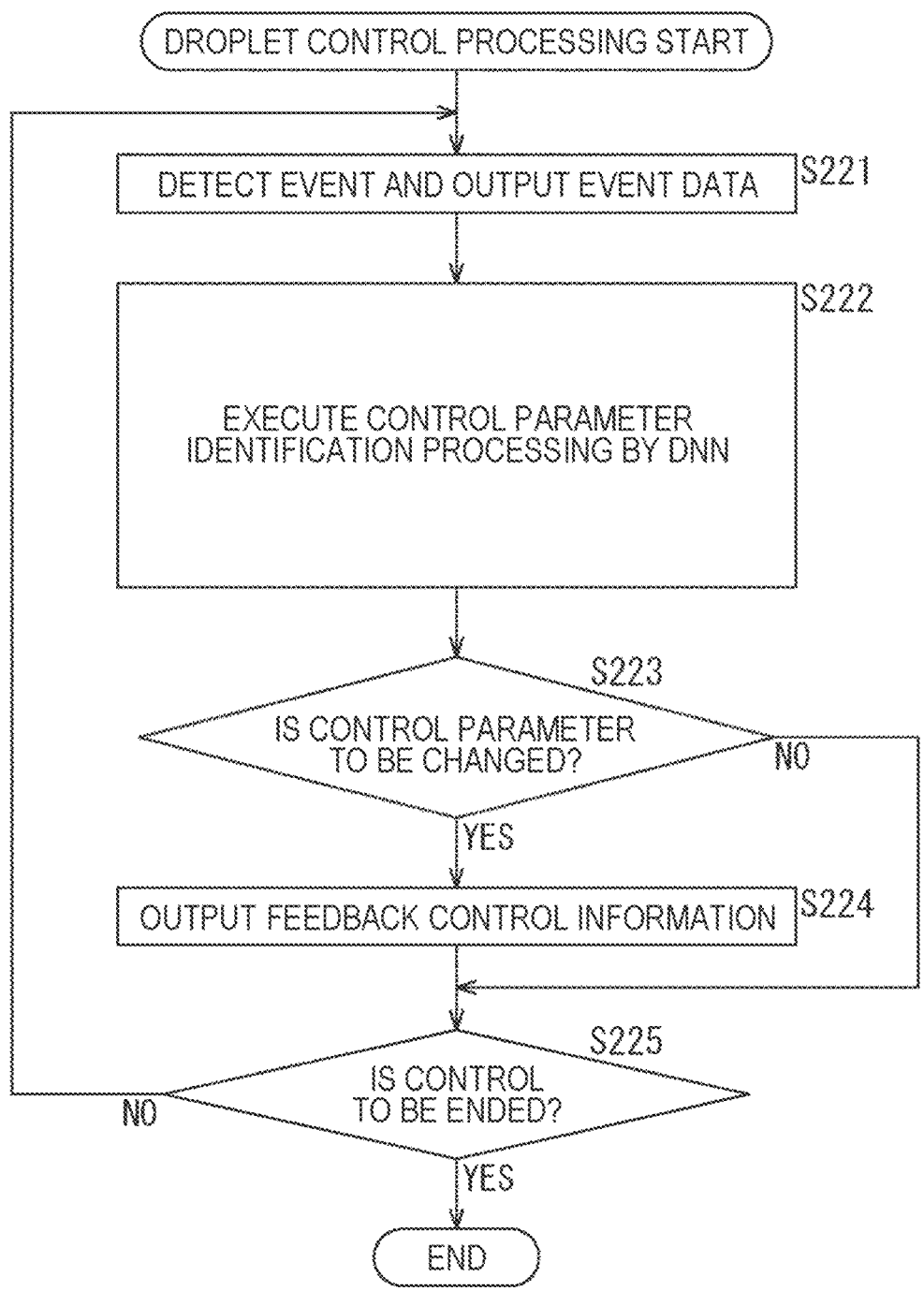
FIG. 32 is a flowchart for explaining the droplet control processing using the DNN.

FIG. 32 illustrates a flowchart of the droplet control processing in a case where the DNN performs the identification processing using the event data as the input data.

Steps S221 and S223 to S225 in FIG. 32 are the same processing as steps S141 and S149 to S151 in FIG. 29, and the processing in steps S142 to S148 in FIG. 29 is changed to the control parameter identification processing by the DNN in step S222 in FIG. 32.

In step S222, for example, the DNN processing unit of the control device 13 identifies a control parameter of the dispenser 11 on the basis of the event data supplied from the EVS camera 12, and outputs the control parameter to the parameter determination unit 105. In step S223, the parameter determination unit 105 determines whether or not to change the control parameter on the basis of the control parameter as an identification result.

In a case where the event data is outputted from the EVS camera 12 as data compressed in a predetermined compression format, the event data compressed in the predetermined compression format may be learned as it is as the input data so that the control parameter can be identified.

For the machine learning for executing the identification processing, a spiking neural network (SNN) may be used in addition to the DNN.

According to the first embodiment described above, the EVS camera 12 detects a luminance change based on the droplet 10 injected from the dispenser 11 as an event, and outputs event data to the control device 13. The control device 13 generates control information for controlling the injection of the droplet 10 by the dispenser 11 on the basis of the event data outputted from the EVS camera 12, and outputs the control information to the dispenser 11. As a result, it is possible to accurately detect the droplet from the dispenser 11 and to control the injection of the droplet with high accuracy.

12. Second Embodiment of Dispenser Control System

Figure 33:
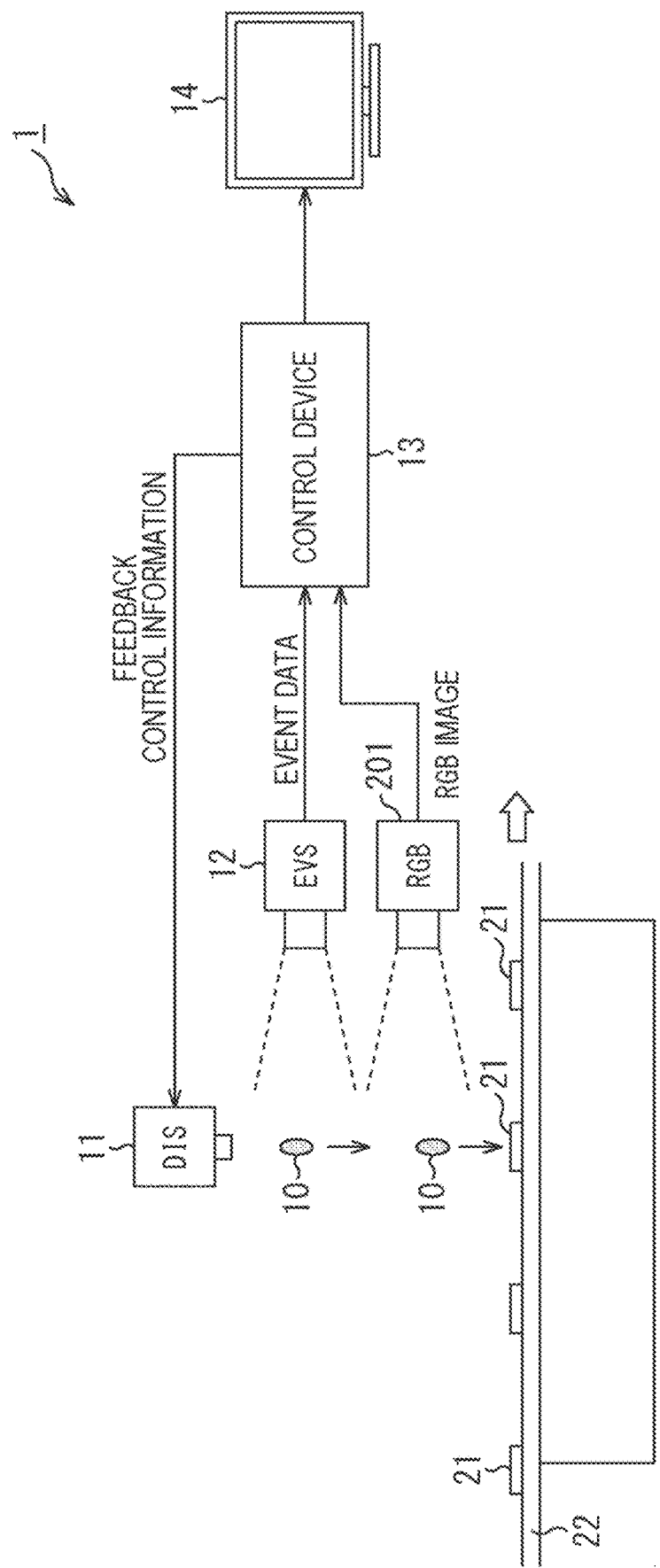
FIG. 33 illustrates a configuration example of a second embodiment of a dispenser control system to which the present technology is applied.

FIG. 33 illustrates a configuration example of a second embodiment of a dispenser control system to which the present technology is applied.

In FIG. 33, parts corresponding to those of the first embodiment illustrated in FIG. 1 are denoted by the same reference numerals, and description of the parts will be omitted as appropriate, focusing on description of different parts.

In a dispenser control system 1 of FIG. 33, an RGB camera 201 that captures an image of a droplet 10 and outputs an RGB image (a color image) is further added. For example, as illustrated in FIG. 33, the RGB camera 201 is arranged side by side with an EVS camera 12 in a moving direction of the droplet 10. A range different from an image-capturing range of the EVS camera 12 is set as an image-capturing range of the RGB camera 201.

A control device 13 detects and tracks the droplet 10 by performing labeling processing, template matching, and the like on an RGB image supplied from the RGB camera 201. Furthermore, the control device 13 analyzes a color, a shape, and the like of the droplet 10 on the basis of the RGB image supplied from the RGB camera 201. The control device 13 takes correspondence with trajectory information of the droplet 10 on the basis of event data of the EVS camera 12, and integrates detection information of the droplet 10 of an event image or a reconfigured image and detection information of the droplet 10 based on the RGB image. On the basis of the integrated detection information, the control device 13 can determine whether or not the control parameter is normal, and perform feedback.

Figure 34:
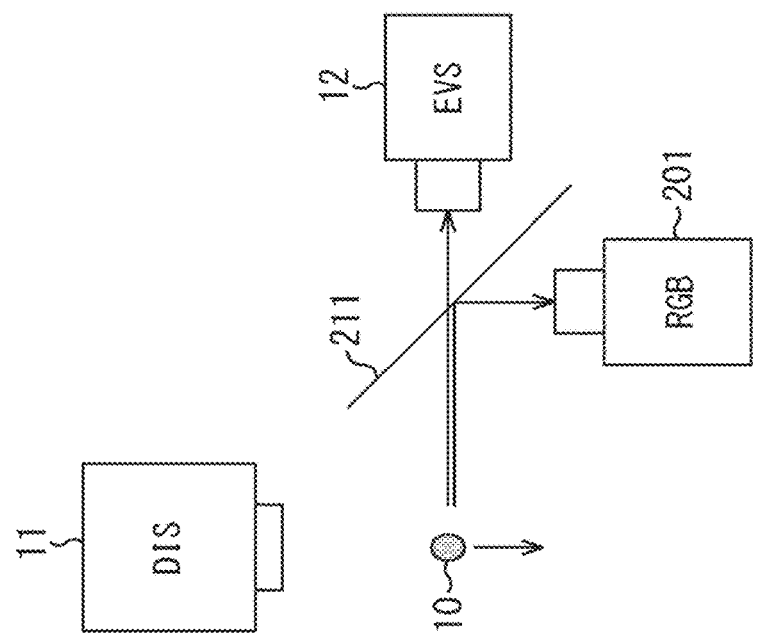
FIG. 34 is a diagram illustrating another arrangement example of an EVS camera and an RGB camera in the second embodiment.

Note that, regarding arrangement of the EVS camera 12 and the RGB camera 201, a configuration of being arranged to capture an image of a same image-capturing range via a half mirror 211 as illustrated in FIG. 34 may be adopted, for example, in addition to a configuration of being arranged side by side in the moving direction of the droplet 10 as illustrated in FIG. 33.

As illustrated in FIG. 33, in a case where the EVS camera 12 and the RGB camera 201 are arranged so as to have different image-capturing ranges, different illumination conditions can be set for the EVS camera 12 and the RGB camera 201, so that illumination suitable for each camera can be used.

Whereas, in a case where the EVS camera 12 and the RGB camera 201 are arranged to capture the same image-capturing range as illustrated in FIG. 34, it is easy to recognize a correspondence of the droplets 10 detected by each camera.

According to the second embodiment described above, the EVS camera 12 detects a luminance change based on the droplet 10 injected from a dispenser 11 as an event, and outputs event data to the control device 13. The control device 13 generates control information for controlling the injection of the droplet 10 by the dispenser 11 on the basis of the event data outputted from the EVS camera 12, and outputs the control information to the dispenser 11. As a result, it is possible to accurately detect the droplet from the dispenser 11 and to control the injection of the droplet with high accuracy.

Furthermore, it is possible to accurately detect the droplet 10 by using the RGB image captured by the RGB camera 201, and control the injection of the droplet.

13. Third Embodiment of Dispenser Control System

Figure 35:
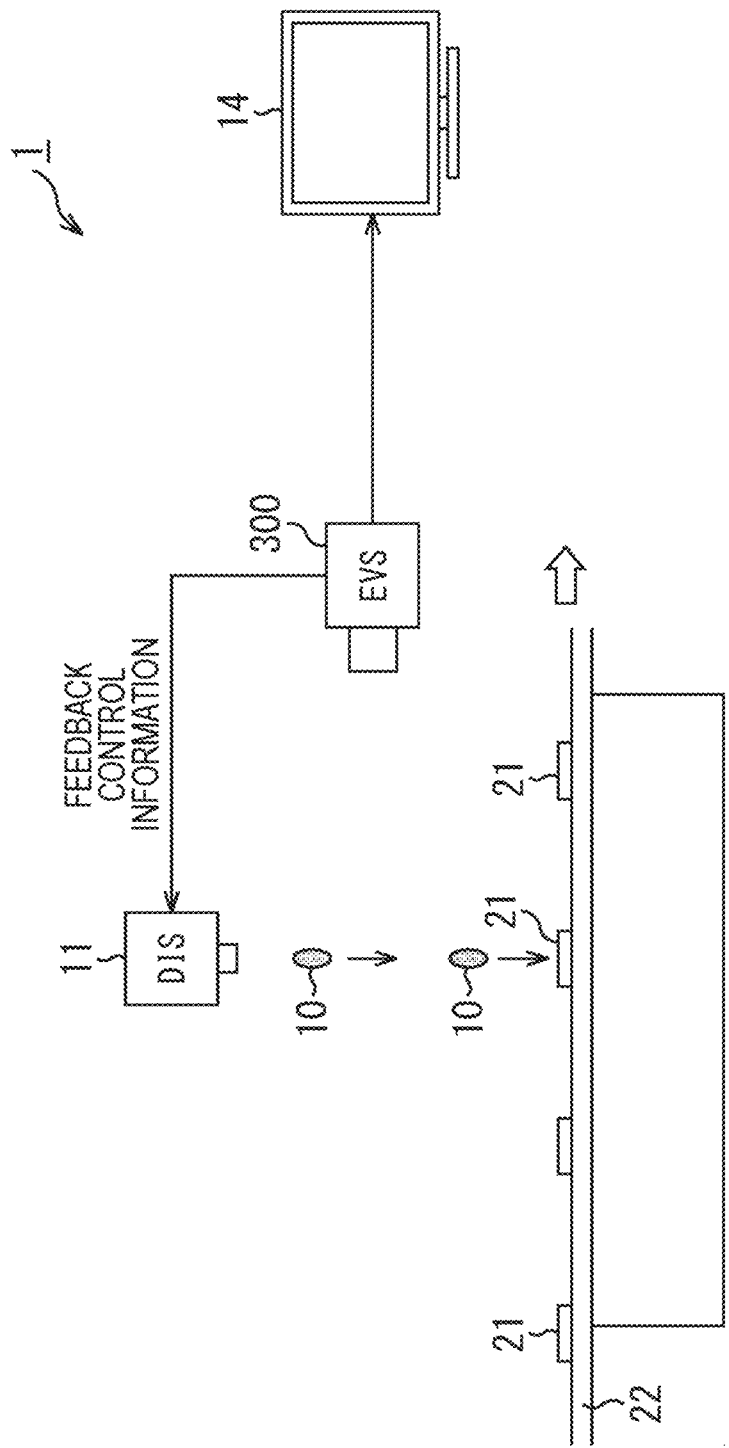
FIG. 35 illustrates a configuration example of a third embodiment of a dispenser control system to which the present technology is applied.

FIG. 35 illustrates a configuration example of a third embodiment of a dispenser control system to which the present technology is applied.

In FIG. 35, parts corresponding to those of the first embodiment illustrated in FIG. 1 are denoted by the same reference numerals, and description of the parts will be omitted as appropriate, focusing on different parts.

As compared the third embodiment illustrated in FIG. 35 with the first embodiment illustrated in FIG. 1, a dispenser control system 1 according to the third embodiment has a configuration in which the EVS camera 12 and the control device 13 according to the first embodiment are replaced with an EVS camera 300.

The EVS camera 300 is an imaging device including an event sensor and a processing unit that executes the function of the control device 13 in the first embodiment. That is, the EVS camera 300 detects, as an event, a luminance change based on a droplet 10 injected from a dispenser 11, and generates event data. Furthermore, the EVS camera 300 generates feedback control information for controlling the injection of the droplet 10 by the dispenser 11 on the basis of the event data, and outputs the feedback control information to the dispenser 11. Moreover, the EVS camera 300 generates a display image to be monitored by a worker on the basis of the event data, and causes a display 14 to display the display image.

Configuration Example of EVS Camera

Figure 36:
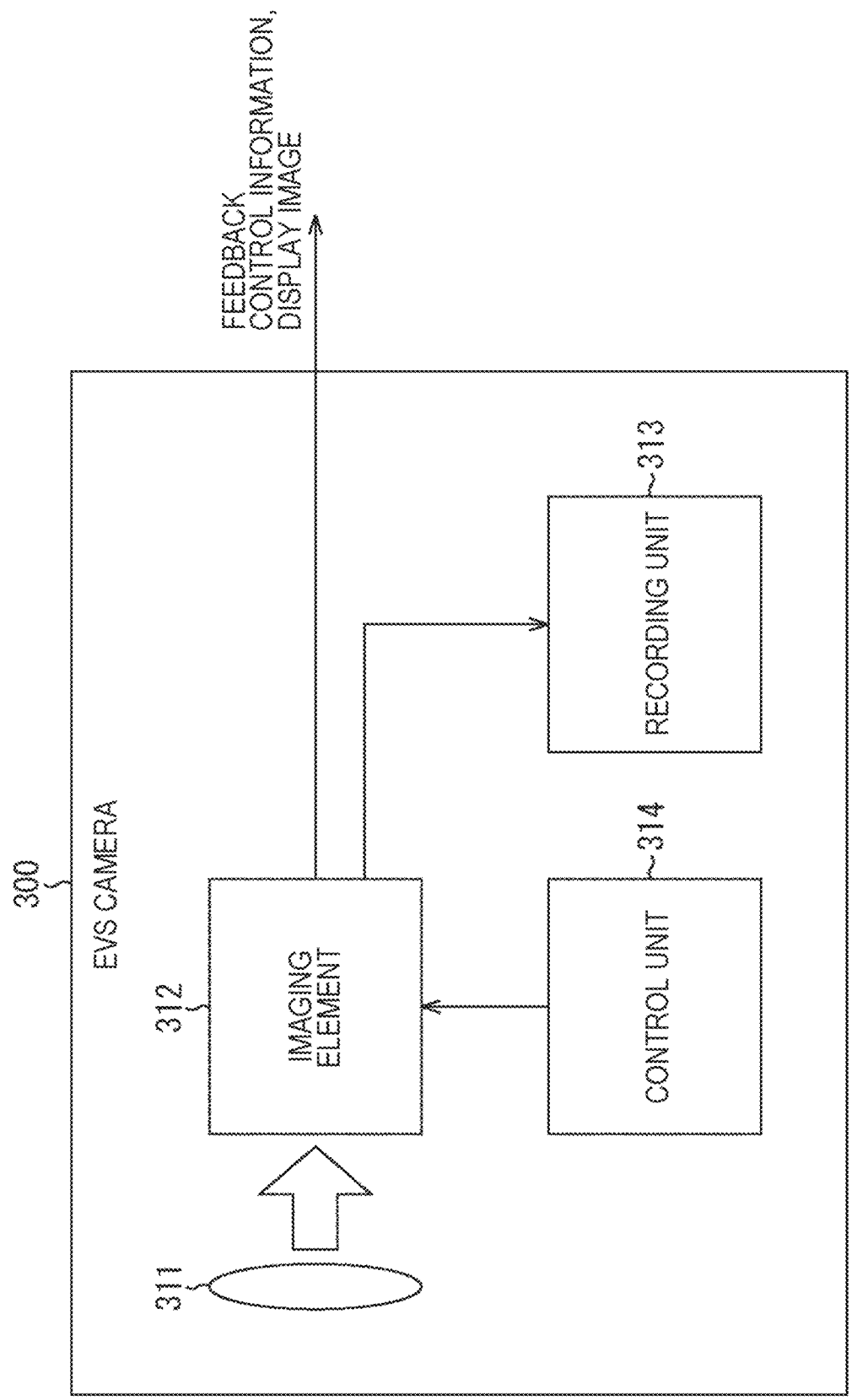
FIG. 36 is a block diagram illustrating a configuration example of an EVS camera.

FIG. 36 is a block diagram illustrating a configuration example of the EVS camera 300 in FIG. 35.

The EVS camera 300 includes an optical unit 311, an imaging element 312, a recording unit 313, and a control unit 314.

The optical unit 311 collects light from a subject and causes the light to enter the imaging element 312. The imaging element 312 is an event sensor that outputs event data indicating an occurrence of an event, in a case where the event occurs with a luminance change in a pixel as the event.

The imaging element 312 photoelectrically converts incident light incident via the optical unit 311 to generate event data, and causes the recording unit 313 to record the event data. Furthermore, the imaging element 312 generates feedback control information for controlling the injection of the droplet 10 by the dispenser 11 on the basis of the event data, and outputs the feedback control information to the dispenser 11. Moreover, the imaging element 312 generates a display image on the basis of the event data, and outputs the display image to the display 14.

The recording unit 313 records and accumulates event data, event images, and the like supplied from the imaging element 312, into a predetermined recording medium. The control unit 314 controls the imaging element 312. For example, the control unit 314 instructs the imaging element 312 to start and end imaging, and specifies a frame rate of an event image and the like.

Figure 37:
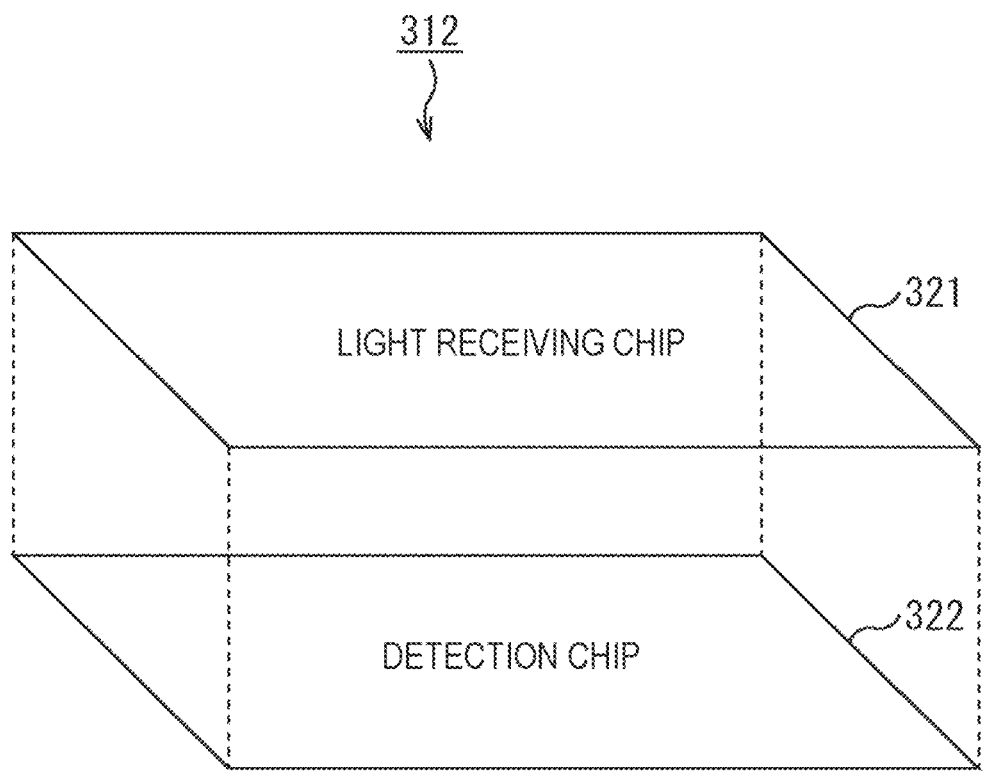
FIG. 37 is a perspective view illustrating a schematic configuration example of an imaging element.

FIG. 37 is a perspective view illustrating a schematic configuration example of the imaging element 312.

The imaging element 312 has a layered structure in which a light receiving chip 321 and a detection chip 322 are bonded and layered. The light receiving chip 321 and the detection chip 322 are electrically connected via a connection part such as a via, Cu—Cu bonding, or a bump, for example.

Figure 38:
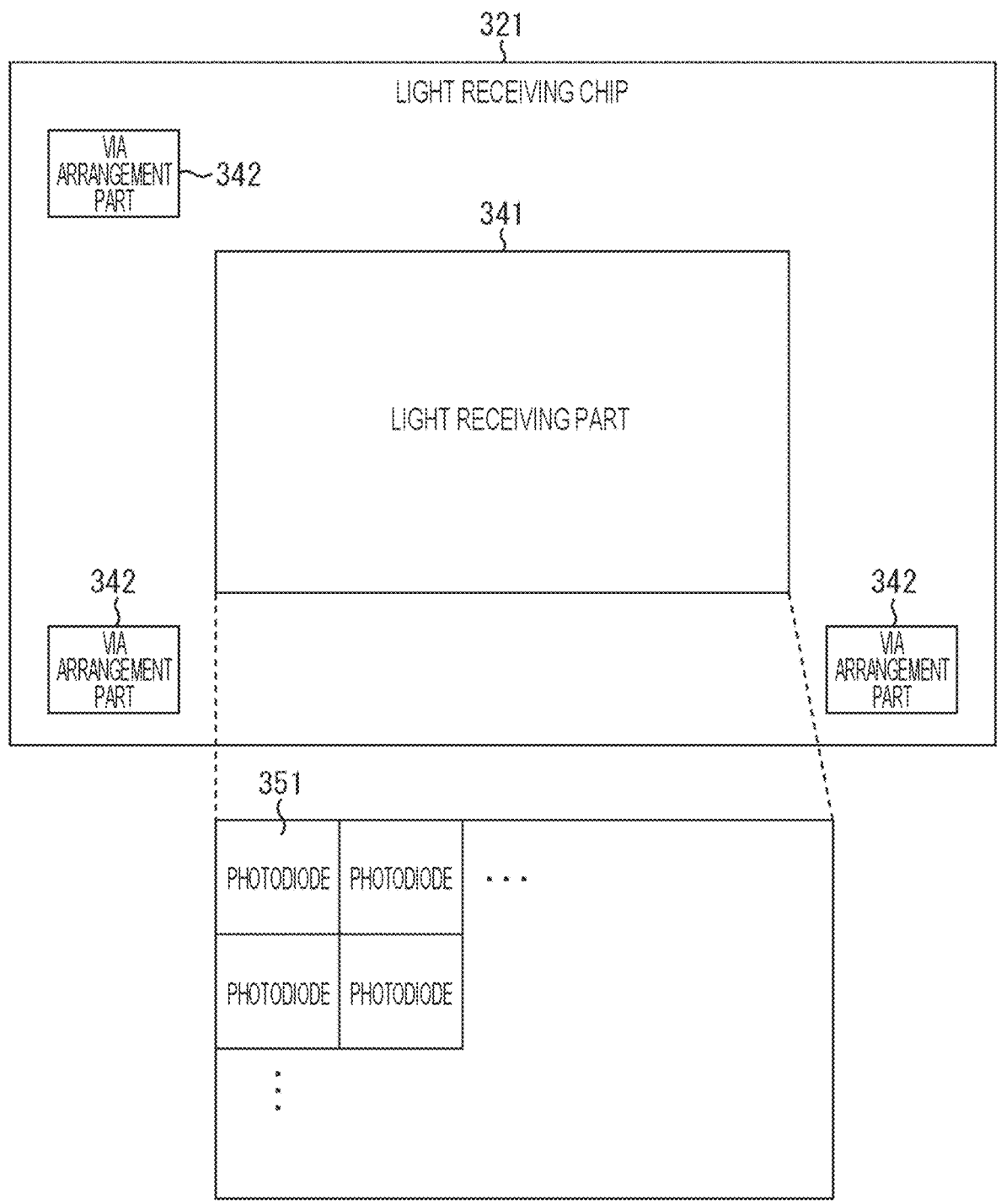
FIG. 38 is a plan view illustrating a configuration example of a light receiving chip.

FIG. 38 is a plan view illustrating a configuration example of the light receiving chip 321.

The light receiving chip 321 includes a light receiving part 341 formed in a chip central part, and one or more via arrangement parts 342 formed in an outer peripheral part outside the light receiving part 341. In the example of FIG. 38, three via arrangement parts 342 are provided at corners of a chip outer periphery.

In the light receiving part 341, a plurality of photodiodes 351 is arranged in a two-dimensional lattice pattern. The photodiode 351 photoelectrically converts incident light to generate a photocurrent. Each of the photodiodes 351 is assigned with a pixel address including a row address and a column address, and is treated as a pixel. In the via arrangement part 342, a via electrically connected to the detection chip 322 is arranged.

Figure 39:
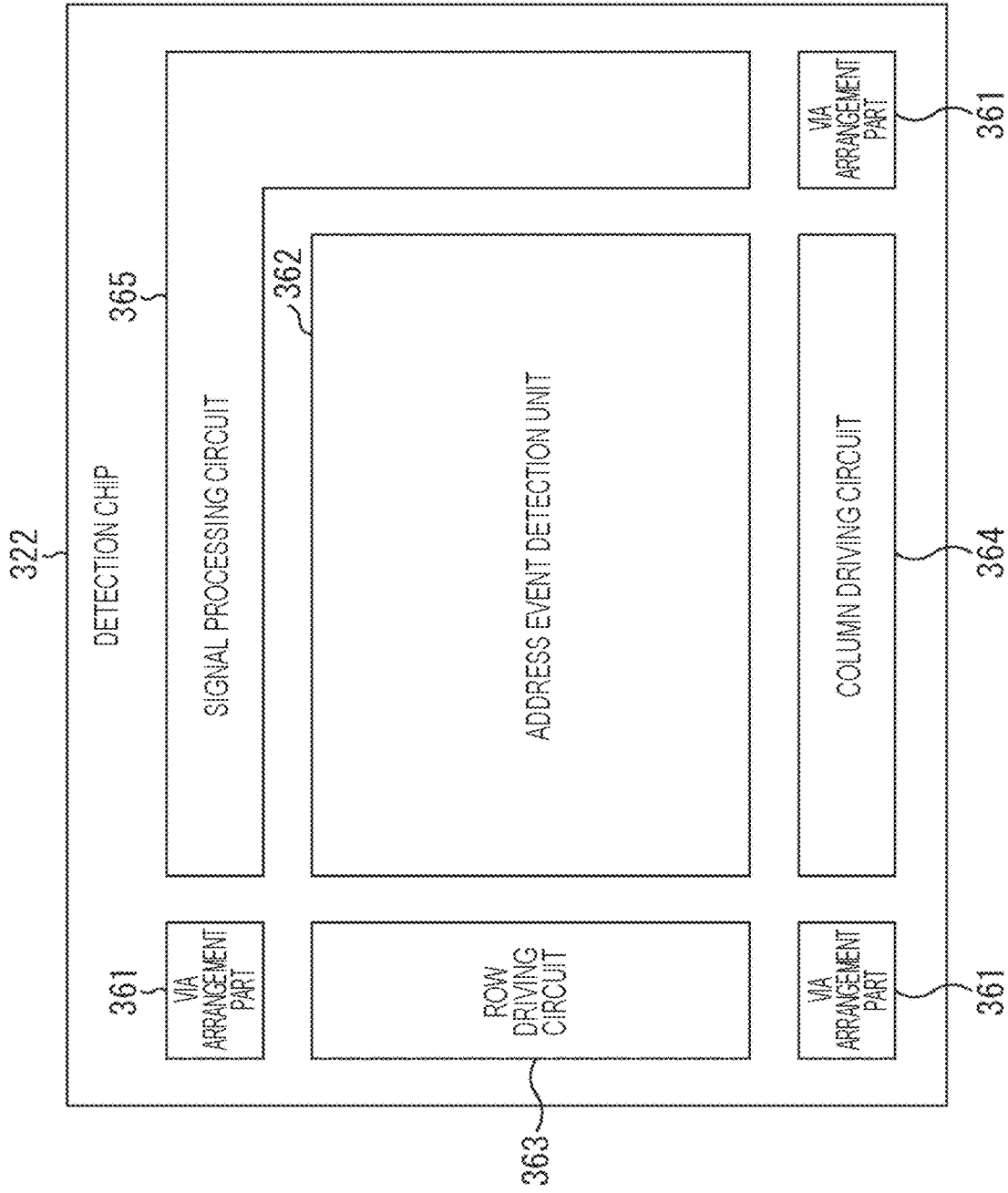
FIG. 39 is a plan view illustrating a configuration example of a detection chip.

FIG. 39 is a plan view illustrating a configuration example of the detection chip 322.

The detection chip 322 includes one or more via arrangement parts 361, an address event detection unit 362, a row driving circuit 363, a column driving circuit 364, and a signal processing circuit 365.

The via arrangement part 361 is provided at a position corresponding to the via arrangement part 342 of the light receiving chip 321, and is electrically connected to the light receiving chip 321 through a via. In FIG. 39, the via arrangement parts 361 are individually provided at positions corresponding to the three via arrangement parts 342 in FIG. 38, and a total of three via arrangement parts 361 are formed on the detection chip 322.

The address event detection unit 362 generates a detection signal from a photocurrent of each of the plurality of photodiodes 351 of the light receiving chip 321, and outputs the detection signal to the signal processing circuit 365. The detection signal is a 1-bit signal indicating whether or not the fact that a light amount of the incident light exceeds a predetermined threshold value is detected as an address event.

The row driving circuit 363 selects a predetermined row address of the address event detection unit 362, and outputs a detection signal of the selected row address to the signal processing circuit 365.

The column driving circuit 364 selects a predetermined column address of the address event detection unit 362, and outputs a detection signal of the selected column address to the signal processing circuit 365.

The signal processing circuit 365 performs predetermined signal processing on the detection signal outputted from the address event detection unit 362. Moreover, for example, the signal processing circuit 365 generates event data on the basis of the detection signal outputted from the address event detection unit 362, and further executes processing of generating an event image, a reconfigured image, and a display image. Furthermore, the signal processing circuit 365 determines whether or not a control parameter of the dispenser 11 is within a normal range on the basis of the generated event image and reconfigured image, and the feedback control information is generated and outputted in a case where it is determined that the control parameter is out of the normal range. Therefore, in the third embodiment, the processing executed by the control device 13 in FIG. 1 is executed by the signal processing circuit 365.

Figure 40:
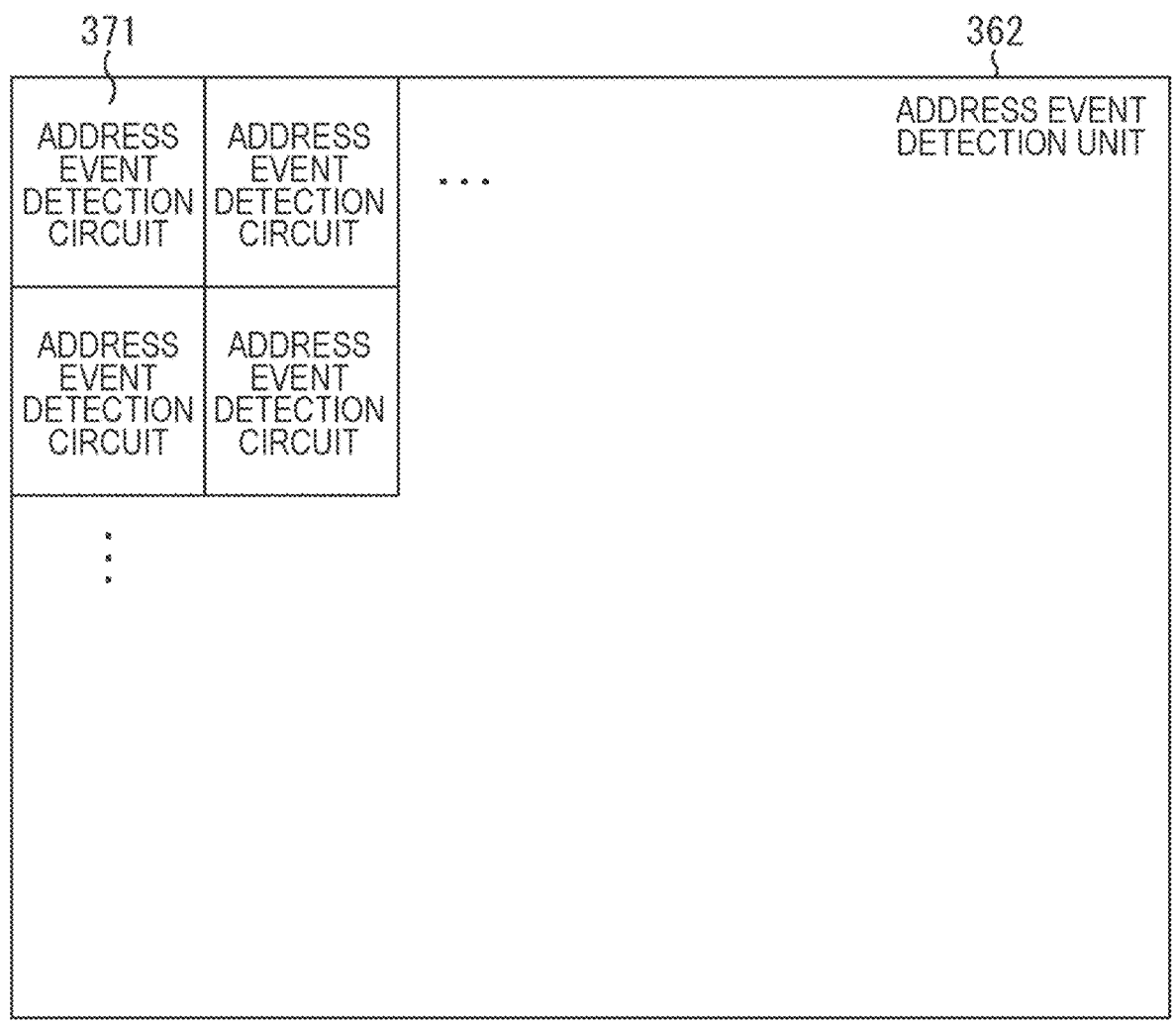
FIG. 40 is a plan view illustrating details of an address event detection unit.

FIG. 40 is a plan view illustrating details of the address event detection unit 362.

In the address event detection unit 362, a plurality of address event detection circuits 371 is arranged in a two-dimensional lattice pattern. The address event detection circuit 371 is arranged, for example, in a one-to-one manner with the photodiode 351 on the light receiving chip 321. Each address event detection circuit 371 is electrically connected to the corresponding photodiode 351 by a via, Cu—Cu bonding, or the like.

Figure 41:
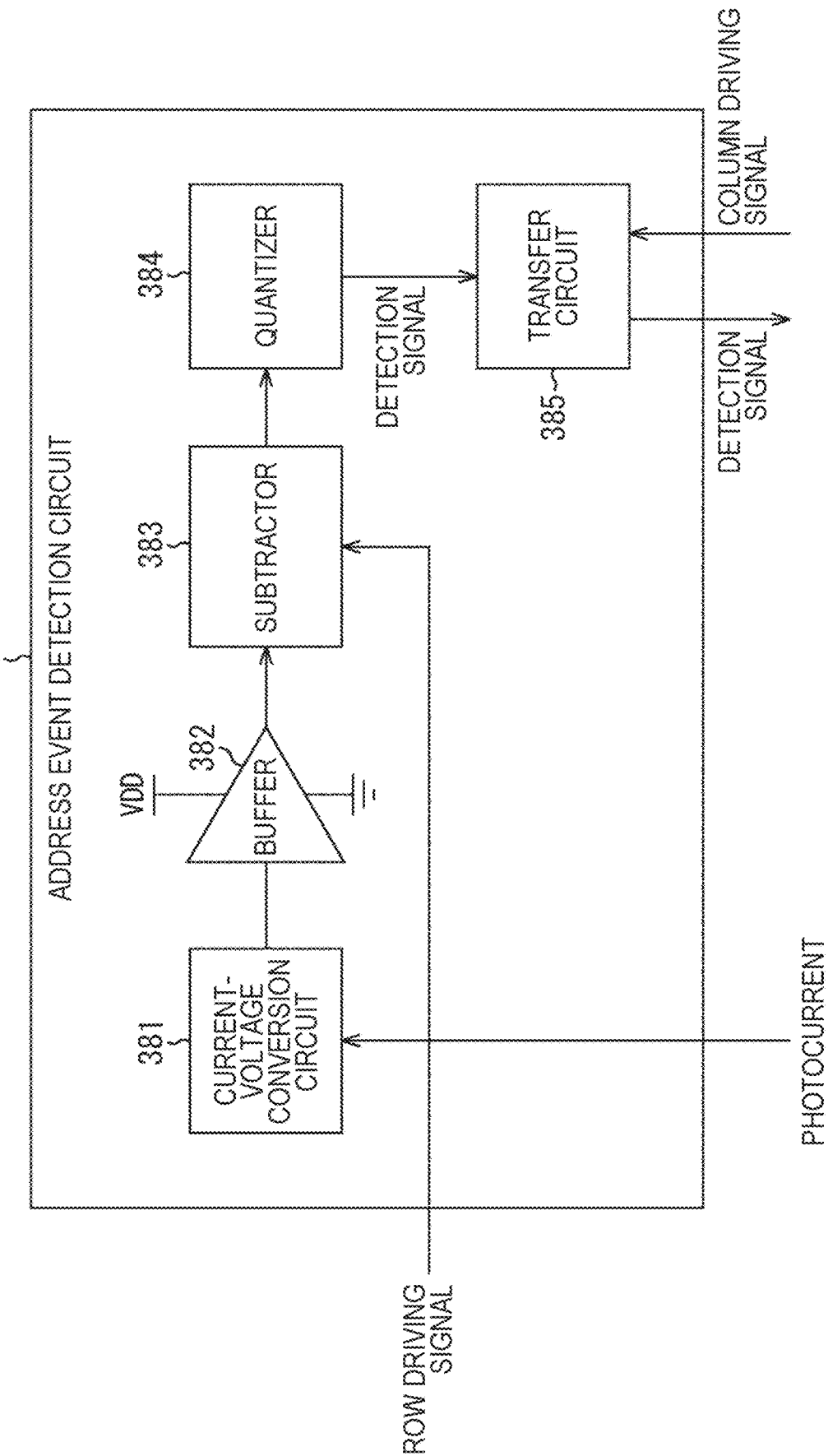
FIG. 41 is a block diagram illustrating a configuration example of an address event detection circuit.

FIG. 41 is a block diagram illustrating a configuration example of the address event detection circuit 371.

The address event detection circuit 371 includes a current-voltage conversion circuit 381, a buffer 382, a subtractor 383, a quantizer 384, and a transfer circuit 385.

The current-voltage conversion circuit 381 converts a photocurrent from the corresponding photodiode 351 into a voltage signal. The current-voltage conversion circuit 381 generates a voltage signal corresponding to a logarithmic value of the photocurrent, and outputs the voltage signal to the buffer 382.

The buffer 382 buffers the voltage signal from the current-voltage conversion circuit 381, and outputs the voltage signal to the subtractor 383. This buffer 382 makes it possible to secure isolation of noise accompanying a switching operation in a subsequent stage, and to improve a driving force for driving the subsequent stage. Note that the buffer 382 can be omitted.

The subtractor 383 lowers a level of the voltage signal from the buffer 382, in accordance with a row driving signal from the row driving circuit 363. The subtractor 383 outputs the lowered voltage signal to the quantizer 384.

The quantizer 384 quantizes the voltage signal from the subtractor 383 into a digital signal, and supplies the digital signal to the transfer circuit 385 as a detection signal. The transfer circuit 385 transfers (outputs) the detection signal to the signal processing circuit 365 in accordance with a column driving signal from the column driving circuit 364.

Figure 42:
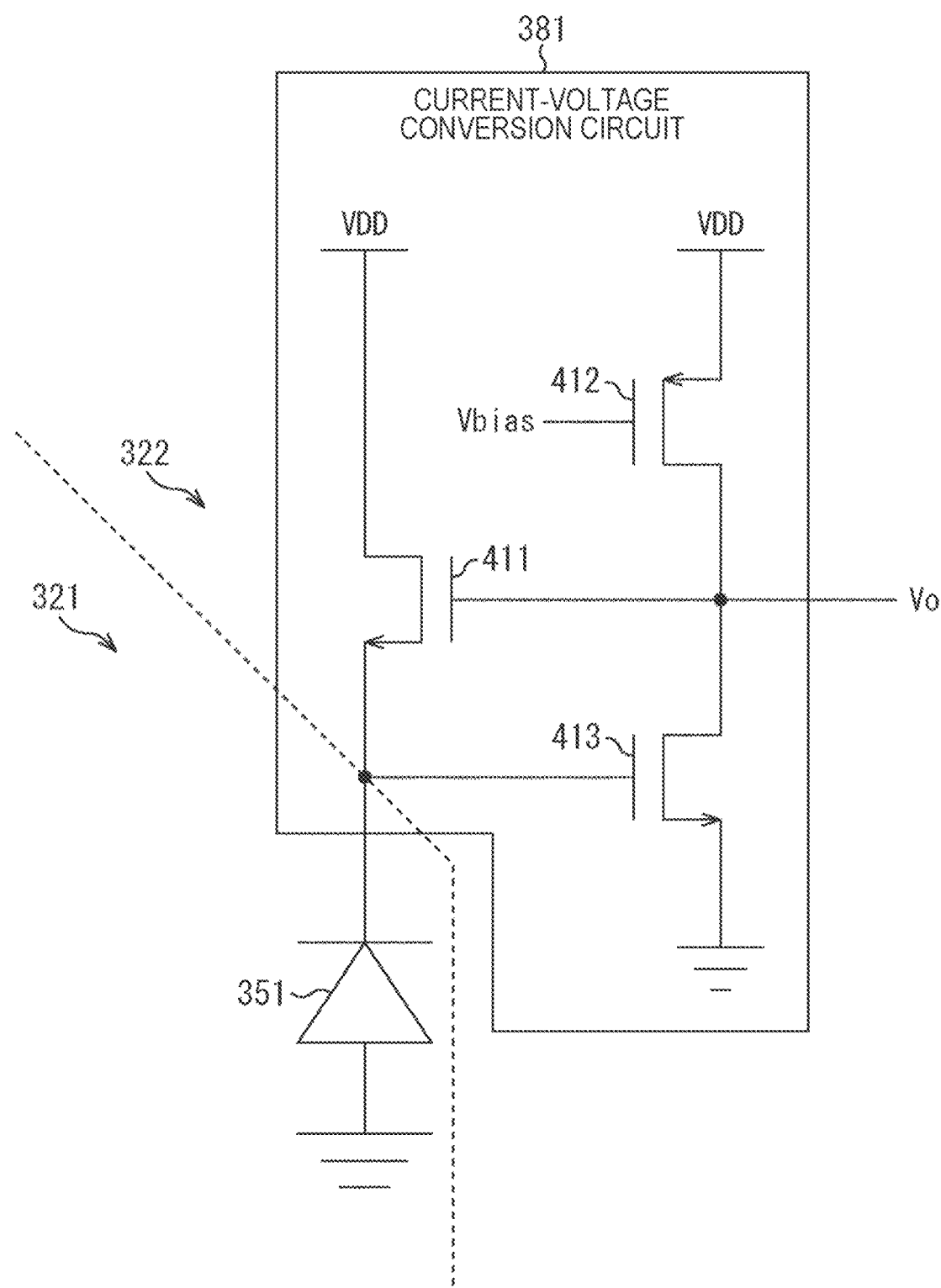
FIG. 42 is a diagram illustrating a detailed configuration of a current-voltage conversion circuit.

FIG. 42 is a circuit illustrating a detailed configuration of the current-voltage conversion circuit 381. While the current-voltage conversion circuit 381 is arranged on the detection chip 322, FIG. 42 also illustrates the photodiode 351 of the light receiving chip 321 connected to the current-voltage conversion circuit 381.

The current-voltage conversion circuit 381 includes FETs 411 to 413. As the FETs 411 and 413, for example, an N-type metal oxide semiconductor (NMOS) FET can be adopted, and as the FET 412, for example, a P-type metal oxide semiconductor (PMOS) FET can be adopted.

The photodiode 351 of the light receiving chip 321 receives incident light, performs photoelectric conversion, and generates and allows flowing of a photocurrent as an electric signal. The current-voltage conversion circuit 381 converts the photocurrent from the photodiode 351 into a voltage (hereinafter, also referred to as a photovoltage) Vo corresponding to a logarithm of the photocurrent, and outputs the voltage Vo to the buffer 382 (FIG. 41).

A source of the FET 411 is connected to a gate of the FET 413, and a photocurrent from the photodiode 351 flows through a connection point between the source of the FET 411 and the gate of the FET 413. A drain of the FET 411 is connected to a power supply VDD, and a gate thereof is connected to a drain of the FET 413.

A source of the FET 412 is connected to the power supply VDD, and a drain thereof is connected to a connection point between the gate of the FET 411 and the drain of the FET 413. A predetermined bias voltage Vbias is applied to a gate of the FET 412. A source of the FET 413 is grounded.

The drain of the FET 411 is connected to the power supply VDD side, and is a source follower. The photodiode 351 is connected to the source of the FET 411 that is a source follower, and this connection allows flowing of a photocurrent due to an electric charge generated by photoelectric conversion of the photodiode 351, through (the drain to the source of) the FET 411. The FET 411 operates in a sub-threshold value region, and the photovoltage Vo corresponding to a logarithm of the photocurrent flowing through the FET 411 appears at the gate of the FET 411. As described above, in the photodiode 351, the photocurrent from the photodiode 351 is converted into the photovoltage Vo corresponding to the logarithm of the photocurrent by the FET 411.

The photovoltage Vo is outputted from the connection point between the gate of the FET 411 and the drain of the FET 413 to the subtractor 383 via the buffer 382.

Figure 43:
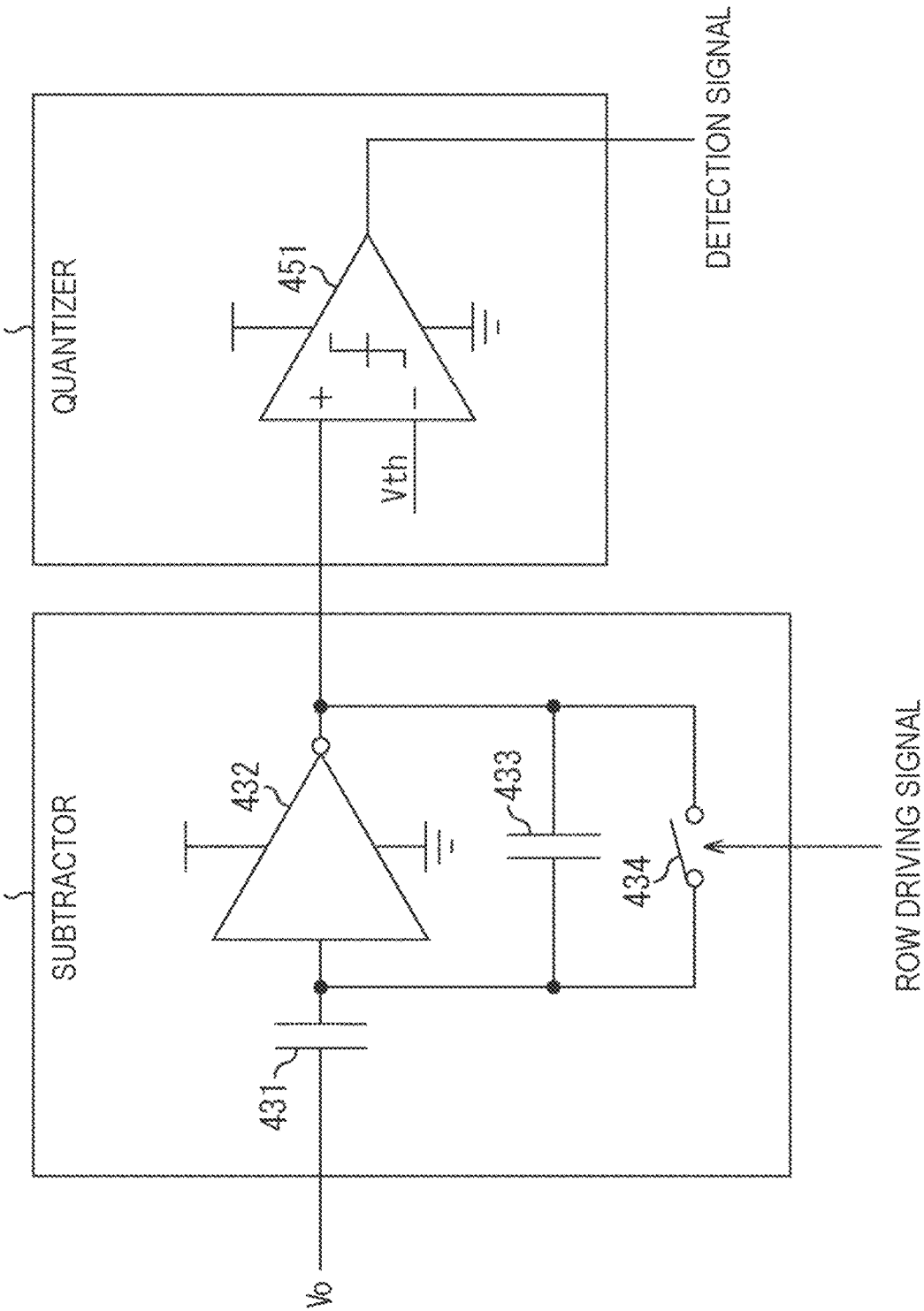
FIG. 43 is a diagram illustrating a detailed configuration of a subtractor and a quantizer.

FIG. 43 illustrates a detailed configuration of the subtractor 383 and the quantizer 384.

For the photovoltage Vo from the current-voltage conversion circuit 381, the subtractor 383 computes a difference between a photovoltage at the present time and a photovoltage at a timing different from the present time by a minute time, and outputs a difference signal Vout corresponding to the difference.

The subtractor 383 includes a capacitor 431, an operational amplifier 432, a capacitor 433, and a switch 434. The quantizer 384 includes a comparator 451.

One end of the capacitor 431 is connected to an output of the buffer 382 (FIG. 41), and another end is connected to an input terminal of the operational amplifier 432. Therefore, the photovoltage Vo is inputted to the (inverting) input terminal of the operational amplifier 432 via the capacitor 431.

An output terminal of the operational amplifier 432 is connected to a non-inverting input terminal (+) of the comparator 451 of the quantizer 384.

One end of the capacitor 433 is connected to the input terminal of the operational amplifier 432, and another end is connected to the output terminal of the operational amplifier 432.

The switch 434 is connected to the capacitor 433 so as to turn on/off connection between both ends of the capacitor 433. The switch 434 turns on/off the connection between both ends of the capacitor 433 by turning on/off in accordance with a row driving signal of the row driving circuit 363.

The capacitor 433 and the switch 434 constitute a switched capacitor. When the switch 434 having been turned off is temporarily turned on and turned off again, the capacitor 433 is reset to a state in which electric charges are discharged and electric charges can be newly accumulated.

The photovoltage Vo of the capacitor 431 on the photodiode 351 side when the switch 434 is turned on is denoted by Vinit, and a capacitance (an electrostatic capacitance) of the capacitor 431 is denoted by C1. The input terminal of the operational amplifier 432 is virtually grounded, and an electric charge Qinit accumulated in the capacitor 431 in a case where the switch 434 is turned on is expressed by Formula (1).

$$Q_{init} = C1 \times V_{init} \tag{1}$$

Furthermore, in a case where the switch 434 is on, both ends of the capacitor 433 are short-circuited, so that the electric charge accumulated in the capacitor 433 becomes 0.

Thereafter, when the photovoltage Vo of the capacitor 431 on the photodiode 351 side in a case where the switch 434 is turned off is represented as Vafter, an electric charge Qafter accumulated in the capacitor 431 when the switch 434 is turned off is represented by Formula (2).

$$Qafter = C1 \times Vafter \qquad (2)$$

When the capacitance of the capacitor 433 is represented as C2, then an electric charge Q2 accumulated in the capacitor 433 is represented by Formula (3) by using the difference signal Vout which is an output voltage of the operational amplifier 432.

$$Q2 = -C2 \times Vout \qquad (3)$$

Before and after the switch 434 is turned off, a total electric charge amount of the electric charge of the capacitor 431 and the electric charge of the capacitor 433 does not change, so that Formula (4) is established.

$$Qinit = Qafter + Q2 \qquad (4)$$

When Formulas (1) to (3) are substituted into Formula (4), Formula (5) is obtained.

$$Vout = -(C1/C2) \times (Vafter - Vinit) \qquad (5)$$

According to Formula (5), the subtractor 383 subtracts the photovoltages Vafter and Vinit, that is, calculates the difference signal Vout corresponding to a difference (Vafter-Vinit) between the photovoltages Vafter and Vinit. According to Formula (5), a gain of subtraction by the subtractor 383 is C1/C2. Therefore, the subtractor 383 outputs, as the difference signal Vout, a voltage obtained by multiplying a change in the photovoltage Vo after resetting of the capacitor 433 by C1/C2.

The subtractor 383 outputs the difference signal Vout by turning on and off the switch 434 with a row driving signal outputted from the row driving circuit 363.

The comparator 451 of the quantizer 384 compares the difference signal Vout from the subtractor 383 with a predetermined threshold value voltage Vth inputted to the inverting input terminal (−), and outputs a comparison result to the transfer circuit 385 as a detection signal.

Note that, in the configuration example of FIG. 42, only the photodiode 351 of the light receiving part 341 has been arranged on the light receiving chip 321, and the address event detection circuit 371 including the current-voltage conversion circuit 381 has been arranged on the detection chip 322. In this case, a circuit scale in the detection chip 322 may increase with an increase in the number of pixels. Therefore, a part of the address event detection circuit 371 may be arranged in the light receiving part 341 of the light receiving chip 321.

Figure 44:
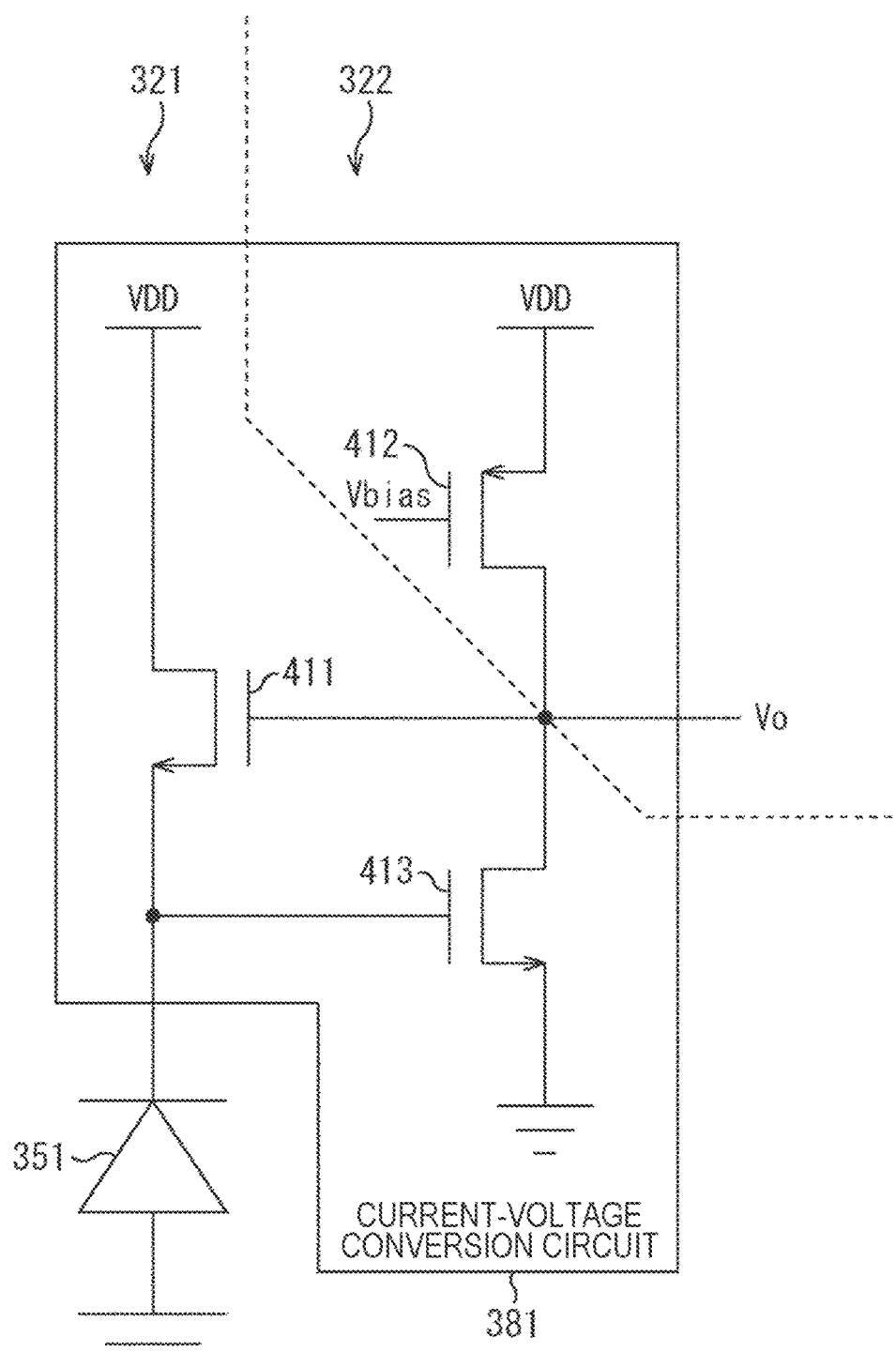
FIG. 44 is a diagram illustrating another arrangement example of the light receiving chip and the detection chip.

For example, as illustrated in FIG. 44, a part of the current-voltage conversion circuit 381 of the address event detection circuit 371, for example, the FETs 411 and 413 configured with N-type MOS (NMOS) FETs may be arranged in the light receiving part 341 of the light receiving chip 321. In this case, the light receiving chip 321 includes only the N-type MOS FET, and the current-voltage conversion circuit 381 of the detection chip 322 includes only the P-type MOS FET. Therefore, the number of steps in forming the transistor can be reduced as compared with the case where the P-type and the N-type are mixed. As a result, a manufacturing cost of the light receiving chip 321 can be reduced.

According to the third embodiment described above, the EVS camera 300 can detect the droplet 10 of the dispenser 11 on the basis of event data generated by the self, generate control information for controlling the injection of the droplet 10, and output the control information to the dispenser 11. As a result, it is possible to accurately detect the droplet from the dispenser 11 and to control the injection of the droplet with high accuracy.

14. Conclusion

According to each embodiment of the dispenser control system 1 described above, by using the EVS camera 12 configured to detect a luminance change as an event and outputs asynchronously, a computation amount and a communication amount can be greatly reduced as compared with a high-speed camera having a frame rate of about 1000 fps, and an image of the droplet 10 can be captured at a high speed. Furthermore, since an event image or a reconfigured image generated on the basis of event data is a binary image, a computation amount is small, and power consumption can also be reduced.

According to the droplet control processing of the dispenser control system 1, trajectory information, a size (a width), a volume, and the like of the droplet 10 can be detected at a high speed from an event image or a reconfigured image generated on the basis of event data, and a control parameter of the dispenser 11 can be controlled with high accuracy. As a result, it is possible to accurately detect the droplet 10 from the dispenser 11 and to control the injection of the droplet 10 with high accuracy. It is possible to determine whether the injection of the droplet 10 by the dispenser 11 is good or bad in real time.

15. Computer Configuration Example

The control processing of the droplets 10 executed by the control device 13 described above can be executed by hardware or software. In a case where the series of processes are performed by software, a program that configures the software is installed in a computer. Here, examples of the computer include, for example, a microcomputer that is built in dedicated hardware, a general-purpose personal computer that can perform various functions by being installed with various programs, and the like.

Figure 45:
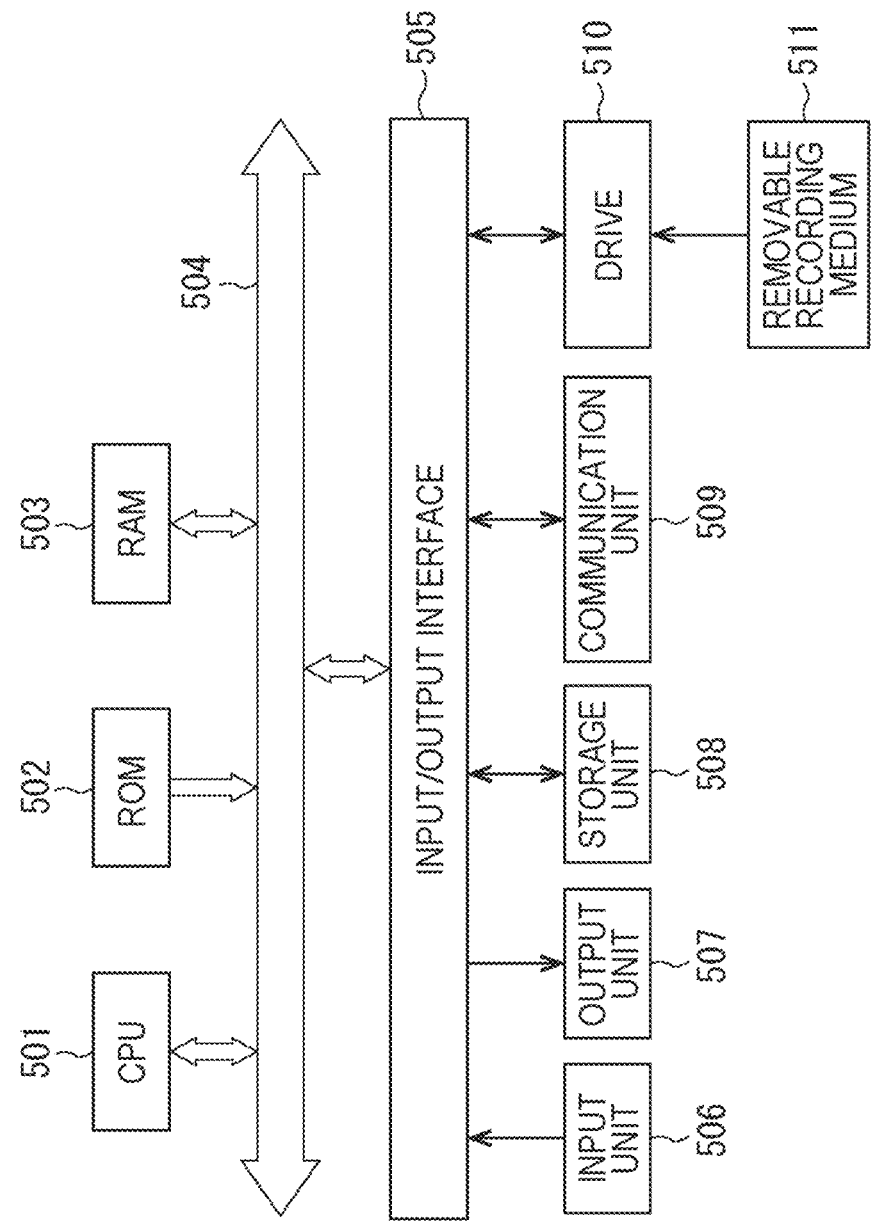
FIG. 45 is a block diagram illustrating a configuration example of hardware of a computer.

FIG. 45 is a block diagram illustrating a configuration example of hardware of a computer as an information processing apparatus that executes the above-described series of droplet control processing by a program.

In the computer, a central processing unit (CPU) 501, a read only memory (ROM) 502, and a random access memory (RAM) 503 are mutually connected by a bus 504.

An input/output interface 505 is further connected to the bus 504. To the input/output interface 505, an input unit 506, an output unit 507, a storage unit 508, a communication unit 509, and a drive 510 are connected.

The input unit 506 includes a keyboard, a mouse, a microphone, a touch panel, an input terminal, and the like. The output unit 507 includes a display, a speaker, an output terminal, and the like. The storage unit 508 includes a hard disk, a RAM disk, a nonvolatile memory, and the like. The communication unit 509 includes a network interface or the like. The drive 510 drives a removable recording medium 511 such as a magnetic disk, an optical disk, a magneto-optical disk, or a semiconductor memory.

In the computer configured as described above, the series of processes described above are performed, for example, by the CPU 501 loading a program recorded in the storage unit 508 into the RAM 503 via the input/output interface 505 and the bus 504, and executing. The RAM 503 also appropriately stores data necessary for the CPU 501 to execute various processes, for example.

The program executed by the computer (the CPU 501) can be provided by being recorded on, for example, the removable recording medium 511 as a package medium or the like. Furthermore, the program can be provided via a wired or wireless transmission medium such as a local area network, the Internet, or digital satellite broadcasting.

In the computer, by attaching the removable recording medium 511 to the drive 510, the program can be installed in the storage unit 508 via the input/output interface 505. Furthermore, the program can be received by the communication unit 509 via a wired or wireless transmission medium, and installed in the storage unit 508. Besides, the program can be installed in advance in the ROM 502 and the storage unit 508.

Note that the program executed by the computer may be a program that performs processing in time series according to an order described in this specification, or may be a program that performs processing in parallel or at necessary timing such as when a call is made.

The embodiments of the present technology are not limited to the above-described embodiments, and various modifications can be made without departing from the scope of the present technology.

For example, a form in which all or some of the plurality of embodiments described above are combined can be appropriately adopted.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

Note that the effects described in this specification are merely examples and are not limited, and effects other than those described in this specification may be present.

Note that the present technology can have the following configurations.

(1)

An information processing apparatus including:

an event sensor including a pixel configured to photoelectrically convert an optical signal and output a pixel signal, the event sensor being configured to output a temporal luminance change of the optical signal as an event signal on the basis of the pixel signal; and a processor configured to detect a droplet injected from the dispenser on the basis of the event signal.

(2)

The information processing apparatus according to (1) above, in which the event sensor is disposed such that a reading direction of the pixel signal coincides with a moving direction of the droplet.

(3)

The information processing apparatus according to (1) or (2) above, in which the event sensor detects the droplet from two orthogonal directions.

(4)

The information processing apparatus according to any one of (1) to (3) above, in which the two orthogonal directions are detected by the event sensors that are different.

(5)

The information processing apparatus according to any one of (1) to (3) above, in which the two orthogonal directions are detected by one piece of the event sensor.

(6)

The information processing apparatus according to any one of (1) to (5) above, in which the processor further generates and outputs control information for controlling injection of the droplet by the dispenser.

(7)

The information processing apparatus according to (6) above, in which the processor generates an event image in which the event signal from the event sensor is collected in unit of a predetermined integration time, and generates the control information on the basis of the generated event image.

(8)

The information processing apparatus according to (7) above, in which as the event image, the processor generates: a first event image based on the event signal of a first event that is a luminance change of a first polarity; and a second event image based on the event signal of a second event that is a luminance change of a second polarity, the second polarity being a polarity opposite to the first polarity.

(9)

The information processing apparatus according to (7) or (8) above, in which the event image is a binary image in which a pixel value of a pixel in which the event signal has occurred is set to 1 and a pixel value of a pixel in which the event signal has not occurred is set to 0.

(10)

The information processing apparatus according to any one of (7) to (9) above, in which the predetermined integration time is shorter than one frame period corresponding to a frame rate.

(11)

The information processing apparatus according to any one of (8) to (10) above, in which the processor further generates a display image in which a pixel value of a pixel in which the first event has occurred is set to a first luminance value, a pixel value of a pixel in which the second event has occurred is set to a second luminance value, and a pixel value of other pixel is set to a third luminance value.

(12)

The information processing apparatus according to any one of (8) to (11) above, in which the processor calculates trajectory information of the droplet on the basis of the first event image, and generates the control information on the basis of the calculated trajectory information.

(13)

The information processing apparatus according to any one of (8) to (12) above, in which the processor performs noise removal processing of removing noise of the first event image.

(14)

The information processing apparatus according to any one of (1) to (13) above, in which
the processor generates a reconfigured image in which a luminance value is estimated on the basis of the event signal in unit of a frame rate period corresponding to a frame rate.

(15)

The information processing apparatus according to (14) above, in which
the processor generates the reconfigured image by using all the event signals in past time.

(16)

The information processing apparatus according to (14) or (15) above, in which
the processor calculates a width of the droplet on the basis of the reconfigured image, and generates control information for controlling injection of the droplet by the dispenser on the basis of the calculated width.

(17)

The information processing apparatus according to any one of (14) to (16) above, in which
the processor calculates a volume of the droplet on the basis of the reconfigured image, and generates control information for controlling injection of the droplet by the dispenser on the basis of the calculated volume.

(18)

The information processing apparatus according to any one of (14) to (17) above, in which
the processor performs noise removal processing of setting, to zero, a pixel value of a pixel in which an event does not occur within a certain period before a generation timing of the reconfigured image.

(19)

The information processing apparatus according to any one of (1) to (17) above, in which
the processor detects the droplet also on the basis of an RGB image obtained by capturing an image of the droplet with an image sensor.

(20)

An information processing system including:
a dispenser configured to inject predetermined liquid;
an event sensor including a pixel configured to photoelectrically convert an optical signal and output a pixel signal, the event sensor being configured to output a temporal luminance change of the optical signal as an event signal on the basis of the pixel signal; and
a processor configured to detect a droplet injected from the dispenser on the basis of the event signal.

REFERENCE SIGNS LIST

1 Dispenser control system
10 Droplet
11 Dispenser
12 EVS camera
13 Control device
14 Display
21 Substrate
22 Conveyor
61 Illumination device
101 Pre-processing unit
102 Image output unit
103 Droplet detection unit
104 Droplet tracking unit
105 Parameter determination unit
111 Framing processing unit
112 Noise removal processing unit
121 First frame processing unit
122 Second frame processing unit
201 RGB camera
300 EVS camera
312 Imaging element
365 Signal processing circuit
501 CPU
502 ROM
503 RAM
506 Input unit
507 Output unit
508 Storage unit
509 Communication unit

The invention claimed is:

1. An information processing apparatus comprising:
an event sensor including a pixel configured to photoelectrically convert an optical signal and output a pixel signal, the event sensor being configured to output a temporal luminance change of the optical signal as an event signal on a basis of the pixel signal; and
a processor configured to
detect a droplet injected from a dispenser on a basis of the event signal,
generate and output control information for controlling injection of the droplet by the dispenser,
generate an event image in which the event signal from the event sensor is collected in unit of a predetermined integration time, and
generate the control information on a basis of the generated event image.

2. The information processing apparatus according to claim 1, wherein the event sensor is disposed such that a reading direction of the pixel signal coincides with a moving direction of the droplet.

3. The information processing apparatus according to claim 1, wherein the event sensor detects the droplet from two orthogonal directions.

4. The information processing apparatus according to claim 1, wherein the event sensor is one of two event sensors that respectively detect the droplet from two orthogonal directions.

5. The information processing apparatus according to claim 1, wherein
as the event image, the processor generates: a first event image based on the event signal of a first event that is a luminance change of a first polarity; and a second event image based on the event signal of a second event that is a luminance change of a second polarity, the second polarity being a polarity opposite to the first polarity.

6. The information processing apparatus according to claim 5, wherein
the event image is a binary image in which a pixel value of a pixel in which the event signal has occurred is set to 1 and a pixel value of a pixel in which the event signal has not occurred is set to 0.

7. The information processing apparatus according to claim 5, wherein
the processor further generates a display image in which a first pixel value of a first pixel in which the first event has occurred is set to a first luminance value, a second pixel value of a second pixel in which the second event has occurred is set to a second luminance value, and a third pixel value of a third pixel is set to a third luminance value.

8. The information processing apparatus according to claim 5, wherein the processor calculates trajectory information of the droplet on a basis of the first event image, and generates the control information on a basis of the calculated trajectory information.

9. The information processing apparatus according to claim 5, wherein the processor performs noise removal processing of removing noise of the first event image.

10. The information processing apparatus according to claim 1, wherein the predetermined integration time is shorter than one frame period corresponding to a frame rate.

11. An information processing apparatus comprising:
an event sensor including a pixel configured to photoelectrically convert an optical signal and output a pixel signal, the event sensor being configured to output a temporal luminance change of the optical signal as an event signal on a basis of the pixel signal; and
a processor configured to
detect a droplet injected from a dispenser on a basis of the event signal, and
generate a reconfigured image in which a luminance value is estimated on a basis of the event signal in unit of a frame rate period corresponding to a frame rate.

12. The information processing apparatus according to claim 11, wherein the processor generates the reconfigured image by using the event signal and previously output event signals.

13. The information processing apparatus according to claim 11, wherein the processor calculates a width of the droplet on a basis of the reconfigured image, and generates control information for controlling injection of the droplet by the dispenser on a basis of the calculated width.

14. The information processing apparatus according to claim 11, wherein the processor calculates a volume of the droplet on a basis of the reconfigured image, and generates control information for controlling injection of the droplet by the dispenser on a basis of the calculated volume.

15. The information processing apparatus according to claim 11, wherein the processor performs noise removal processing of setting, to zero, a pixel value of a pixel in which an event does not occur within a certain period before a generation timing of the reconfigured image.

16. An information processing apparatus comprising:
wherein
an event sensor including a pixel configured to photoelectrically convert an optical signal and output a pixel signal, the event sensor being configured to output a temporal luminance change of the optical signal as an event signal on a basis of the pixel signal; and
a processor configured to
detect a droplet injected from a dispenser on a basis of the event signal, and
detect the droplet also on a basis of an RGB image obtained by capturing an image of the droplet with an image sensor.

17. An information processing system comprising: a dispenser configured to inject predetermined liquid, and the information processing apparatus according to claim 1.

18. An information processing system comprising a dispenser configured to inject predetermined liquid, and the information processing apparatus according to claim 11.

19. An information processing system comprising a dispenser configured to inject predetermined liquid, and the information processing apparatus according to claim 16.

* * * * *